US008396954B2

(12) United States Patent
Nagaraj et al.

(10) Patent No.: US 8,396,954 B2
(45) Date of Patent: Mar. 12, 2013

(54) ROUTING AND SERVICE PERFORMANCE MANAGEMENT IN AN APPLICATION ACCELERATION ENVIRONMENT

(75) Inventors: Ashwath Nagaraj, Los Altos Hills, CA (US); Rajeev Bharadhwaj, Saratoga, CA (US); Ajit Gupta, Fremont, CA (US)

(73) Assignee: Aryaka Networks, Inc., Newark, CA (US)

( * ) Notice: Subject to any disclaimer, the term of this patent is extended or adjusted under 35 U.S.C. 154(b) by 213 days.

(21) Appl. No.: 12/822,366

(22) Filed: Jun. 24, 2010
(Under 37 CFR 1.47)

(65) Prior Publication Data
US 2012/0179796 A1  Jul. 12, 2012

(51) Int. Cl.
*G06F 15/173* (2006.01)
(52) U.S. Cl. ........ 709/223; 709/224; 709/227; 709/229; 370/395.21; 370/395.41
(58) Field of Classification Search .................. 709/223, 709/224, 227, 229; 370/395.21, 395.41
See application file for complete search history.

(56) References Cited

U.S. PATENT DOCUMENTS

| | | | | |
|---|---|---|---|---|
| 6,173,399 | B1 * | 1/2001 | Gilbrech | 713/153 |
| 7,492,714 | B1 * | 2/2009 | Liao et al. | 370/235 |
| 7,610,330 | B1 * | 10/2009 | Quinn et al. | 709/201 |
| 7,843,843 | B1 * | 11/2010 | Papp et al. | 370/252 |
| 8,000,344 | B1 * | 8/2011 | Frick | 370/466 |
| 8,200,773 | B2 * | 6/2012 | Bluestone et al. | 709/217 |
| 2003/0061346 | A1 * | 3/2003 | Pekary et al. | 709/224 |
| 2004/0131052 | A1 * | 7/2004 | Smith et al. | 370/352 |
| 2006/0129792 | A1 * | 6/2006 | Bots et al. | 713/1 |
| 2007/0121579 | A1 * | 5/2007 | Matthews et al. | 370/351 |
| 2009/0024763 | A1 * | 1/2009 | Stepin et al. | 709/247 |
| 2009/0028161 | A1 * | 1/2009 | Fullarton et al. | 370/395.41 |
| 2009/0046728 | A1 * | 2/2009 | Matthews | 370/397 |
| 2009/0182874 | A1 * | 7/2009 | Morford et al. | 709/224 |
| 2011/0010312 | A1 * | 1/2011 | McDonald | 705/400 |

OTHER PUBLICATIONS

"Akamai's Application Acceleration Services: Transform the Internet into a Business-Ready Application Delivery Platform" ; Akamai Technologies, Inc. ; Oct. 2008 ; 12 pages ; (Last visited Jul. 20, 2010).

* cited by examiner

*Primary Examiner* — Lashonda Jacobs
(74) *Attorney, Agent, or Firm* — Raj Abhyanker, P.C.

(57) ABSTRACT

Disclosed are a system, a method and an apparatus of reduction of routing and service performance management in an application acceleration environment. In one embodiment, a system includes a branch site that includes a branch client. In addition, the system includes a headquarters site that includes a headquarters server. The headquarters site including a headquarters server includes the branch site. The headquarters site is communicatively coupled over a link via transmission media. The link is identified through a link identifier. The headquarters site including a headquarters server also includes the branch client and the headquarters server being communicatively coupled over a network connection via the transmission media. The network connection is identified through a connection identifier. The system also includes a first point of presence (POP) communicatively coupled with the branch site over a first segment of the link.

46 Claims, 30 Drawing Sheets

| TOPOLOGY 206 | CLIENT ACCESS MODES 206A | | | |
|---|---|---|---|---|
| DESIGNATION AND SITE TYPE 204 | BRANCH ENTERPRISE OWNED 204A | HEADQUARTERS ENTERPRISE OWNED 204B | HEADQUARTERS CLOUD INFRASTRUCTURE PROVIDER 204C | HEADQUARTERS CLOUD PLATFORM PROVIDER 204D |
| BRANCH ENTERPRISE OWNED 204A | YES | YES 902 | UNLIKELY | UNLIKELY |
| HEADQUARTERS ENTERPRISE OWNED 204B | YES | YES | YES | YES |
| HEADQUARTERS CLOUD INFRASTRUCTURE PROVIDER 204C | YES | YES | YES | YES |
| HEADQUARTERS CLOUD PLATFORM PROVIDER 204D | YES | YES | YES | YES |

(SERVER ACCESS MODES 206B)

FIGURE 9

| SITE DESIGNATION / SITE TYPE | BRANCH OPTIONAL ENTERPRISE PREMISE MODULE 1008A | HEADQUARTERS OPTIONAL ENTERPRISE PREMISE MODULE 1008B |
|---|---|---|
| ENTERPRISE OWNED 1002 | HARDWARE MACHINE, VIRTUAL MACHINE, BROWSER PLUGIN, KERNEL PLUGIN | HARDWARE MACHINE, VIRTUAL MACHINE, BROWSER PLUGIN |
| CLOUD INFRASTRUCTURE PROVIDER 1004 | VIRTUAL MACHINE, KERNEL PLUGIN | VIRTUAL MACHINE, KERNEL PLUGIN |
| CLOUD PLATFORM PROVIDER 1006 | OPTIMIZATION APPLICATION(S) | OPTIMIZATION APPLICATION(S) |

FIGURE 10

| PROTOCOLS USED TO CONNECT TO/FROM POPS AND TO ROUTE BETWEEN POPS 1200 | |
|---|---|
| LINK LAYER (L2) 1202 | IP LAYER (L3) 1204 |
| MPLS | IPSEC |
| VPLS | SSL |
| VLAN | GRE |
| QinQ | IP in IP |
| WiMAX | |
| DSL | |
| L2TP* | |
| SSTP* | |
| PPTP* | |

FIGURE 12

FIGURE 14-1 GRE PACKET FORMAT

FIGURE 14-3 GRE OVER IPSEC PACKET FORMAT TUNNEL MODE

| ENPOINTS: BRANCH ENTERPRISE OWNED NODE, HEADQUARTERS ENTERPRISE OWNED NODE 1702 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | ALL SHOWN IN FIG. 12 |
| SEGMENT 2 312 | ALL SHOWN IN FIG. 12 | ALL SHOWN IN FIG. 12 |
| SEGMENT 3 314 | ALL SHOWN IN FIG. 12 | ALL SHOWN IN FIG. 12 |

| ENPOINTS: HEADQUARTERS ENTERPRISE OWNED NODE, BRANCH CLOUD INFRASTRUCTURE NODE 1712 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | IPSEC, SSL, NAT, GRE, IP IN IP |
| SEGMENT 2 312 | ALL SHOWN IN FIG. 12 | GRE, IP IN IP |
| SEGMENT 3 314 | ALL SHOWN IN FIG. 12 | ALL SHOWN IN FIG. 12 |

| ENPOINTS: BRANCH ENTERPRISE OWNED NODE, HEADQUARTERS CLOUD PLATFORM PROVIDER NODE 1722 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | SSL |
| SEGMENT 2 312 | ALL SHOWN IN FIG. 12 | GRE, IP IN IP |
| SEGMENT 3 314 | ALL SHOWN IN FIG. 12 | ALL SHOWN IN FIG. 12 |

FIGURE 17

| ENPOINTS: BRANCH CLOUD INFRASTRUCTURE PROVIDER NODE, HEADQUARTERS ENTERPRISE OWNED NODE 1732 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | ALL SHOWN IN FIG. 12 |
| SEGMENT 2 312 | MPLS, VLAN | GRE, IP IN IP |
| SEGMENT 3 314 | ALL SHOWN IN FIG. 12 | IPSEC, SSL, NAT, GRE, IP IN IP |

| ENPOINTS: BRANCH CLOUD INFRASTRUCTURE PROVIDER NODE, CLOUD INFRASTRUCTURE PROVIDER NODE 1742 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | IPSEC, SSL, NAT, GRE, IP IN IP |
| SEGMENT 2 312 | ALL SHOWN IN FIG. 12 | GRE, IP IN IP |
| SEGMENT 3 314 | ALL SHOWN IN FIG. 12 | IPSEC, SSL, NAT, GRE, IP IN IP |

| ENPOINTS: BRANCH CLOUD INFRASTRUCTURE PROVIDER NODE, HEADQUARTERS CLOUD PLATFORM PROVIDER NODE 1752 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | SSL |
| SEGMENT 2 312 | ALL SHOWN IN FIG. 12 | GRE, IP IN IP |
| SEGMENT 3 314 | ALL SHOWN IN FIG. 12 | IPSEC, SSL, NAT, GRE, IP IN IP |

← NOT NAMED SINCE IT'S A CONTINUATION OF FIGURE 17. WILL MENTION IN DESCRIPTION

FIGURE 17A

| ENPOINTS: BRANCH CLOUD PLATFORM PROVIDER NODE, HEADQUARTERS ENTERPRISE OWNED NODE 1762 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | ALL SHOWN IN FIG. 12 |
| SEGMENT 2 312 | MPLS, VLAN | GRE, IP IN IP |
| SEGMENT 3 314 | ALL SHOWN IN FIG. 12 | SSL |

| ENPOINTS: BRANCH CLOUD PLATFORM PROVIDER NODE, HEADQUARTERS CLOUD INFRASTRUCTURE PROVIDER NODE 1772 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | IPSEC, SSL, NAT, GRE, IP IN IP |
| SEGMENT 2 312 | ALL SHOWN IN FIG. 12 | GRE, IP IN IP |
| SEGMENT 3 314 | ALL SHOWN IN FIG. 12 | SSL |

| ENPOINTS: BRANCH CLOUD PLATFORM PROVIDER NODE, HEADQUARTERS CLOUD PLATFORM PROVIDER NODE 1782 | | |
|---|---|---|
| | COMMUNICATION PROTOCOL 1704 | |
| SEGMENT 1706 | EXAMPLE LINK LAYER PROTOCOL 1708 | EXAMPLE INTERNET LAYER PROTOCOL 1710 |
| SEGMENT 1 310 | ALL SHOWN IN FIG. 12 | |
| SEGMENT 2 312 | ALL SHOWN IN FIG. 12 | GRE, IP IN IP |
| SEGMENT 3 314 | ALL SHOWN IN FIG. 12 | |

FIGURE 17B

| | |
|---|---|
| OPTIMIZATION AND SECURITY SERVICES 2102 | . . . |
| TCP OPTIMIZATION | PROTOCOL DEPENDENT 2104 |
| LINK MULTIPLEXING/AGGREGATION | |
| STREAM LEVEL COMPRESSION | |
| LINK OPTIMIZATION | . . . |
| PROTOCOL OPTIMIZATION | PROTOCOL INDEPENDENT 2106 |
| | . . . |

FIGURE 21

ROUTING AND SERVICE PERFORMANCE MANAGEMENT IN AN APPLICATION ACCELERATION ENVIRONMENT

FIELD OF TECHNOLOGY

This disclosure relates generally to computer networking and, more particularly, to a method, an apparatus, and a system of a routing and service performance management in an application acceleration environment.

BACKGROUND

Routing and service performance in an application acceleration environment may be challenging. For example, a network may be heterogeneous with many constituent parts. Performance of the application may be a factor of bandwidth and latency of the network. Speed of data transfer between a source point and a destination point on Internet may be limited by a number of factors (e.g., congestion, distance, size of link). The network of service providers may not be optimized to handle the bottleneck in speed of data transfer. As a result, the data transfer between the headquarters and the branch offices may incur a large delay (e.g., approximately 250 ms for a file transfer between US and India).

SUMMARY

Disclosed are a system, a method and an apparatus of reduction of routing and service performance management in an application acceleration environment. In one aspect, a system includes a branch site that includes a branch client. In addition, the system includes a headquarters site that includes a headquarters server. The headquarters site including a headquarters server includes the branch site. The headquarters site is communicatively coupled over a link via transmission media. The link is identified through a link identifier. The headquarters site including a headquarters server also includes the branch client and the headquarters server being communicatively coupled over a network connection via the transmission media. The network connection is identified through a connection identifier. The system also includes a first point of presence (POP) communicatively coupled with the branch site over a first segment of the link. The system also includes a second POP communicatively coupled with the first POP over a second segment of the link. The second POP is also communicatively coupled with the headquarters site over a third segment of the link. The branch site of the system is configured to transmit a packet of the network connection. In addition, the branch site of the system is associated with the branch client, over the first segment to the first POP, based on the link identifier, the packet encoding the link identifier and the connection identifier.

In addition, the system includes the first POP being configured to select a delivery optimization operation to perform on the packet based on a first POP identifier, the link identifier, and the connection identifier. The first POP is also configured to perform the delivery optimization operation on the packet based on that identification. In addition, the first POP is configured to transmit the packet to the second POP over the second segment of the link based on the link identifier.

The second POP of the system is configured to select a further delivery optimization operation to perform on the packet based on a second POP identifier, the link identifier, and the connection identifier. In addition, the second POP of the system is configured to perform the further delivery optimization operation on the packet based on that identification.

The second POP of the system is also configured to transmit the packet to the headquarters site over the third segment of the link based on at least one of the link identifier and the connection identifier.

The branch client and the headquarters server may establish the network connection with one another prior to the branch site directing the packet to the first POP over the first segment of the link. A set of branch clients of the branch site and a set of headquarters servers of the headquarters site may establish a plurality of separate network connections with one another. The system may be configured to direct a plurality of packets, each associated with a different one of the plurality of network connections, simultaneously over the first segment, the second segment, and/or the third segment of the link. The network connection may be one of the one or more separate network connections. The branch client and the headquarters server may establish the network connection through a transmission control protocol three-way handshake. The connection identifier may be encoded in an Internet Protocol (IP) header that may include a source IP address, a destination IP address, a source port identifier, and a destination port identifier. The first POP and the second POP may each include an enterprise selection module configured to identify in a memory system, an enterprise associated with the packet, based on the link identifier. In addition, the first POP and the second POP may each include an operation set selection module configured to identify in the memory system, a set of delivery optimization operations associated with the packet, based on the identified enterprise and the connection identifier.

The set of delivery optimization operations associated with the packet may include a data compression function, a data decompression function, a protocol proxy function, an encryption function, and a decryption function. The first POP may include an operation selection module configured to select the delivery optimization operation of the identified set of delivery optimization operations to perform on the packet, based on an association of the first POP identifier with the connection identifier in the memory system. Also, the first POP may include a delivery optimization module configured to utilize a processor to perform the selected delivery optimization operation on the packet. The second POP may include an operation selection module configured to select the delivery optimization operation of the identified set of delivery optimization operations to perform on the packet, based an association of the second POP identifier with the connection identifier in the memory system, and a delivery optimization module configured to utilize a processor to perform the selected further delivery optimization operation on the packet.

The branch site may be associated with a branch enterprise premise module configured to perform the set of delivery optimization operations on the packet prior to the branch site transmitting the packet over the first segment to the first POP. The headquarters site may be associated with a headquarters enterprise premise module configured to perform the set of delivery optimization operations on the packet subsequent to receiving the packet from the second POP over the second segment.

The system may include a set of interconnectors. The set of interconnectors may include a branch site interconnector, a first POP interconnector, a second POP interconnector and a headquarter site interconnector. The branch site interconnector may be associated with the branch site. The first POP interconnector may be associated with the first POP. The second POP interconnector may be associated with the second POP. The headquarters site interconnector may be associated with the headquarters site. Each of the set of interconnectors may be configured to perform a router function and/or a bridge function. The first segment may be identified through a first segment identifier that identifies the branch site interconnector and/or the first POP interconnector. The second segment may be identified through a second segment identifier that identifies the first POP interconnector and/or the second POP interconnector. The third segment may be identified through a third segment identifier that identifies the second POP interconnector and/or the headquarters interconnector.

The branch site and the headquarters site may be associated with an enterprise and the branch site interconnector may not be programmable by the enterprise to manipulate an extended header of the packet.

The system may include a database server communicatively coupled with the branch client. The database server may be configured to receive from the branch client, a target destination for the packet. In addition, the database server may be configured to provide a unique Internet Protocol (IP) address to the branch client based on the target destination, the unique IP address uniquely encoding the first segment identifier, the link identifier, and the connection identifier. The branch client of the system may be configured to transmit, via the branch site interconnector, the packet to the first POP over the first segment using the first segment identifier. The branch site and the headquarters site may be associated with an enterprise and the branch site interconnector is programmable by the enterprise to manipulate an extended header of the packet.

The branch site interconnector may be configured to determine through a memory system that the first segment identifier is associated with the link identifier, place the link identifier in the extended header of the packet, place the first segment identifier in another extended header of the packet, and based on the first segment identifier, transmit the packet over the first segment to the first POP.

The first POP interconnector may be configured to determine through a memory system that the second segment identifier is associated with the link identifier, place the link identifier in an extended header of the packet, place the second segment identifier in another extended header of the packet, and based on the second segment identifier, transmit the packet over the second segment to the second POP. The packet may be a request packet.

The connection identifier may include a headquarters server identifier and a branch client identifier. The second POP interconnector may be configured to substitute the branch client identifier with the third segment identifier, and a modified branch client identifier. The connection identifier may reflect the headquarters server identifier as a destination, and reflects the third segment identifier and the modified branch client identifier as a source, and cause the second POP interconnector to transmit the request packet to the headquarters site over the third segment.

The headquarters site may be configured to provide the request packet to the headquarters server using the headquarters server identifier as the destination, The headquarters site may be configured to designate the third segment identifier and the modified branch client identifier as the destination, and the headquarters server identifier as the source. In addition, the headquarters site subsequent to providing the request packet to the headquarters server may transmit a return packet that is associated with the request packet over the third segment to the second POP based on the third segment identifier.

Responsive to receiving the return packet from the headquarters site, the second POP may be configured to access a memory system to associate the modified branch client identifier with the branch client identifier, and to access the memory system to associate the branch client identifier and the headquarters server identifier with the connection identifier. In addition, the second POP may be configured to access the memory system to associate the connection identifier with the link identifier, to access the memory system to associate the link identifier with the second segment identifier, and to transmit the return packet to the first POP based on the second segment identifier.

In addition, the second POP interconnector may be configured to determine through a memory system that the third segment identifier is associated with the link identifier, place the link identifier in the extended header of the packet, place the third segment identifier in another extended header of the packet, and based on the third segment identifier, transmit the packet over the third segment to the headquarters site.

The extended header and/or the other extended header may reflect one or more of Internet a Protocol Security (IPSec), a Multiprotocol Label Switching (MPLS), a virtual Local Area Network (VLAN), IP, and Generic Routing Encapsulation (GRE) access protocols. The first POP interconnector may be one of one or more interconnectors that are communicatively coupled with the branch site interconnector and are accessible by the branch site interconnector. The branch site interconnector may be configured to select the first POP interconnector from the one or more interconnectors based on the first segment identifier. The second POP interconnector may be one of one or more of POP interconnectors communicatively coupled with the first POP interconnector over one or more segments. The first POP interconnector may select the second POP interconnector from the one or more POP interconnectors based on the second segment identifier. The headquarters site interconnector may be one of one or more headquarters site interconnectors that are communicatively coupled with the second POP interconnector over one or more segments. The second POP interconnector may be configured to select the headquarters site interconnector from the one or more headquarters site interconnectors, based on the third segment identifier.

The packet may be a request packet. The headquarters site interconnector may be configured to receive a return packet associated with the request packet from the headquarters server. In addition, the headquarters site interconnector may also be configured to determine through a memory system of the headquarters site that the link identifier encoded in the return packet is associated with the third segment identifier and to transmit the return packet from the headquarters site to the second POP based on the third segment identifier.

The second POP interconnector may be configured to determine through a memory system of the second POP that the link identifier encoded in the return packet is associated with the second segment identifier, and to transmit the return packet from the second POP to the first POP, based on the second segment identifier.

Also, the first POP interconnector may be configured to determine through a memory system of the first POP that the link identifier encoded in the return packet is associated with the first segment identifier, and to transmit the return packet from the first POP to the branch site interconnector, based on the first segment identifier.

In another aspect, a system includes a branch site that includes one or more branch clients. In addition, the system includes a headquarters site including a headquarters server. The system also includes the branch site and the headquarters site being communicatively coupled over a link via transmission media. The link of the system is identified through a link identifier, and the branch client and the headquarters server being communicatively coupled over a network connection via the transmission media. The network connection of the system is identified through a connection identifier. The system further includes a first point of presence (POP) communicatively coupled with the branch site over a first segment of the link. The system also includes a second POP communicatively coupled with the first POP over a second segment of the link and communicatively coupled with the headquarters site over a third segment of the link. The branch site may be configured to forward a packet of the network connection, and associated with the branch client, over the first segment to the first POP, based on the link identifier, the packet encoding the link identifier and the connection identifier.

The first POP of the system is configured to perform a delivery optimization operation on the packet, determine whether to forward the packet to the second POP, and based on determining that that the packet is to be forwarded to the second POP, forward the packet to the second POP over the second segment of the link based on the link identifier.

The second POP of the system is configured to perform a further delivery optimization operation on the packet, determine whether to forward the packet to the headquarters site, and based on determining that that the packet is to be forwarded to the headquarters site, forward the packet to the headquarters site over the third segment of the link based on at least one of the link identifier and the connection identifier.

The system may include a set of interconnectors including a branch site interconnector associated with the branch site, a first POP interconnector associated with the first POP, a second POP interconnector associated with the second POP, and a headquarters site interconnector associated with the headquarters site. Each of the set of interconnectors may be configured to perform a router function or a bridge function. The first segment may be identified through a first segment identifier that identifies the branch site interconnector and the first POP interconnector. The second segment may be identified through a second segment identifier that identifies the first POP interconnector and/or the second POP interconnector. The third segment may be identified through a third segment identifier that identifies the second POP interconnector and/or the headquarters interconnector.

The link identifier may be configured to be encoded in an inner extended header of the packet. The first segment identifier, the second segment identifier, and/or the third segment identifier are configured to be encoded in outer extended header of the packet.

The branch site interconnector may be configured to encode the first segment identifier in a source field and a destination field of the outer extended header of the packet that the branch site is configured to forward to the first POP, the first segment identifier including a branch site interconnector identifier and a first POP interconnector identifier.

Based on the first POP determining that the packet is to be returned to the branch site, the first POP interconnector may be configured to place the first POP interconnector identifier in the in the source field of the outer extended header, place the branch site interconnector identifier in the destination field of the outer extended header, and return the packet to the branch site over the first segment based on the branch site interconnector identifier in the destination field of the outer extended header.

The first POP interconnector may be configured to encode the second segment identifier in a source field and a destination field of the outer extended header of the packet that the first POP is configured to forward to the second POP, the second segment identifier including a second POP interconnector identifier and a headquarters site interconnector identifier. Based on the second POP determining that the packet is to be returned to the first POP, the second POP interconnector may be configured to place the second POP interconnector identifier in the in the source field of the outer extended header, place a first POP interconnector identifier in the destination field of the outer extended header, and return the packet to the first POP interconnector over the second segment based on the first POP interconnector identifier in the destination field of the outer extended header.

The delivery optimization operation and the further delivery optimization operation may be a set of delivery optimization operations including a data compression function, a data decompression function, a protocol proxy function, an encryption function, and a decryption function.

The branch site may be associated with a branch enterprise premise module configured to perform the set of delivery optimization operations on the packet. The branch enterprise premise module may be further configured to determine whether to return the packet to the branch client prior to the branch site forwarding the packet over the first segment to the first POP, and return the packet to the branch client based on determining that the packet is to be returned to the branch client.

The headquarters site may be associated with a headquarters enterprise premise module configured to perform the set of delivery optimization operations on the packet subsequent to receiving the packet from the second POP over the second segment.

In yet another aspect, a method of performing a point of presence (POP) includes acquiring a packet associated with a network connection, the packet travelling over a segment of one or more segments that form a link between a requesting site and a providing site. The packet includes a link identifier that identifies the link, and a connection identifier that identifies the network connection.

The method also includes selecting a set of delivery optimization operations to associate with the packet based on the link identifier and the connection identifier. In addition, the method includes selecting a delivery optimization operation from the selected set of delivery optimization operations based on a POP identifier that identifies the POP, the link identifier, and the connection identifier. The method also includes processing the packet to perform the selected delivery optimization operation. The method also includes determining whether a further delivery optimization operation is to be performed prior to forwarding the processed packet to a delivery optimization operation provider. The method further includes forwarding the packet to the delivery optimization operation provider over a further segment of the plurality of segments, based on determining that the further delivery optimization operation is to be performed.

The delivery optimization operation provider may include a second POP. The further delivery optimization operation may be selected based on a second POP identifier, the link identifier and the connection identifier.

The delivery optimization operation provider may include a provider enterprise premise equipment in a provider site. The further delivery optimization operation may be selected based on a headquarters site identifier, the link identifier and the connection identifier.

In addition, the method may include determining that the further delivery optimization operation is not to be performed. The method may include determining that the packet is to be returned to a source of the packet. The method may also include returning the packet towards the source of the packet over the segment based on the determining that the further delivery optimization operation is not to be performed and the determining that the packet is to be returned to the source of the packet.

Determining that the further delivery optimization operation is to be performed may include accessing a determination value stored in a memory system. The determination value may be associated with a bandwidth threshold value and/or a throughput threshold value related to the further segment.

The selection of the set of delivery optimization operations may include determining that the link identifier is associated with an enterprise identified through an enterprise identifier in a memory system, and determining that the enterprise identifier and the connection identifier are associated with the set of delivery optimization operations in the memory system. The selection of the delivery optimization operation from the set of delivery optimization operations may include determining that the delivery optimization operation of the set of delivery optimization operations is associated with the connection identifier and the POP identifier in the memory system.

The association between the link identifier, the connection identifier, and the set of delivery optimization operations may be pre-defined based on a user preference. The association between the connection identifier and the delivery optimization operation of the set of delivery optimization operations may be pre-defined based on a user configuration of the POP. The delivery optimization operation of the set of delivery optimization operations may be selected from the group of delivery optimization operations consisting of data compression, data decompression, protocol proxy, authentication, encryption, and/or decryption. A requesting client of the requesting site and a providing server of the providing site may establish the network connection using Internet protocol (IP). The connection identifier may be encoded in an inner header of the packet. The connection identified includes a source Internet protocol (IP) address, a destination IP address, a source port identifier, and/or a destination port identifier. The link identifier may be encoded in an extended header of the packet. The link identified may reflect a generic routing encapsulation, multiprotocol label switching, virtual private local area network services, and/or Internet Protocol (IP).

A machine-readable medium including instructions that when executed by a machine may cause the machine to perform the method as described herein.

BRIEF DESCRIPTION OF THE VIEWS OF DRAWINGS

Example embodiments are illustrated by way of example and not limitation in the figures of accompanying drawings, in which like references indicate similar elements and in which:

FIG. 9 is a table view illustrating the different topology types and connectivity between the topology types, according to one embodiment.

FIG. 10 is a table view illustrating the different premise types that perform service functions, according to one embodiment.

FIG. 12 is a table view illustrating the various access protocols used to transmit the example packet illustrated in FIG. 11, according to one embodiment.

FIG. 17 is a table view illustrating example access protocols used to transmit the packet illustrated in FIG. 11 over different segments between different customer site types and/or customer site designations, according to one embodiment.

FIG. 21 is a table view illustrating a list of services performed by the point of presence illustrated in FIG. 19.

DETAILED DESCRIPTION

Disclosed are a system, a method and an apparatus of reduction of routing and service performance management in an application acceleration environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
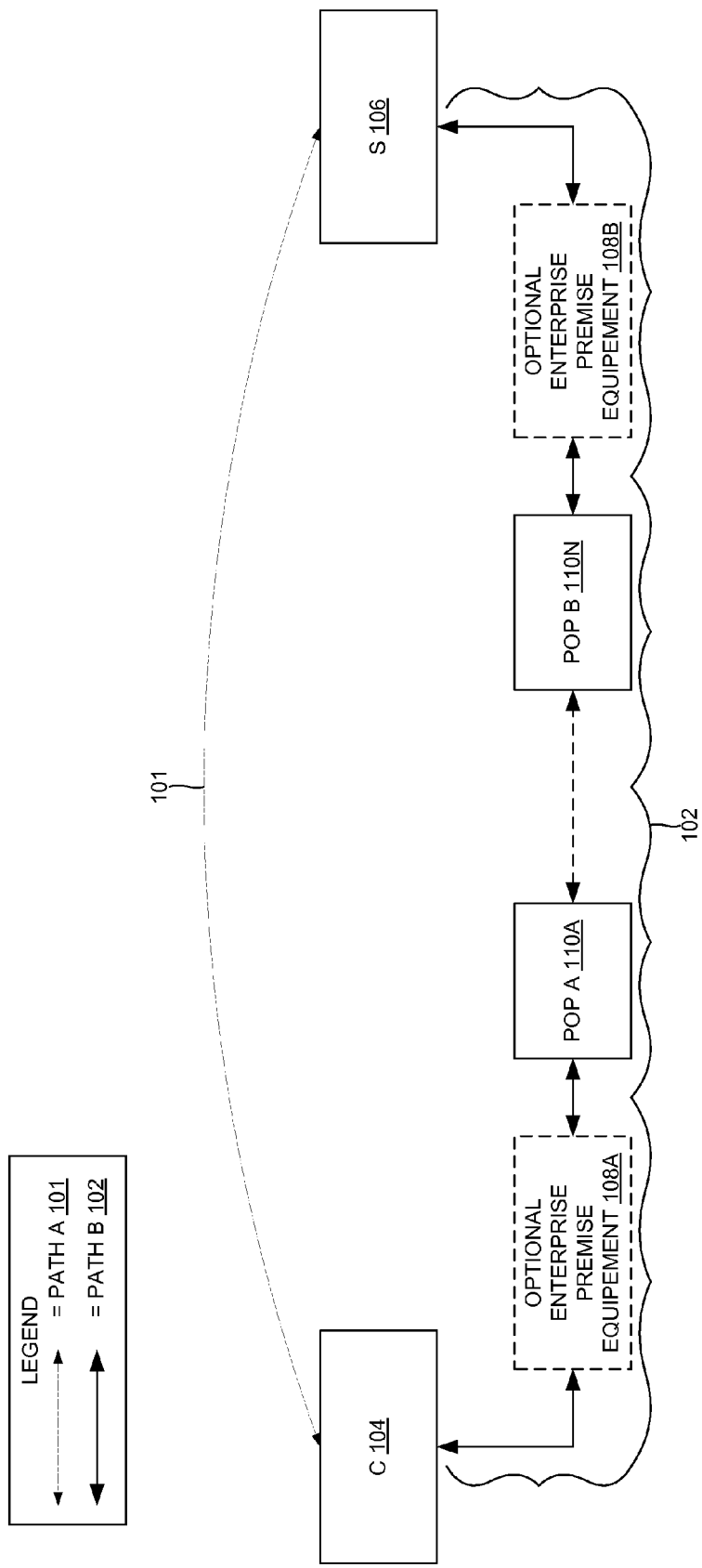
FIG. 1 is a network diagram illustrating a basic representation of system overlay network.

FIG. 1 is a network view illustrating a basic representation of a system overlay network 100, according to one embodiment. In particular, FIG. 1 illustrates a system overlay network 100, a client 104, a server 106, a path A 101, a path B 102, a POP A 110 A, a POP B 110 B, an optional enterprise premise equipment 108 A and 108 B.

A data may be transferred between a client 104 and a server 106. The client 104 may include, but not limited to a desktop or a laptop. The server 106 may include, but not limited to an exchange center. The client C 104 may request the server S 106 for the data. The data transfer may be a file transfer or a centralized application being accessed between a branch and a headquarters office. The data may be transferred as packets 1100 A-C. The data transfer between a client 104 and a server 106 office may be performed through an Internet. The server 106 may be an actual server. The actual server may be a final end point of a client-server communication. The data may be transferred over multiple paths over the Internet. In an example embodiment, the data may be transferred on path A 101 or path B 102.

The data transfer over path A 101 may not be optimized. Path A 101, may not be an optimized network. However, in path B 102, the client 104 and server 106 sites may be coupled to optimization agents (e.g., optional enterprise premise module 108 A-B, POPs 110 A-N) that may be configured to optimize the data transfer over path B 102. The optimization agents may be located at the WAN network between the client and server site. The optimization agents may also be located at the client and/or server sites. For example, the optional enterprise premise equipment 108 A-B may be coupled to the client 104 and/or server 106 at the client 104 and/or server 106 sites (e.g., at the requesting site 304 and/or providing site 306, at the private LAN). The POPs 110 A-N may also be coupled to the client and/or the server and located at the WAN network between the client 104 and the server 106 (e.g., network A 308). Path B 102 may have n-number of points of presence 110 A-N (used as POP from here after). The n-number of POPs 110 A-N in the network path B 102 may enable the transfer of optimization operations 2102 from the client 104 and/or server 106 site to the network.

The optimization agents may be a proxy. For example, the POPs 110 A-N and the optional enterprise premise module 108 A-B as illustrated in FIG. 1 are proxies of the original server 106. The proxy may perform all the functions of the actual server 106. The proxy may be a transparent or opaque entity that performs whole or part of a server function at a location near or away from the actual server. As explained earlier, the proxies may be located at the client 104 and server 106 ends (e.g., optional enterprise premise module 108 A-B illustrated in FIG. 1). The proxies may also be located in the network connecting the client 104 and the server 106 (e.g., the POPs 110 A-C located in network A 308 that connects the requesting site 304 and providing site 306 illustrated in FIG. 3). In an example embodiment, illustrated in FIG. 1 the POPs 110 A-N and the optional enterprise premise module 108 A-B may enable acceleration as a service over path B 102 in the system overlay network 100.

Companies may consolidate applications and/or servers at a central location. The centralized location may be the headquarters. The consolidation of the application and/or servers may enable the management of the application and/or server more cost-effectively. The consolidation may also help to meet regulatory requirements for data security and backup. However, the centralized applications may be designed to operate optimally over a local area network. If the physical distance between the end points of the network over which the consolidated application and/or server is accessed is large, then the performance of the application may be compromised. The performance of the application may be a factor of the bandwidth and latency of the network. The speed of data transfer between a source point and a destination point on the Internet may be limited by a number of factors (e.g., congestion, distance, size of link). The network of the service providers may not be optimized to handle the bottleneck in speed of data transfer. As a result, the data transfer between the headquarters and the branch offices may incur a large delay (e.g., approximately 250 ms for a file transfer between US and India).

Acceleration as a service may be required over the network to minimize the effects of the bottleneck. Acceleration as a service may be a method to accelerate performance of the centralized application located at the providing side (e.g., headquarters office, server) for the user at the requesting site (e.g., branch office, client) as shown in FIG. 1. The performance of the centralized application being accessed by the requesting site may depend on latency and/or bandwidth. Accelerating the performance of the centralized application may require addressing the latency and/or bandwidth related issues using optimization operations. The various optimization operations 2102 may be discussed in detail in FIG. 21. In an example embodiment, the path B 102 in FIG. 1 may provide acceleration as a service.

The path B 102 may have an optional enterprise premise equipment 108 A-B as shown in FIG. 1. The optional enterprise premise equipment 108 A-B may optimize a portion of the path B 102 from the client C 104 to the POP A 110 A. The optional enterprise premise equipment 108 A-B may apply the optimization operation 2102 on the data from client C 104 to server S 106. The optional enterprise premise equipment 108 A-B may have a subset of the optimization operations 2102 performed by the POP. The different optional enterprise premise equipment 108 A-B may be described in FIG. 10. The POPs 110 A-N and/or optional enterprise premise equipments 108 A-B may enable the provisioning of acceleration as a service over path B 102. The path B 102, forces the data to pass through the n-number of POPs 110 A-N and/or optional enterprise premise equipment 108 A-B.

The path B 102 may be divided into n-number of segments. The different segments may be described in FIG. 3. A client-server connection from client C 104 to the server S 106 may terminate at each optional enterprise premise equipment 108 A-B and/or the POP A-N. An optimization operation 2102 applied at the optional enterprise premise equipment 108 A-B and/or n-number of POPs 110 A-N may be terminated at another optional enterprise premise equipment 108 A-B and/ or POPs 110 A-N. For example, a stream level compression applied on the data at optional enterprise premise equipment 108 A may be decompressed at POP A 110 A. In another example, a gzip compression applied at POP A 110 A may be decompressed at POP B 110B. The process of applying optimization operations 2102 at the optional enterprise premise equipment 108 A-B and/or n-number of POPs 110 A-N and terminating at another optional enterprise premise equipment 108 A-B and/or POPs 110 A-N may be termed as a distributed optimization. The distributed optimization may be symmetric or asymmetric. For example, a compress and decompress operation may be a symmetric operation. A caching operation may be an asymmetric operation. In path B 102 of the system overlay network 100, symmetric optimization may be enabled through the deployment of n-number of POPs 110 A-N. The process flow that enables acceleration as a service operations and routing on the system overlay network 100 may be described in FIG. 2.

Figure 2:
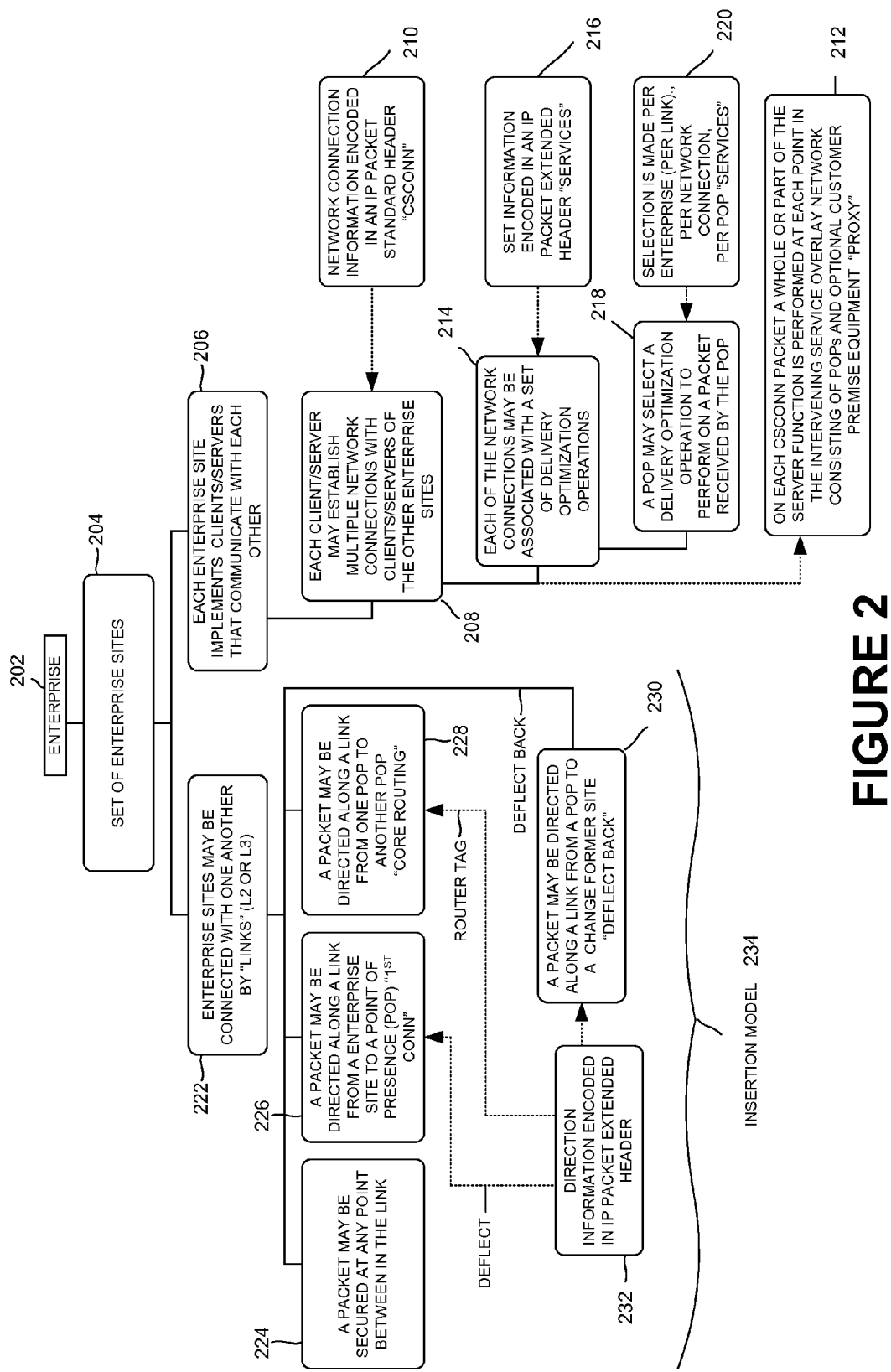
FIG. 2 is a flow diagram illustrating implementation of routing and service chain operations performed on the system overlay network illustrated in FIG. 1, according to one embodiment.

FIG. 2 is a flow diagram illustrating implementation of routing and service chain operations performed on the system overlay network illustrated in FIG. 1, according to one embodiment. In particular, FIG. 2 illustrates an enterprise 202, an enterprise site designation and type 204, an enterprise site topology 206, a connection establishment 208, a connection information 210, a proxy operation 212, an optimization operation set delivery operation 214, an operation set information 216, an optimization operation selection function 218, an operation selection information 220, an enterprise link 222, a secure packet delivery operation 224, a deflect operation 226, a routing operation 228, a deflect back operation 230, an extended header operation 232, an insertion model 234. All the operations and/or functions illustrated in FIG. 2 may be performed through a processor.

In an example embodiment, an enterprise 202 may be any entity that requests for acceleration as a service. In an example embodiment, the enterprise 202 may be identified by enterprise and site identifier (used as CSID from here after). In an example embodiment, the enterprise and site identifier may also be termed as link identifier. In an example embodiment, the source to destination route and/or an enterprise may be determined through the link identifier. In an example embodiment, the enterprise 202 may have multiple sites. The enterprise sites may be designated through a site designation. Each designated enterprise site may have different site types. In an example embodiment, the routing mechanism and connectivity between sites may differ with the different enterprise site designation and types 204. The enterprise site may be designated as a headquarters and/or a branch. Each enterprise site designation may employ different types of sites. The different types of enterprise site may be enterprise owned (used as CO hereafter), cloud infrastructure provider (CIP) and/or cloud platform provider (CPP). An enterprise site designated as headquarters may employ any of the CO, CIP and/or CPP enterprise site types. An enterprise site designates as branch may also employ the different types of enterprise site described above. For example, a Company X may be an enterprise requesting for acceleration as a service. The Company X has offices in New York, California, India and China. The different offices of Company X i.e. the New York office, California office, India office and China office may be different enterprise sites. The New York office and California office may be designated as headquarters and the India and China offices may be designated as branch offices. Each of the New York, California, India and China offices may employ the enterprise owned site type, the cloud infrastructure provider site type and/or the cloud platform provider site type.

The cloud infrastructure provider topology may be a topology in which an infrastructure for operation is provided by a cloud operator. The infrastructure may be a virtual machine. For example, Amazon EC2™ is a cloud infrastructure provided by Amazon Web Services™, where EC2 allows users to rent virtual computers on which to run their own computer applications. The cloud platform provider topology may be a topology in which the cloud operator provides an application platform. The cloud provider platform examples may be Salesforce.com, Google App Engine or software as service vendors.

Each enterprise site may have an enterprise site topology 206. In an example embodiment, the different enterprise site topology 206 may be a client C 104 topology and/or a server S 106 topology. Each enterprise site may implement a client C 104 and/or a server S 106 that communicates with each other. A client C 104 may communicate with the server S 106 through establishing a connection. A connection establishment 208 may enable a communication between data between the client C 104 and the server S 106. Each client C 104 and/or server S 106 at an enterprise site may establish multiple network connections with clients and/or servers of other enterprise sites. The site which initiates the establishment of the client-server connection may be a client C 104. Every connection in a network may be viewed as a connection between a client and a server. For example, a TCP connection may be a client-server connection. In a TCP connection a client C 104 may have to perform a three way handshake to establish a client-server connection. In a three way handshake, the client C 104 may initiate the connection establishment. In a three way handshake the client C 104 may request a server S 106 to establish a connection by sending a SYN packet. The server S 106 may acknowledge the request through sending a SYN-ACK packet back to the client C 104 and then the client C 104 may respond to the SYN-ACK with an ACK sent by the client C 104 to the server S 106. Once the client C 104 sends the ACK the client-server a connection may be established. Based on an initiation of the client-server connection establishment, the branch or the headquarters may be the client 104 site and/or the server 106 site.

Figure 11:
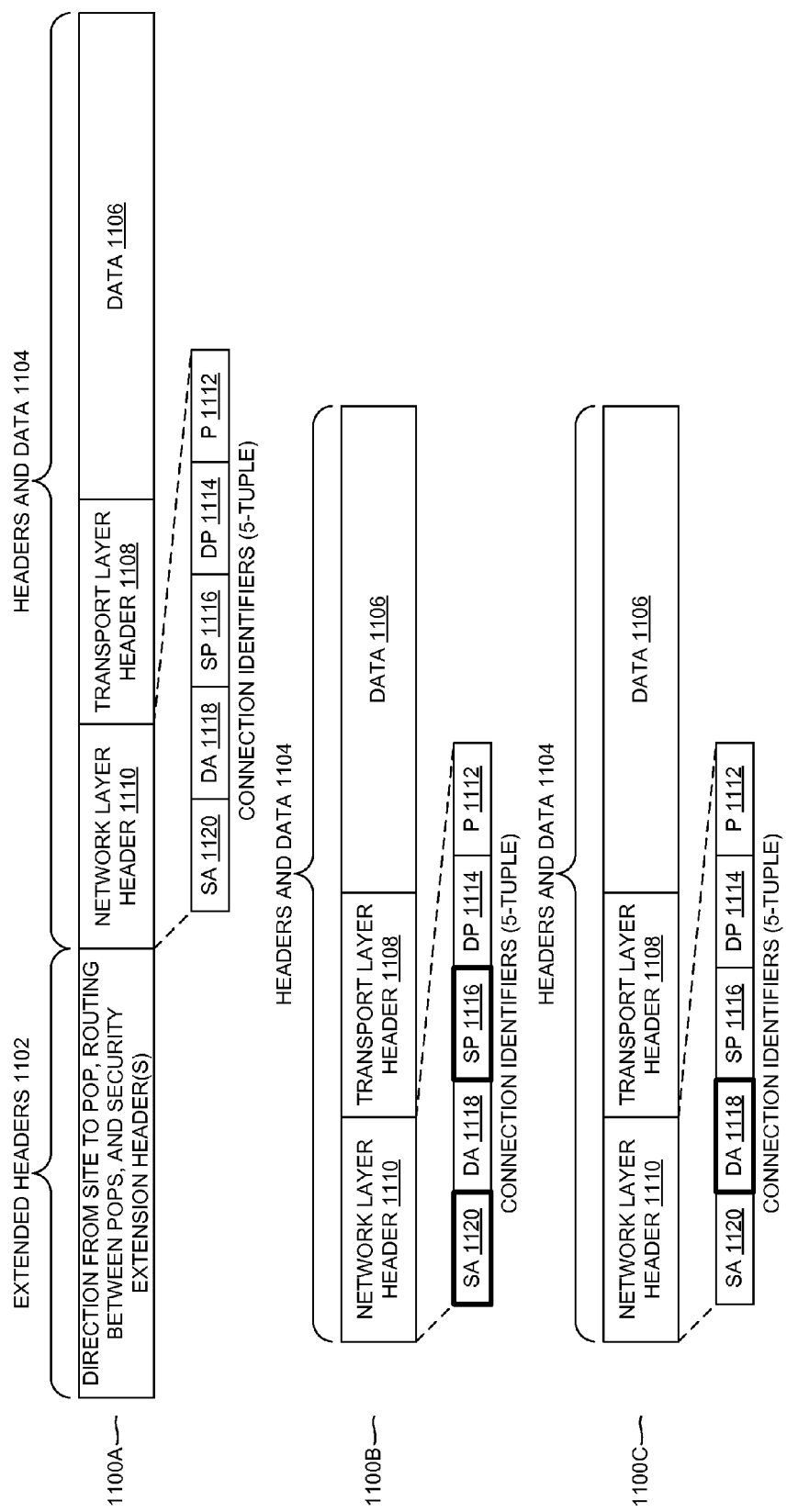
FIG. 11 is structural view illustrating the format of different example packets transmitted over the system overlay network illustrated in FIG. 1, according to one embodiment.

The connection information 210 about a client-server connection may be obtained from the header of the packet 1100 transmitted over the client server connection. In an example embodiment, the branch client and the headquarters server may be communicatively coupled over a network connection via the transmission media 320, the network connection being identified through a connection identifier 2204. The packet 1100 having the connection identifier 2204 may be termed as "csconn" packet 1104. The csconn packet 1104 may have csconn header and a data as illustrated in FIG. 11. The connection information 210 may enable a POP system 110 and/or a site interconnector to determine a connection identification number (used as connection id hereafter).

In an example embodiment, the proxy operation 212 may be performed by the POPs 110 A-N and/or optional enterprise premise equipment 108 A-B in network path B 102. The POPs 110 A-N and/or optional enterprise premise equipment 108 A-B in the network path B 102 may perform a set of optimization operations on each csconn packet that passes through the POPs 110 A-N and/or optional enterprise premise equipment 108 A-B. The set of optimization operations performed through the POPs 110 A-N and/or optional enterprise premise equipment 108 A-B may be a whole or part of a service function set performed by an actual server. The application of a whole or part of an actual server function set at the POPs 110 A-N and optional enterprise premise equipments 108 A-B may be termed as a proxy operation 212.

The optimization operation set delivery 214 may determine a set of operations to be performed on the csconn packet at each POP and/or optional enterprise premise equipment. The set of operations to be performed on a csconn packet may be determined through the operation set information 216. The operation set information may be described in FIG. 21. The operation set information 216 may be formulated based on connection information 210 and CSID. The set of optimization operations to be performed on the csconn packet may differ for each CSID and each connection id. The CSID may be obtained from the extended header of the packet 1100 as illustrated in FIG. 11. The splitting of the services into proxy functions may be performed at the n-number of POPs 110 A-N in the path B 102.

The optimization operation selection function 218 may choose an n-number of specific operations from the set of optimization operations. The n-number of specific operations, described in FIG. 21, selected by the optimization operation selection function 218 may be applied on the csconn packet. At each POP the n-number of specific operations selected form the set of optimization operations differ. For example on POP A operations b, c and d are selected from a set a b, c, d, e, f and g optimization operations. However, for the same csconn packet on POP B only operation f may be selected from the set of optimization operations. The proxy service functions may be applied per connection based on a predetermined criteria based on the client C 104 or the server S 106 Internet protocol (IP) address. The optimization operation selection function 218 may select an n-number of specific operations based on an operation selection information 220. The specific operation selected from the set of operations may differ with a CSID, a connection id and a POP identification number.

The enterprise sites 204 may be connected by a link 222. Each pair of enterprise site may be connected by a link 222. For example, the New York office and California office of Company X may be connected to each other through a link. The links may be wired and/or wireless. The link may be a layer 2 or a layer 3 network link. The layer 2 may be a data link layer in the OSI network model. The OSI network model may have 7 layers. The layer 3 in the OSI model may be a network layer. The different layer 2 and layer 3 links may be described in FIG. 12.

Once the links are establish between the sites, data may be transmitted over the links. Each end to end link from the client C 104 to the server S 106 may be divided into n-number of segments. The transmission of packets along the n-number of link segments may be secure. The link security 224 may assure a secure transmission path to be established over each of the n-number of segments. The link between client C 104 and server S 106 may be secured through a tunneling protocol. The tunneling protocol may encapsulate a different payload protocol in a network protocol (the delivery protocol). Tunneling may enable to carry a payload over an incompatible delivery-network, or provide a secure path through an unsecure network. The link between client C 104 and server S 106 may be also secured through using NAT and/or Firewall operations. For example, IPSec tunneling may be used over path B 102 to ensure secure transmission of data. The data may be transmitted as packets over the network.

A packet may be directed along a link segment from an enterprise site to a POP system through the deflection operation 226. The packet may be transmitted over multiple paths to reach the server S 106. In example embodiment, the packet may be transmitted over path A 101 or path B 102. In an example embodiment, the deflection operation 226 may deflect the packets to the POPs on path B 102 instead of directly transmitting the packets to the headquarters through a path A 101 as illustrated in FIG. 1. In an example embodiment, the deflect operation 226 may direct a packet from the client C 104 to a POP A 110 A illustrated in FIG. 1. In an example embodiment, the link between the client C 104 and the POP A 110 A may have an optional enterprise premise equipment 108 A. The link on which a deflection operation is performed may be termed as first connection (used as $1^{st}$ conn hereafter). From a client to a server the $1^{st}$ conn may be between a client C 104 and a POP A 110A illustrated in FIG. 1. $1^{st}$ conn link transparently deflects the request from a client 104 and/or server 106 to a POP 110 to which the client C 104 and/or sever S 106 is connected based on pre-determined or a dynamic criteria.

A packet may be routed between an n-number of POPs through the routing operation 228. In an example embodiment, the routing between the POPs may be termed as core routing. In an example embodiment, once the packet reaches the POP A through a $1^{st}$ conn link, the POP A may route the packet to another POP through a routing operation 226. In another example embodiment, once the packet may reach a POP system from another POP system, the packet may be routed by the latter POP to yet another POP system in the network. For example, POP A to which the packet was deflected from client C, routes the packet to POP B through a routing operation 226. Example embodiments of different routing and deflection protocols may be described in FIG. 13. The routing protocols used may be layer 2 or a layer 3 routing based on the type of link between the client C 104, server S 106, POPs 110 A-N and/or optional enterprise premise equipment 108 A-B. The packets may be routed between POPs while performing the optimization operations selected by the optimization operation selection function 218 from a set of optimization operations determined by the optimization operation set delivery 216 operation.

A packet may be directed from a POP to the enterprise site through the deflect back operation 230. In an example embodiment, the packet may be directed from POP B 110 B to the server S 106 through the deflect back operation 230 as illustrated in FIG. 1. In an example embodiment, the link between the client C 104 and the POP A 110 A may have an optional enterprise premise equipment 108 B.

In an example embodiment, an extended header operation 232 may provide the information required to perform the deflect operation 222, the routing operation 228 and the deflect back operation 230 securely. The extended header operation 232 may separate the extended header 1102 from the packet 1100 A and obtain information from the extended header 1102 to enable the routing, deflect and deflect back operations. The extended header 1102 may have the $1^{st}$ conn header that enables the deflection operation 222, a router tag that enables the routing operation 228 and/or a deflect back header that enables the deflect back operation 230. The deflect operation 222 and the deflect back operation 230 may be performed at the site interconnectors 406. The deflect operation, route operation and/or deflect back operation may form an insertion model 234. In an example embodiment, the insertion model may be implemented at the POPs 110 A-N, optional enterprise premise equipments 108 A-B and the site interconnectors 406 at the enterprise sites. The insertion model 234 may enable:

(a) A packet to reach to the POP from the enterprise site and from an enterprise site to the POP.
(b) Routing a packet across the n-number of POPs
(c) A secure transmission of the packets from client to the server.

FIG. 2 may describe the various components of the system overlay network 100 and operations and function that enable acceleration as a service on the system overlay network 100. The optimization operations and the different techniques to transmit the packet over a specific path in the system overlay network 100 may be explained in an example embodiment in FIG. 3.

Figure 3:
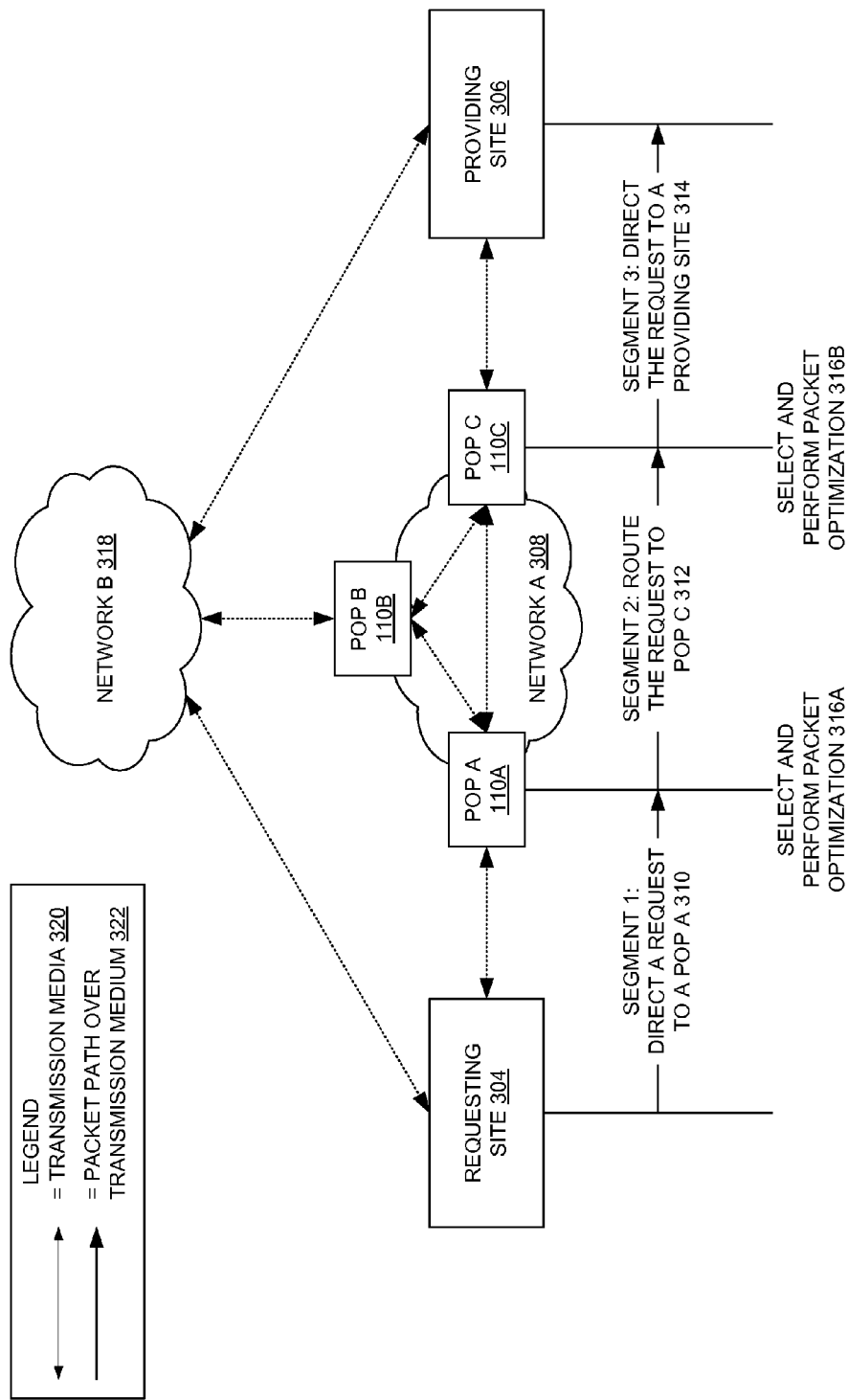
FIG. 3 is a network diagram illustrating different segments forming the system overlay network illustrated in FIG. 1, according to one embodiment.

FIG. 3 is a network diagram illustrating different segments forming the system overlay network illustrated in FIG. 1, according to one embodiment. In particular, FIG. 3 illustrates a network system 300, a requesting site 304, a providing site 306, a network A 308, a network B 318, a POP A 110 A, a POP B 110 B, a POP C 110 C, segment 1 310, a segment 2 312, a segment 3 314, a select and perform optimization operation 316 A and 316 B, a transmission medium 320 and a packet path 322. In acceleration as a service over path B 102, the optimization and acceleration operations may be handled at the network A 308 rather than only at the requesting site 304 and providing site 306.

In an example embodiment, the packet path 322 may illustrate the transmission of the packet from a requesting site 304 to a providing site 306 through the different link segments 310, 312 and 314. The requesting site 304 may request application and/or functions from other network nodes such as the provider site 306. For example, a client 104 at the requesting site 304 may make a request for an application from a server 106 on the providing site 306. In an example embodiment, the deflection operation 226 may deflect the request from the requesting site 304 to the POP A. In an example embodiment, the request may reach the providing site through multiples paths. For example, the request may choose to be routed through network B 318 or network A 308. Network B may be one among numerous numbers of networks on the Internet. However, to obtain acceleration as a service the request from the requesting site 304 may be directed to network A 308 having the POPs that enables acceleration as a service. In an example embodiment, the segment 1 310 between the requesting site 304 and the POP A 110 A may be the $1^{st}$ conn segment described in FIG. 2. The request may be directed to any POP on the network that is closest to the requesting site 304.

At POP A 110 A an n-number of packet optimization service may be selected and performed on the request. In an example embodiment, POP A 110 A may perform the specific optimization operations selected by the optimization operation selection function 218 from a set of optimization operations determined by the optimization operation set delivery 216 operation. In an example embodiment, POP A 110 A may further route the request to POP C 110 C that is nearest to the providing site 306 in segment 2 312. POP A may route the packet to any other POP on the network A to which POP A is connected (e.g., POP B). In an example embodiment, the routing from POP A 110 A to POP C 114 may be enabled through the routing operation 228.

In an example embodiment, POP C 114 may direct the request to the providing site 306. The deflect back operation 230 may enable to request to be directed from POP C 110 C to the providing site 306. In an example embodiment, POP C 110 C may perform the specific optimization operations selected by the optimization operation selection function 218 from a set of optimization operations determined by the optimization operation set delivery 216 operation. POP C 110 C may be coupled to n-number of providing sites 306 and similarly POP A 110 A may be coupled to a number of requesting sites 304.

In an example embodiment, the requesting site 304 may be designated as a headquarters or a branch office. The providing site 306 and/or requesting site 304 may have client and/or server topology. In an example embodiment, the requesting site 304 may include clients (not shown) and/or servers (not shown). The requesting site 304 may behave as a server in an example embodiment where a server of the requesting site 304 requests a function and/or application from another server (not shown). The requesting site 304 may behave as a client in another example embodiment where the client of the requesting site 304 requests the function and/or application from a server via a network such as the network A or the network B. The requesting site 304 may behave as client in yet another example embodiment where the client of the requesting site 304 is requesting the function and/or application from another client. In an example embodiment, the requesting site and providing site may be an enterprise owned site type, cloud infrastructure provider (used as CIP hereafter) site type or cloud platform provider site type (used as CPP hereafter).

The network A 308 may have n-number of POPs. In an example embodiment, the network A may have 3 POPs. The 3 POPs in the network A 308 may be POP A 110 A, POP B 110 B and POP C 110 C. In one or more embodiments, the network A may be a wide area network. In an example embodiment a client-server connection between the clients and/or servers in the requesting site 304 and in the providing site 306 through the network A 308 may be a combination of an n-number of segments. The segments may be a network link between the requesting site 304, the POPs 110 A-C and/or the providing site 306. The segment may also be a network connection between different POPs in the network. In an example embodiment, segment 1 310 may be a network connection between the requesting site 304 and the POP A 110. Segment 1 310 may be a deflection path or a $1^{st}$ conn path. In an example embodiment, segment 2 may be a network connection between POP A 110 and POP C 110 C. In an example embodiment, segment 2 312 may be the core routing segment. In an example embodiment, the network connection between the providing site 306 and POP C 114 may be segment 3 314. In an example embodiment, segment 3 may be a deflect back path.

In an example embodiment that implements acceleration as a service, the POPs 110 A-C may perform an n-number of packet optimization services on the packets that are transmitted through the POPs 110 A-C. All the components in the system 300 may be coupled to each other through a transmission medium. In one or more embodiments, the transmission may be a wired or a wireless medium. In one or more embodiments, network B 318 may be a wide area network (used as WAN hereafter). The providing site 306 and the requesting site 304 may be, but not limited to a private LAN. The providing site 306 and requesting site 304 may be described in detail in FIG. 4 to FIG. 8.

Figure 4:
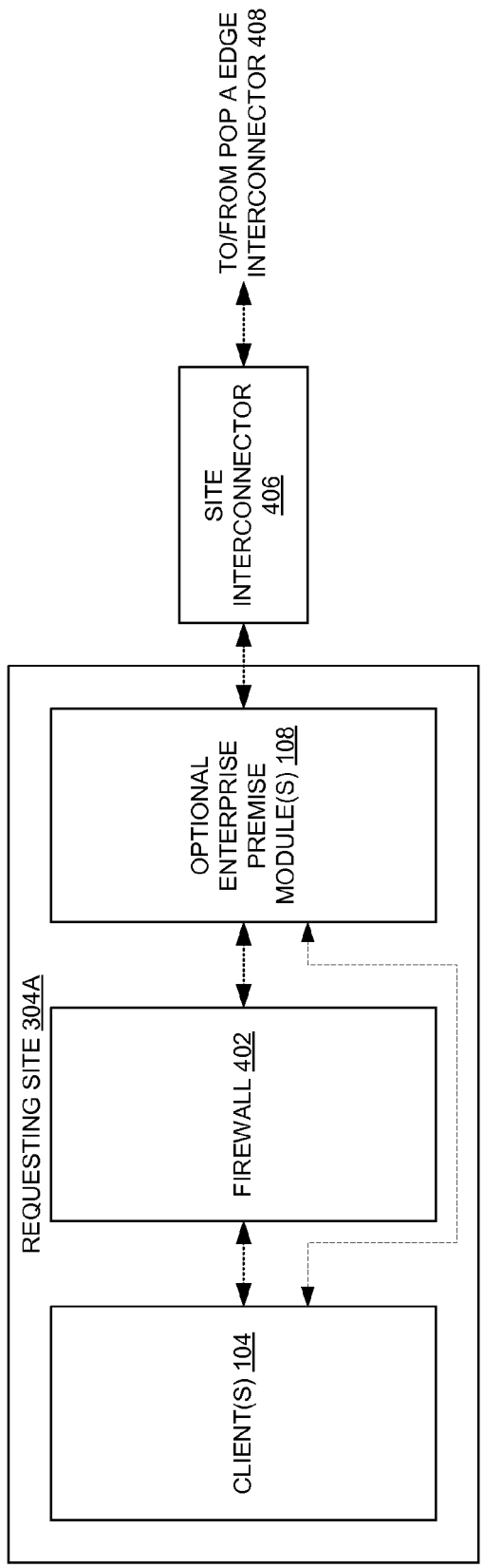
FIG. 4 is an exploded view of a requesting site illustrated in FIG. 3, when the requesting site is a customer owned site, according to one embodiment.

FIG. 4 is an exploded view of a requesting site illustrated in FIG. 3, when the requesting site is an enterprise owned site, according to one embodiment. In particular, FIG. 4 illustrates an enterprise owned type requesting site 304 A, a client 104, a firewall 402, an optional enterprise premise equipment 108 A, a site interconnector 406 and a connection to a POP through an edge interconnector 408.

In an example embodiment, the requesting site 304 A may be an enterprise owned site type. The requesting site 304 may be designated as a headquarters or a branch office. The requesting site 304 may implement a client and/or server topology. In an example embodiment, the requesting site 304 illustrated in FIG. 3 may implement a client 104 topology. The requesting site 304 may have n-number of a client 104. The 104 client may request a server 106 for a file and/or to run an application at the providing site 306 that has the server topology. In an example embodiment, the client 104 may be a physical device and/or a software client application. For example, the client may be a desktop, a laptop, a browser and/or a file access function. The client 104 may be coupled to a firewall 402 and/or an optional enterprise premise equipment 108 A. In an example embodiment the providing site may be implement a server 106 topology.

The firewall 402 may be coupled to an optional enterprise premise equipment 108 A, a client 104 and/or a site interconnector 406. In a client 104 topology, the firewall 402 may be used to filter the traffic that goes from the client device. The firewall 402 may also be used to filter traffic that comes into the client device. The traffic may be packets transmitted over a network link. In an example embodiment, the firewall may be a hardware device or software. The firewall may be implemented to operate at a network level, a packet level, or an application level.

The requesting site 304 may be coupled to a site interconnector 406 through a transmission medium. In an example embodiment, the optional enterprise premise equipment 108 A or firewall 402 of the requesting site 304 may be coupled to the site interconnector 406. The site interconnector 406 may be a branch router and/or a branch bridge. The branch router may be a router associated with the branch office. The branch router or bridge may connect a branch office to the WAN. The optional enterprise premise equipment may be described in FIG. 8.

The site interconnector 406 may be coupled to a POP through an edge site interconnector. The edge site interconnector may be an edge router or a provider edge router that is placed at the edge of a WAN or an ISP. The edge router may communicate with the branch router through a communication protocol over the transmission medium. The edge site interconnector may also be a bridge. In an example embodiment, the transmission of packet to and from the edge site interconnector in segment 1 may be represented as 408 in FIG. 4.

In an example embodiment, the optional enterprise premise equipment 108 A may optimize the link segment 1 310 illustrated in FIG. 3. The optional enterprise premise equipment may not be implemented if the latency in the segment where it may be employed is negligible or the bandwidth is available inexpensively. The various optional premise equipments that may be used in an enterprise owned topology are discussed in FIG. 10.

Figure 5:
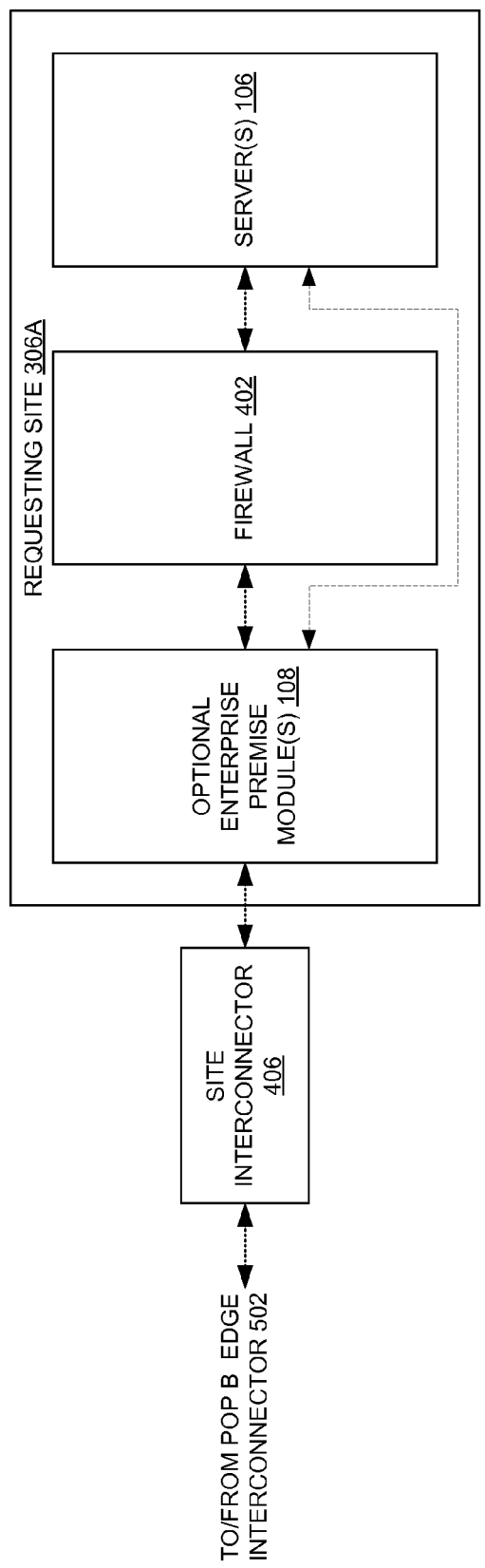
FIG. 5 is an exploded view of a providing site illustrated in FIG. 3, when the providing site is a customer owned site, according to one embodiment.

FIG. 5 is an exploded view of a providing site illustrated in FIG. 3, when the providing site is an enterprise owned site, according to one embodiment. In particular, FIG. 5 illustrates an enterprise owned type requesting site 306 A, a server 106, a firewall 402, an optional enterprise premise equipment 108 B, a site interconnector 406 and a connection to a POP C through an edge interconnector 502.

In an example embodiment, the providing site 306 A may have one or more servers 106. The providing site 306 A may be an enterprise owned providing site. The providing site 306 A may be designated as a headquarters. The providing site 304 may implement a client and/or server topology. In an example embodiment, the servers may be coupled to the firewall 402 and/or an optional enterprise premise equipment 108 B. The different optional enterprise premise equipment that may be used is described in FIG. 8. The optional enterprise premise equipment 108 B may be coupled to a site interconnector 406. The site interconnector may connect the WAN to the providing site 306 A. The site interconnector 406 that couples the WAN with the server 106 in the providing site 306 A may be termed as a server site interconnector.

The packet from the requesting site 304 may be sent to the optional enterprise equipment 108 B. The optional enterprise premise equipment 108 B may perform a set of optimization functions 2102 on the packets. The packet may then be sent from the optional enterprise premise equipment 108 B to the firewall 402 or vice versa. The firewall 402 may filter the packets. If the packet passes the filtering at the firewall 402, then the packet from the client 104 on the requesting site 304 may be sent to the server 106 on the providing site 306 A through the firewall 402. The site interconnector may be a bridge or a router.

The packet may be sent from the requesting site 304 to the provider site 306 A through a network tunnel. A network tunnel may be created using a tunneling protocol. A tunnel protocol may be one in which a payload protocol is encapsulated by a network protocol. A tunnel protocol may provide a secure path through a network that cannot be controlled by the user. The functionalities at the site interconnector may enable a tunnel protocol to encapsulate the packet with another header to transmit it over a WAN and also to remove the encapsulated packet from the encapsulation and deliver it to the actual recipient. The tunnel may be an IPSec tunnel. A client server link may have an end to end tunnel connecting a client 104 to a server 106 through a tunneling protocol and also each segment on the client server link may have a tunnel connecting the client 104 to the sever 106. For example, the $1^{st}$ conn link may be connected through a tunnel, the router link segment may be connected by another tunnel and the deflect back link may be connected through yet another tunnel.

Figure 6:
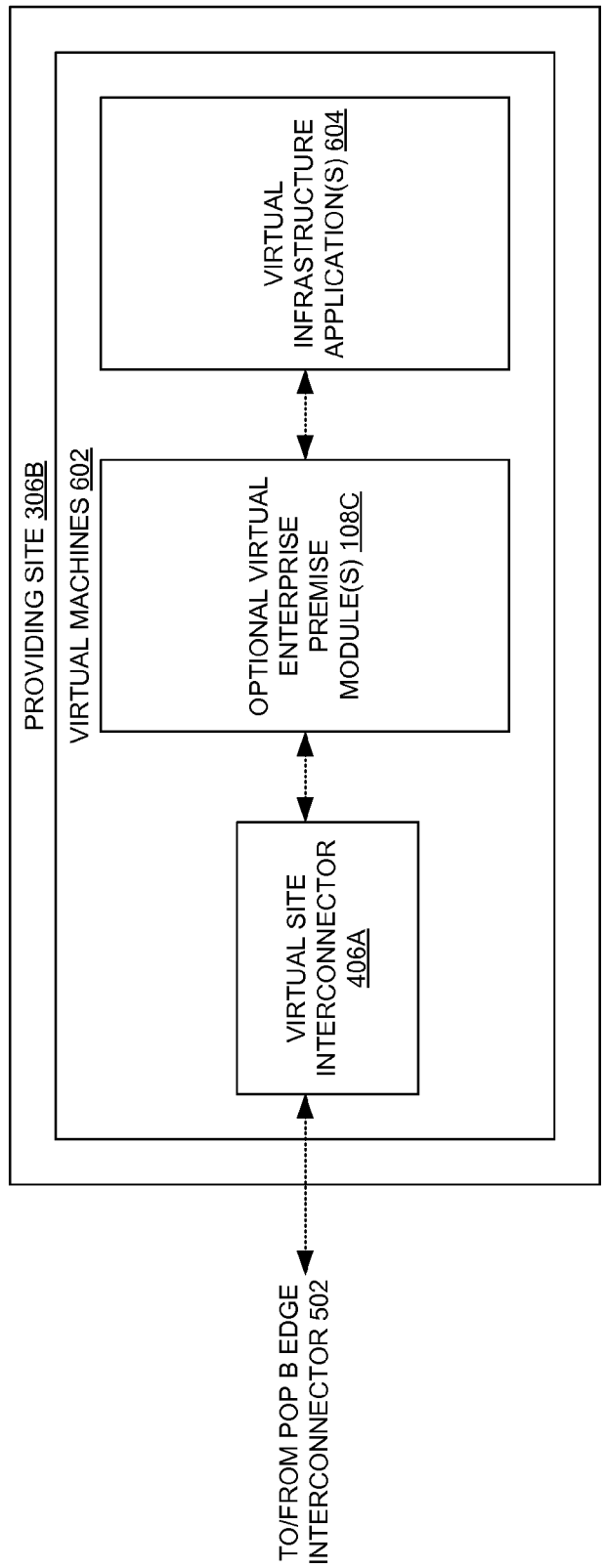
FIG. 6 is an exploded view of a providing site illustrated in FIG. 3, when the providing site is a cloud infrastructure provider site, according to one embodiment.

FIG. 6 is an exploded view of a providing site illustrated in FIG. 3, when the site is a cloud infrastructure provider site, according to one embodiment. In particular, FIG. 5 illustrates a cloud infrastructure provider type providing site 308 B, a virtual infrastructure application 604, an optional virtual enterprise premise equipment 108 C, a virtual site interconnector 406 A, a virtual machine 602 and a connection to a POP through edge interconnector 502.

The cloud infrastructure provider type providing site 306 B may be the headquarters. The headquarters may be a server or a client based on the initiation of the client server connection establishment. The site that initiates the connection establishment may be a client. The server may operate as a client when a server initiates a connection with another server to request information from the other server. The server may also operate as a client when the server responds to a request from the client on the requesting site.

In a cloud infrastructure provider type provider site 306 B, the cloud infrastructure provider may provide a virtual machine 602 on which virtual infrastructure application 604 is operated. The virtual infrastructure application 604 may also be a virtual machine.

The cloud infrastructure provider type provider site 306 B may have one or many virtual infrastructure application 604 running on the virtual machine 602. The virtual machine may be coupled to the requesting site 304 through an optional virtual enterprise premise equipment 108 C and/or a virtual site interconnector 406 A. The virtual site interconnector may function as a branch site interconnector application being run on the virtual machine. The branch site interconnector application may be a branch router or bridge application. The optional virtual enterprise premise equipment 108 C that can be used in the cloud infrastructure provider topology may be different from the optional virtual enterprise premise equipment used in a cloud platform provider and/or an enterprise owned enterprise site types.

Figure 7:
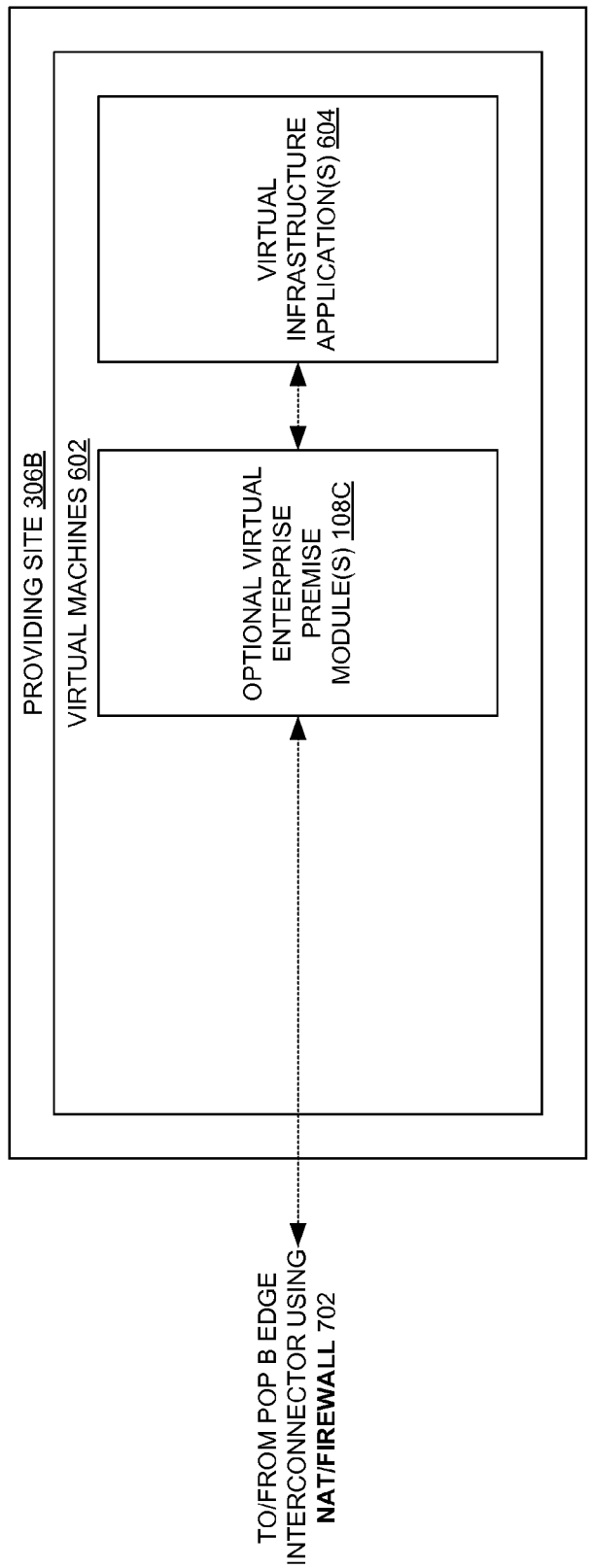
FIG. 7 is an exploded view of a providing site illustrated in FIG. 3, when the cloud infrastructure provider site uses NAT/Firewall routing, according to one embodiment.

FIG. 7 is an exploded view of a providing site illustrated in FIG. 3, when the cloud infrastructure site uses NAT/Firewall routing, according to one embodiment. In particular FIG. 7 illustrates a cloud infrastructure provider type providing site 308 B, a virtual infrastructure application 604, an optional virtual enterprise premise equipment 108 C, a virtual machine 602 and a POP with and edge interconnector having NAT/Firewall functionality 702.

In an example embodiment, at the cloud infrastructure provider type enterprise site a site interconnector may not be configurable to operate based on extended header functionality. When the site interconnector may not be configurable, the deflect back operation may be enabled through a NAT and/or firewall functionality. The NAT or firewall may also enable a link security to the links between the requesting site 304 and the providing site 306. The NAT or firewall functionality may also enable link security over the n-number of link segments between the requesting site 304 and the providing site 306. The NAT or firewall functionality may be implemented in a POP. The NAT may translate a private LAN address into a public address that may be used to represent the LAN over a WAN communication. The NAT or firewall may enable the use of a single IP address to represent all the client or server devices inside a LAN and/or to differentiate between enterprises.

Further in FIG. 6, as described in FIG. 5 the cloud infrastructure provider type providing site 306 B may be designated as the headquarters office and the virtual infrastructure application 604 may be operated in the virtual machine 602. The virtual infrastructure application 604 may also be a virtual machine. The virtual infrastructure applications 604 may be coupled to the requesting site 304 through the virtual optional enterprise premise equipment 108 C. The virtual infrastructure application 604 may be coupled to a virtual optional enterprise premise equipment 108 C. In an example embodiment where the optional virtual interconnector 406 A is not implemented the virtual infrastructure application 604 may be coupled to the POP with NAT or firewall functionalities 702.

Figure 8:
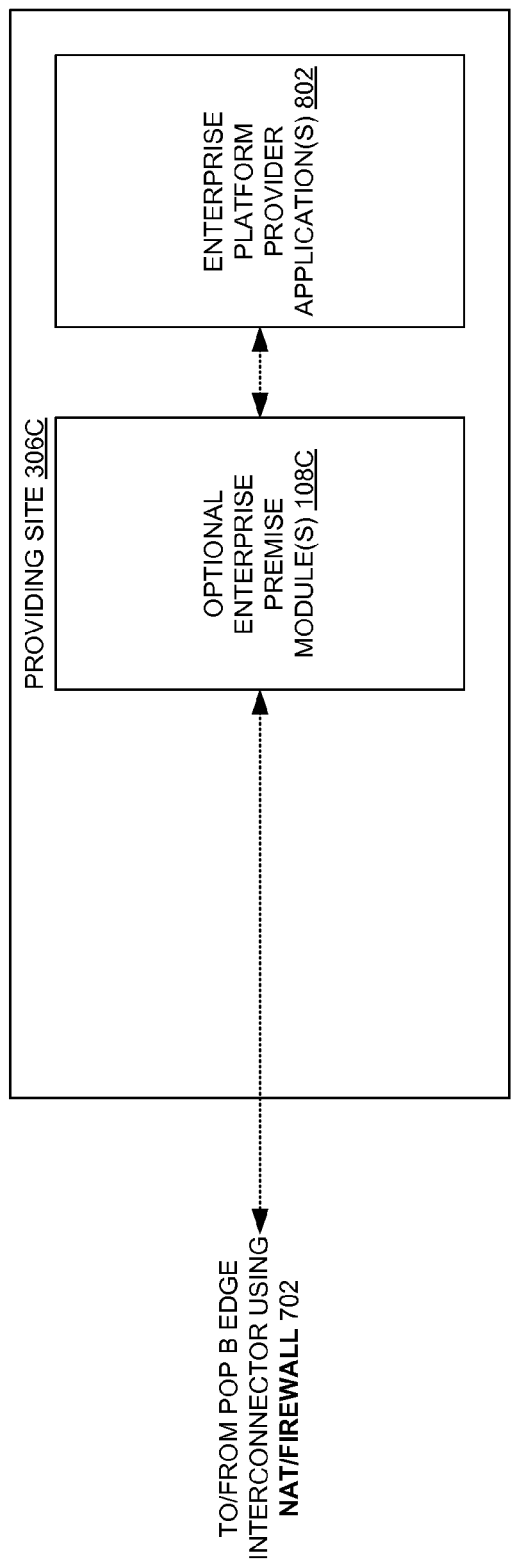
FIG. 8 is an exploded view of a providing site illustrated in FIG. 3, when the providing site is a cloud platform provider site, according to one embodiment.

FIG. 8 is an exploded view of a providing site illustrated in FIG. 3, when the providing site is a cloud platform provider site, according to one embodiment. In particular FIG. 8, illustrates a providing site 306 C, an enterprise platform provider application 802, and an optional enterprise premise module 108 C.

The providing site 306 C may be a cloud platform provider site. The client platform provider providing site 306 C may not have configurable router functionality. The enterprise platform provider application 802 may have to transmit a packet from the providing site 306 C to the requesting site 304 through a NAT and/or Firewall functionality. The NAT and/or Firewall functionality may be implemented in the site interconnector 702 coupling the providing site 306 C to the POP B. The enterprise platform provider application 802 may be coupled to the optional enterprise premise module 108.

The optional enterprise premise module 108 C may include optimization operations. The optional enterprise premise module 108 C may enable optimized data transfer over segment coupling the provider site 306 C to the POP B 110 B. The optional enterprise premise module 108 C may be coupled to the POP B through the interconnectors.

FIG. 9 is a table view illustrating the different topology types and connectivity between the topology types, according to one embodiment. In the table illustrated in FIG. 9, the enterprise owned site type may be designated as a branch or a headquarters. The cloud infrastructure provider and the cloud platform provider site types may be designated as headquarters. The various designation and site type combinations for a client access mode 206 A topology may be branch enterprise owned 204 A, headquarter enterprise owned 204 B, headquarter cloud infrastructure provider 204 C and/or headquarter cloud platform provider 204 D. The various designation and site type combinations for a server access mode 206 B topology may be branch enterprise owned 204 A, headquarter enterprise owned 204 B, headquarter cloud infrastructure provider 204 C and/or headquarter cloud platform provider 204 D.

The table in FIG. 9 indicates the connectivity between the various topology and their respective site designation and type. The possibility of connectivity is determined based on the possibility of a client initiating a connection establishment with a server. In the table shown in FIG. 9, the possibility of a headquarter enterprise owned 204 B, headquarter cloud infrastructure provider 204 C and/or headquarter cloud platform provider 204 D site and designation type initiating a connection establishment with a branch enterprise owned site type may be highly unlikely. For example, Amazon EC2 cloud infrastructure does not initiate any request or client-server connection establishment with a Company X branch office in India. The possibility of a cloud provider contacting a branch office may be highly unlikely. UNLIKELY in FIG. 9 may indicate that a client-server connection may be highly unlikely to be established between the related client and server access modes.

FIG. 10 is a table view illustrating the different premise types illustrated in FIG. 1 that perform service functions, according to one embodiment. In particular, FIG. 10 illustrates a branch optional enterprise premise module 1008 A, a headquarters optional enterprise premise module 1008 B, enterprise owned site type 1002, cloud infrastructure provider site type 1004, cloud platform provider site type 1006.

In an enterprise owned site type 1002, the branch optional enterprise premise modules may include, but not limited to a hardware machine, a virtual machine, a browser plug-in and/or a kernel plug-in. For an enterprise owned site type, the headquarters optional enterprise premise modules may include, but not limited to a hardware machine, a virtual machine and/or a browser plug-in.

In a cloud infrastructure provider site type 1004, the branch optional enterprise premise module may include, but not limited to a virtual machine and/or a kernel plug-in. For a cloud infrastructure provider site type 1004, the headquarters optional enterprise premise module may include, but not limited to a virtual machine and/or a kernel plug-in.

In a cloud platform provider site type 1006, the branch optional enterprise premise module and the headquarters optional enterprise premise module may include, but not limited to optimization applications. The enterprise premise module 108 may offer service operations. The enterprise premise equipment may be included in a segment from the client to the client site interconnector or from the server site interconnector to the server. The enterprise premise module 108 may optimize the above mentioned segments. The enterprise premise module 108 may be optional based on optimization requirements.

The optional enterprise premise module 108 may also include an interconnector functionality and the firewall functionality. If the optional enterprise premise module 109 may include the interconnector functionality, then a physical site interconnector 406 may not be required for routing packets over the service overlay network.

FIG. 11 is a structural view illustrating the format of different example packets transmitted over the system overlay network illustrated in FIG. 1, according to one embodiment. In particular, FIG. 11 illustrates an extended header packet format 1100A, a NAT/Firewall based routing format 1100 B, a DNS based routing packet format 1100 C, an extended header 1102, a network layer header 1110, a transport layer header 1108, a data 1106, a header and data packet 1104, a source address 1120, a destination address 1118, a source port 1116, a destination port 1114, a protocol 1112, a connection identifier (5 tuple) 1101.

The extended header packet format 1100 A may include, but not limited to an extended header 1102, a header and data packet 1104, a connection identifier (5 tuple) 1101. A client-server data may be transmitted over a client-server connection through the extended header packet format 1100A. To transmit the data through the extended header packet format 1100 A, the routers at the enterprise site may have to be configurable. The routers may have to be configured to accept and/or process the extended header packet formats 1100 A. The extended header 1102 in the extended header packet format 1100 A may include, but not limited to a 1st conn header and/or a router tag. In an example embodiment, the router tag may be include the link identifier and $1^{st}$ conn, core routing and/or deflect back tag may include the segment identifier. The 1st conn header may identify the route from the enterprise site to the first POP and the router tag may identify the route from the one enterprise site to the other enterprise site through the POP in the system overlay network illustrated in FIG. 1. For example, router tag identifies the route between client 104 and the server 106. The router tag may also be used to enable the core routing. Core routing may be the routing between the POPs.

The header and data packet 1104 in the extended header packet format 1100A may be termed as a csconn packet. The header of the csconn packet may include a network layer header 1110 and/or a transport layer header 1108. The csconn packet may also include a payload. The payload may be a data 1106 being communicated between a client 104 and a server 106. The data may be transmitted from a client 104 to a server 106. The network layer header 1110 may also be termed as an IP header. The information in the IP header may enable a processor to identify a connection. Every client-server connection may be unique. Each client-server connection may be provided a connection identifier to uniquely identify the connection. The connection identifier 1101 in the IP header may enable the connection identifier module 1930 to determine a connection id 2204. The connection identifier (5 tuple) 1101 may include a source address 1120, a destination address 1118, a source port 1116, a destination port 1114 and/or a protocol 1112.

The source address 1120 may identify the source from which the packet 1100 A originated. The source address 1120 may be a client 104 address. The destination address may identify the destination to which the packet 1100 A is transmitted. The destination address may be a server 106 address. The source address 1120 and/or destination address 1118 may be an IPv4 or IPv6 address. The source port may be a port number that designates the client. The destination port may be a port number of the server. The port may be a software construct specific to an application and/or specific to a process serving as a communications endpoint used by Transport Layer protocols. The protocol may be the transport later protocols used by the client and server to communicate. The protocol may be a TCP protocol or a UDP protocol.

The client-server data may be transmitted over a client server connection through the NAT/Firewall based packet format 1100 and/or the DNS based packet format 1100 C. The NAT/Firewall based packet format 1100 and/or the DNS based packet format 1100 C may be used to transmit client server data when the routers at the enterprise site are not configurable to operate with extended header packet format 1100 A.

The NAT/Firewall based packet format 1100 B and/or the DNS based packet format 1100 C may be a csconn packet format. The csconn packet may be the header and data 1104 illustrated in FIG. 11. The csconn packet may have a csconn header and/or a csconn data as described above. In the NAT/Firewall based packet format 1100 B, the source address and/or the source port in the connection identifier 1120 may be modified for routing. The routing based on NAT/Firewall packet format may be described in an example embodiment illustrated in FIG. 15. In the DNS based packet format 1100 C, the destination address in the connection identifier 1120 may be modified for routing. The routing based on DNS packet format may be described in an example embodiment illustrated in FIG. 16.

FIG. 12 is a table view illustrating the various access protocols used to transmit the example packet illustrated in FIG. 11, according to one embodiment. In particular FIG. 12 illustrates the protocols used to connect to and/or from POPs and to route between POPs 1200, link layer 1202, IP layer 1200.

Link layer may be a layer 2 protocol and the IP (Internet Protocol) layer may be a layer 3 protocol. The type of header in the packets 1100 A, 1100 B and/or 1100 C may vary with the type of protocol used to connect to and/or from the POPs and to route between POPs. The client-server may have an enterprise site to first POP segment (1st conn), core routing segment and/or a POP to enterprise site segment as illustrated in FIG. 3. Each segment may be use a layer 2 or a layer 3 protocol. The different layer 2 protocols include, but not limited to MPLS, VPLS, VLAN, L2TP and/or SSTP. The different layer 3 protocols may include, but not limited to IPSec, SSL, GRE and/or IP in IP. An example embodiment of the different protocols may be illustrated in FIG. 13.

FIG. 13 is a structural view illustrating the double header format to securely transmit the example packet illustrated in FIG. 11 over the system overlay network illustrated in FIG. 1, according to one embodiment. In particular, FIG. 13 illustrates a GRE packet 1300 A, a GRE over an IPsec packet 1300 B, a QinQ packet 1300 C, an MPLS packet 1300 D, a VPLS packet 1300 E, a csconn packet 1104, a GRE header 1304, an IPsec header 1306, a Q tag 1308, a QinQ tag 1310, a MPLS label 1312, a VPLS label 1314.

FIG. 13 may further describe the packet 1100 A in FIG. 11. Packet 1100 A may include a csconn packet 1104 and/or an extended header 1102. The csconn packet 1104 may include a payload data 1106, a TCP header 1108 and/or a IP header 1110 as illustrated in FIG. 11. A client-server communication may only include a csconn packet 1104. The csconn packet may be transmitted over the connection established between the client and the server. However, to transmit the csconn packet 1104 through the overlay network (e.g., Network A 308, path A 102), the csconn packet 1104 may have to be appended with an extended header. The extended headers may be appended only if the enterprise sites include configurable routers which can receive extended headers and/or operate based on extended header. The extended header may enable the csconn packet 1104 to be securely transmitted through a tunnel over the system overlay network illustrated in FIG. 1 and FIG. 3. As illustrated in FIG. 3 the system overlay network (e.g., network A 308) may have an end to end network link between the requesting site 304 and providing site 306. The system overlay network may also include segments (e.g., segment 1 310, segment 2 312, segment 3 314) that connect the requesting site 304 to the providing site 306 through a number of POPs 110 A-C. The packet may be transmitted from end to end between the requesting site 304 and providing site 306 through a tunnel. The packet may be transmitted through segment of the end to end link through another tunnel which secures the csconn packet 1104 transmission over each segment. There may be two tunnels. The first tunnel may be between the requesting site 304 and the providing site 306 link. The second tunnel may be over each segment in the link. The two tunnels may be represented in the extended header by two types of headers. This may be termed as the double header packet format. The two types of header included in the extended header may be a router tag header and a $1^{st}$ conn, core routing and/or deflect back header. The router tag header may correspond to the end to end link and the $1^{st}$ conn, core routing and/or deflect back router may correspond to the tunnel over each segment in the link as illustrated in FIG. 3. The end to end link and each segment may be an L2 or an L3 link based on the site interconnector in the link and/or segments. If the site interconnector may be a bridge then L2 protocol may be used and if the site interconnector may be a router the L3 protocol may be used.

The GRE packet 1300 A may illustrate a packet with an L3 router tag in the extended header 1102. The GRE packet 1300 A may include a csconn packet 1104 and an extended header 1102. The extended header may include a router tag and no $1^{st}$ conn tag, core routing and/or deflect back tag. The router tag may be a GRE packet header 1304. GRE may be an IP layer protocol. The GRE header router tag 1304 may correspond to a L3 tunnel through which the packet may be transmitted end to end between the enterprise sites.

The GRE over IPsec packet 1300 B may illustrate a packet with an L3 router tag and a L3 $1^{st}$ conn tag in the extended header 1102. The router tag may be a GRE header router tag 1304 and the $1^{st}$ conn tag may be an IPsec packet header 1306. The csconn packet may be appended with a GRE header resulting in a GRE packet 1300 A. The GRE packet may be appended with an IPsec header to form the GRE over IPsec packet 1300 B. The $1^{st}$ conn IPsec header 1306 may correspond to the transmission of a csconn packet 1104 to a first POP from the enterprise site through a secured IPsec tunnel. The router tag may correspond to an L3 tunnel between the enterprise sites through which the packet may be transmitted over the end to end link.

The QinQ packet 1300 C may illustrate a packet with an L2 router tag in the extended header 1102. The L2 router tag may be a QinQ tag 1310. The csconn packet 1104 may be appended with a QinQ tag 1310 to form the QinQ packet 1300 C. The QinQ protocol may also be termed as the 802.1ad (Double tag). The QinQ tag may have an outer tag and an inner tag. The inner tag may be used as router tag and the outer tag may be used as $1^{st}$ conn, core routing or deflect back tag for routing csconn packets from the client 104 to the server 106 through the POPs in the service overlay network. If the outer VLAN can send all the packets from the client site to the first POP, then the packet may not need a separate $1^{st}$ conn header. The VLAN tag represented as Q tag may be used to route the packet from source to the destination, if the VLAN sends all the packets from the client site to the first POP. IPsec may be used as the $1^{st}$ conn header, if the outer tag cannot be used.

The MPLS packet 1300 D may illustrate a packet with an L2 router tag in the extended header 1102. The L2 router tag may be a MPLS label 1312. The MPLS label may be appended to the csconn 1104 packet to form the MPLS packet 1300 D. The MPLS packet may have an MPLS label stack. The MPLS label stack may be used as the $1^{st}$ conn, core routing and/or deflect back tag. If the MPLS link may route all the packets from the client site to the first POP, then the packet routed between client and server through the POPs may not need a $1^{st}$ conn header. The MPLS label stack may also be used as the router tag. IPsec may be used as $1^{st}$ conn header, when the MPLS label cannot be used.

The VPLS packet 1300 E may illustrate a packet with an L2 router tag in the extended header 1102. The L2 router tag may be a VPLS label 1314. The VPLS label may be appended to the csconn packet 1104 to form the VPLS packet 1300 E. The VPLS packet 1300 E may also have other header bits. The VPLS packet 1300 E may have a VC (Virtual Circuit) label. The labels in VPLS may be used to represent the router tag and/or the $1^{st}$ conn, core routing and deflect back tags.

In all the cases mentioned above, the $1^{st}$ conn header may be optional if all the packets from the enterprise site may only transmit to the first POP. If there may be only one network path from enterprise site to first POP, then all the packets may initially go through the first POP. In the above mentioned scenario the packets may not have a $1^{st}$ conn header. The core routing and/or the deflect back routing may use similar routing packets 1300 A-E to route the csconn packet from the client 104 site to the server 106 site. The different routing protocols that may be used to route the csconn packet from the client 104 to the server 106 may be described in FIG. 12. When extended headers may not be used a DNS packet format 1100 B and/or a NAT/Firewall packet format 1100 C may be used to transmit a csconn packet to the server 106.

Figure 14:
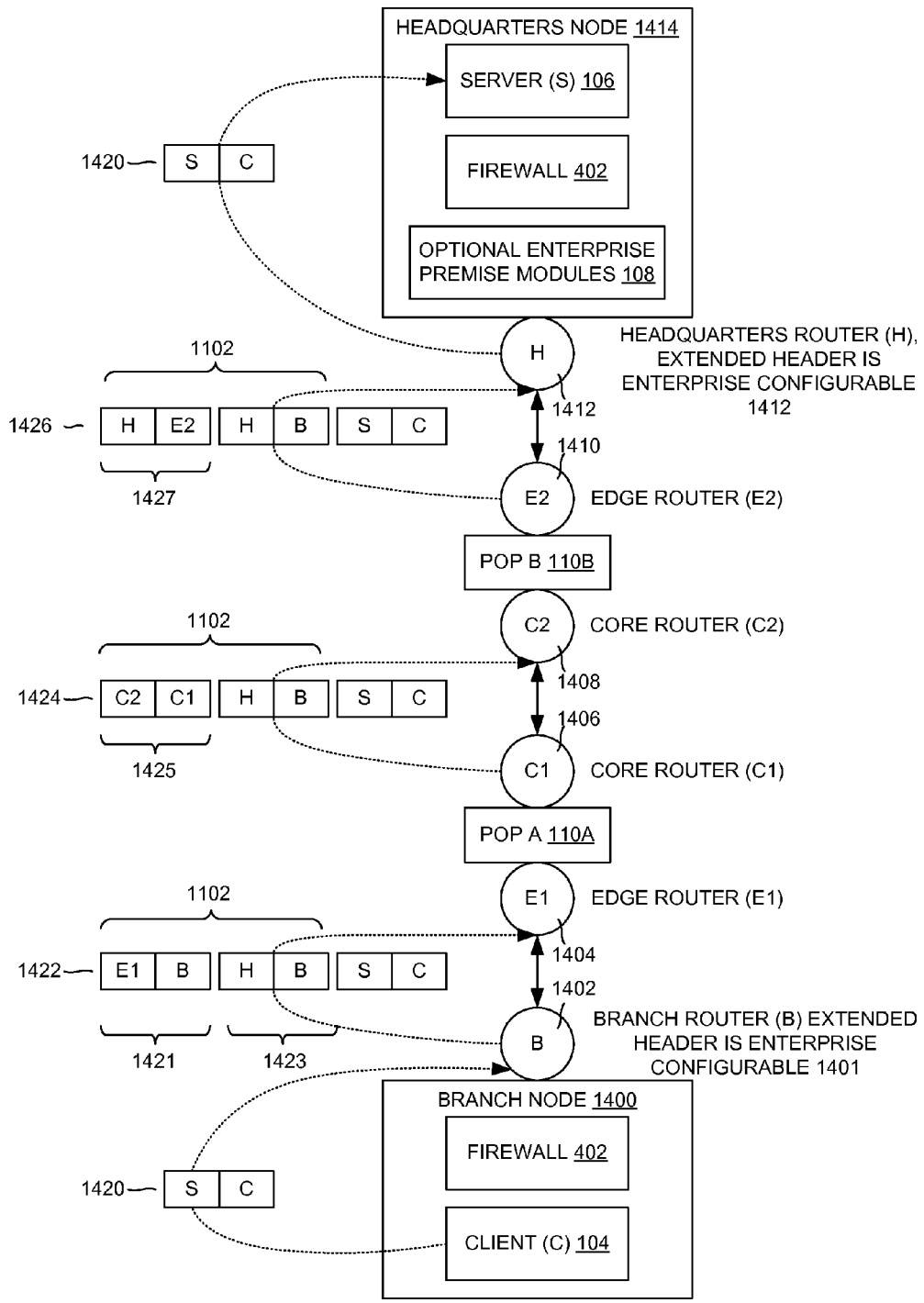
FIG. 14 is a network view illustrating a packet transmission over an example system overlay network having customer owned site types, according to one embodiment.

FIG. 14 is a network view illustrating a packet transmission over an example system overlay network having enterprise owned site types, according to one embodiment. In particular, FIG. 14 illustrates a branch site 1400, a headquarters site 1414, a client 104, a firewall 402, an optional enterprise premise equipment 108, a server 106, a branch router 1402, a edge bridge 1404, a core bridge 1406, a core router 1408, an edge router 1410, a headquarters router 1412, a POP A 110 A, a POP B 110 B, a csconn packet 1402, a extended header packet 1424, another extended header packet 1424, yet another extended header packet 1426, a extended header 1102, a 1st conn tag 1421, a router tag 1423, a core router tag 1425 and a deflect back header 1426.

In an example embodiment, the branch site 1400 topology may be a client topology. The branch site may have a client 104 and/or a firewall 402. In an example embodiment illustrated in FIG. 14 the client may be represented as C and the server 106 may be represented as S. In an example embodiment, the headquarters site 1414 topology may be a server topology. The headquarters site 1414 may have a server S 106, a firewall 402 and/or optional enterprise premise equipment 108. The client 104 may send a packet to the server 106. The client C may be the source and may be identified by the source IP address and the source port in the csconn packet 1104 header. The server S may be the destination and may be identified by the destination IP address and destination port in the csconn packet 1104 header.

In an example embodiment, the branch client site router (used as branch router 1402 here after) and the headquarters server site router (termed as headquarters router 1412 hereafter) may be configurable to operate on extended header format packets 1100 A. The client 104 may route a data to a server 106 through an extended header based routing. The extended header based routing may route the data from the client 104 to the server 106 through an extended header format packet 1100 A. In an example embodiment, the branch client and the headquarters server may establish the network connection with one another prior to the branch site directing the packet to the first POP over the first segment of the link. In an example embodiment, a set of branch clients of the branch site and a set of headquarters servers of the headquarters site may establish a plurality of separate network connections with one another. In an example embodiment the system is may be configured to direct a plurality of packets, each associated with a different one of the plurality of network connections, simultaneously over at least one of the first segment 310, the second segment 312, and the third segment 314 of the link. In an example embodiment, the network connection may be one of one or more separate network connections.

In an example embodiment, the client C 104 sends a csconn packet 1420 to a server 106 through a branch router 1402. The csconn packet may have a source address and the destination address. The source may be a client 104 and the destination may be a server 106. The source address may be the address of the client 104 represented as C and the destination address may be the address of the server 106 represented as S, in an example embodiment. The csconn packet 1420 may be sent to the branch router 1402.

The branch router 1402 appends the extended header 1102 to the csconn packet 1420. The extended header 1102 may have a router tag 1423 and a 1st conn tag 1421. The destination site address may be the address of the headquarters router 1412. In an example embodiment illustrated in FIG. 14, the address of the headquarter router 1412 may be represented as H and the branch router may be represented as component 1412 in FIG. 14. The router tag 1423 in the extended header 1102 may indicate the route from the branch router 1402 to the headquarters router 1412. In an example embodiment illustrated in FIG. 14, the router tag 1423 may include a source address and a destination address of the branch and the headquarters. In the case of an L3 site interconnector model, the extended header may be GRE header. The source address of the router tag 1423 appended by the branch router 1402 may be the branch router address B. The destination address of the router tag 1423 appended by the branch router 1402 may be the headquarter router address H. The 1st conn tag 1421 in the extended header 1102 may indicate the route from the client 104 to the first POP A 110A. In an example embodiment illustrated in FIG. 14, the 1st conn tag 1421 may include a source address and a destination address. The source address of the 1st conn tag 1421 appended by the branch router 1402 may be the branch router address B. The destination address of the 1st conn tag 1421 appended by the branch router 1402 may be the edge bridge represented by E1.

The packet 1420 may reach the server S 106 thorough multiple routes on the Internet. However, the 1st conn tag, may route the packet 1420 through the service overlay network with the POPs. This path may enable acceleration as a service. In an example embodiment, the branch router 1402 routes the packet 1422 to the server 106 through the POP A 110A. The branch router 1402 may route the extended header packet 1422 to the edge bridge 1404. If the 1st conn 1421 tag may not be present in the extended header 1102, the packet 1422 may be routed to the headquarters router 1412 through a route not including the POPs (not shown). In an example embodiment illustrated in FIG. 1, the csconn packet may be routed to the destination through path 101 instead of path 102, in the absence of an extended header, 1st conn tag and/or the router tag.

The edge router 1404 may send the packet 1422 to the core router 1406 through the POP A 110 A. The router tag 1423 may not be modified by the core router 1406. The router tag may be used by the server 106 to reconstruct the route back and/or send a packet to the client 104 through the branch router 1402 through the source and destination address in the router tag 1423. The core bridge 1406 may replace the 1st conn tag 1421 in the extended header 1102 of the packet 1422. The core router 1406 may replace the 1st conn tag 1421 with a core routing tag 1425 which routes the packet to the server 106 through the POP B 110 B. The core router tag 1425 appended by the core bridge 1406 may include a source address as the core bridge address C1 and a destination address as the core router 1408 address C2. The extended header packet including the core router tag may be represented by extended header packet 1424. The core bridge 1406 routes the extended header packet 1424 to the server 106 through POP B 110 B. The core router 1406 routes the extended header packet 1424 to the destination address C2 in the core router tag 1425.

The core router 1408 may send the packet 1424 to the edge router 1410 through the POP B 110 B. The edge router 1410 may not modify the router tag 1423. The edge router 1410 may replace the core router tag 1425 in the extended header 1102 of the packet 1424. The core router tag 1425 may be replaced by a deflect back tag 1427. The deflect back tag 1427 may include a source address. The source address of the deflect back tag 1427 may be the edge router address E2, as the edge router 1410 may be the source that routes the packet to the next destination. The deflect back tag 1427 may include a destination address. The destination address in the deflect back tag 1427 may be headquarter router address H. The extended header packet including the deflect back tag 1427 may be represented by extended header packet 1426. The edge router 1410 may route the extended header packet 1426 to the headquarters router 1412.

The headquarter router 1412 may be the destination site address H in the router tag 1423. Once the csconn packet 1420 embedded in the extended header packet 1426 reaches the destination site address H, the headquarter router 1412 may remove the extended header 1102 from the packet 1426. The headquarters router 1412 may use the destination address S in the csconn packet 1420 to route the packet 1420 to the server 106. The extended header 1102, the deflect back tag 1427, the core routing tag 1425, the 1st conn tag 1421 and/or the router tag 1423 may be used to route a packet back from the server 106 to the client 104 through the POPs in the service overlay network illustrated in FIG. 14.

When the headquarters responds to a request from a branch the packets are transmitted from the headquarters to the branch site. In an example embodiment, when the headquarters sends a packet to the branch, the server address S may represent the source address and the client address C may represent the destination address in the extended header and/or csconn header packets sent from the headquarters server to the branch.

The request from the branch to the headquarters for an application may be processed by any of the enterprise service instances 1904 A-N in the POP system 110 and/or the optional enterprise premise module 108. The POP system 110 and/or the optional enterprise premise module 108 may route the packet back to the branch once it has been processed at any of the optional enterprise premise module 108 and/or the POP system 110. If the request from the branch may be processed by any of the optional enterprise premise module 108 and/or the POP system 110 in the network path, the request packets may not be routed to the headquarters server from the POP system 110 and/or the optional enterprise premise module 108 at which the request has been processed.

The segments in the network may also be an L2 segment. If the segment may be an L2 segment the site interconnectors and the core and edge interconnectors in the network may be a bridge. The optional enterprise premise equipment 108, the POP A 110 A and/or the POP B 110 B may provide service functions. The optional enterprise premise equipment 108, the POP A 110 A and/or the POP B 110 B may apply an of n-number optimization and security functions 2102 on the csconn packet payload. The operation of the POP may be described in detail in FIG. 19.

Figure 15:
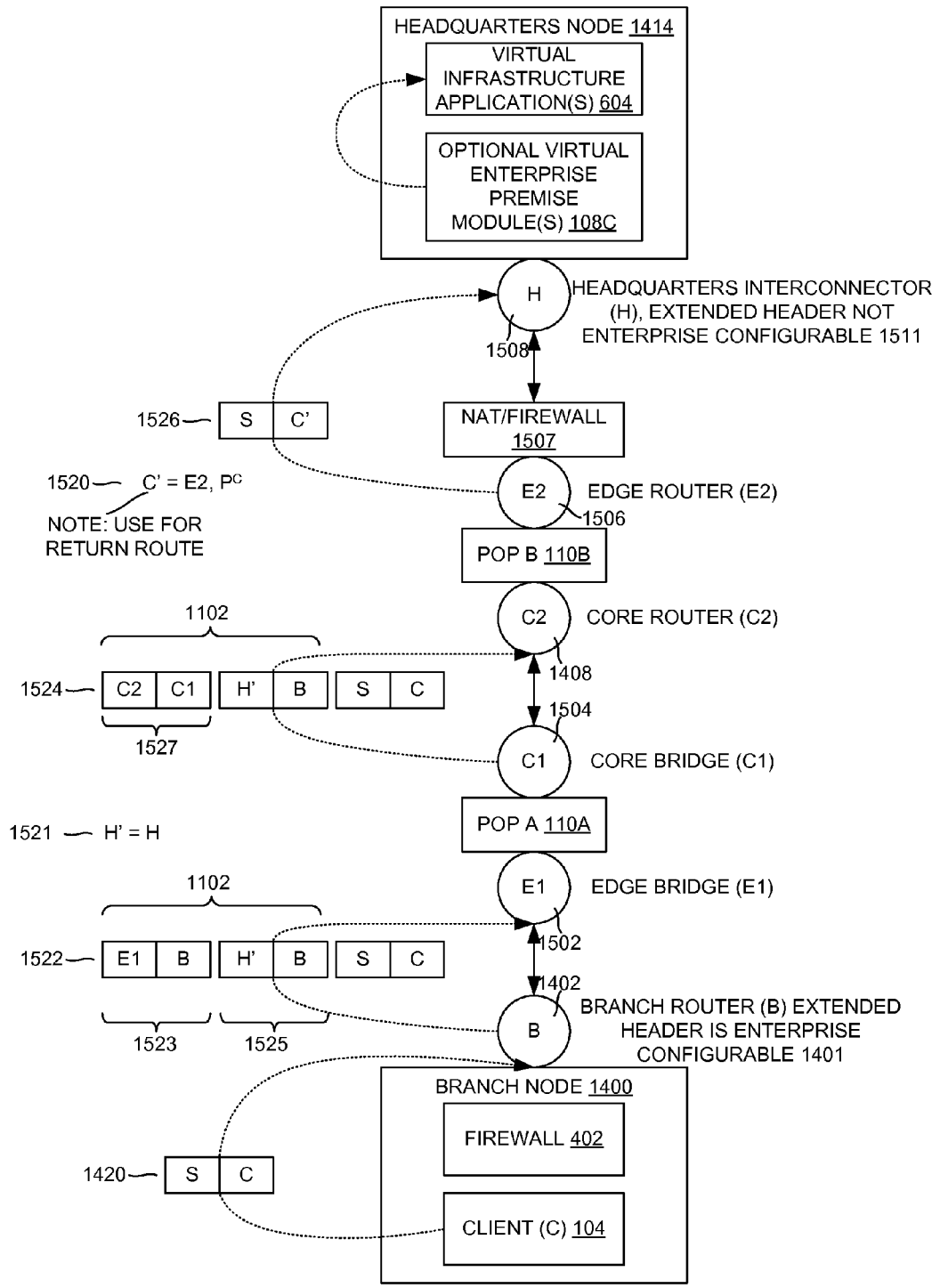
FIG. 15 is a network view illustrating a packet transmission over an example system overlay network having a customer site type with restricted routing functions, according to one embodiment.

FIG. 15 is a network view illustrating a packet transmission over an example system overlay network having an enterprise site type with restricted routing functions, according to one embodiment. In particular, FIG. 15 illustrates a branch site 1400, a headquarters site 1414, a client 104, a firewall 402, an virtual enterprise premise equipment 108 C, a virtual infrastructure application 604, a branch router 1402, a edge router 1502, a core router 1504, another core router 1408, an edge router 1506, a NAT/Firewall 1507, a headquarters router 1508, a POP A 110 A, a POP B 110 B, a csconn packet 1420, another csconn packet 1526, a extended header packet 1522, another extended header packet 1524, a extended header 1102, a 1st conn tag 1523, a router tag 1525 and a core router tag 1527.

In an example embodiment, the branch site 1400 topology may be a client topology. The branch site may have a client C 104 and/or a firewall 402. In an example embodiment, the headquarters site 1414 topology may be a server topology. The headquarters site 1414 may have a virtual infrastructure application S 604 and/or a virtual enterprise premise equipment 108. The client 104 may send a packet to the server 604.

In an example embodiment, the branch client site router (used as branch router 1402 here after) may be configurable to operate on extended header format packets 1100 A. The headquarters server site router (termed as headquarters router 1508 hereafter) may not be enterprise configurable. The headquarter router may not recognize and/or operate on extended header packet formats 1100 A. The client 104 may route a data to a virtual application infrastructure 604 through an extended header based routing and/or a NAT/Firewall based routing. The extended header based routing may route the data from the client 104 to the server 106 through an extended header format packet 1100 A. The NAT/Firewall based routing may route a packet through a csconn packet 1100 B.

In an example embodiment, the client C 104 sends a csconn packet 1420 to a server 604 through a branch router 1402. The csconn packet may have a source address and the destination address. The source may be a client 104 and the destination may be a virtual application infrastructure 106. The source address may be the address of the client 104 represented as C and the destination address may be the address of the virtual application infrastructure 106 represented as S, in an example embodiment. The csconn packet 1420 may be sent to the branch router 1402.

The branch router 1402 appends the extended header 1102 to the csconn packet 1420. The extended header 1102 may have a router tag 1525 and a 1st conn tag 1523. The destination site address may be the address of the headquarters router 1508. In an example embodiment illustrated in FIG. 15, the address of the headquarter router 1508 may be represented as H and the headquarter router may be represented as component 1508 in FIG. 15. The router tag 1525 in the extended header 1102 may indicate the route from the branch router 1402 to the headquarters router 1508. In an example embodiment illustrated in FIG. 15, the router tag 1423 may include a source address and a destination address. The source address of the router tag 1525 appended by the branch router 1402 may be the branch router address B. The destination address of the router tag 1525 appended by the branch router 1402 may be an address H' 1521 which may uniquely identify the headquarter router address H. The address H' 1521 may enable the packet to be routed to the H router through the POP A 110 A and POP B 110 B in the network. The address H' 1521 may correspond to the headquarters router address H or an internal enterprise operated IP address. The 1st conn tag 1523 in the extended header 1102 may indicate the route from the client 104 to the first POP A 110 A. In an example embodiment illustrated in FIG. 14, the 1st conn tag 1523 may include a source address and a destination address. The source address of the 1st conn tag 1523 appended by the branch router 1402 may be the branch router address B. The destination address of the 1st conn tag 1523 appended by the branch router 1402 may be the edge router represented by E1.

The packet 1420 may reach the server S 106 through multiple routes on the Internet. However, the 1st conn tag 1523, may route the packet 1420 through the service overlay network with the POPs. This path may enable acceleration as a service. In an example embodiment, the branch router 1402 routes the packet 1522 to the virtual application infrastructure 604 through the POP A 110 A. The branch router 1402 may route the extended header packet 1522 to the edge router 1502. If the 1st conn tag 1523 may not be present in the extended header 1102, the packet 1522 may be routed to the headquarters router 1508 through a route not including the POPs (not shown). In an example embodiment illustrated in FIG. 1, in the absence of an extended header, 1st conn tag and/or the router tag, the csconn packet may be routed to the destination through path 101 instead of path 102.

The edge router 1502 may send the packet 1522 to the core router 1504 through the POP A 110 A. The router tag 1525 of the extended header packet 1522 may not be modified by the core router 1504. The router tag may be used by the virtual application infrastructure 604 to reconstruct the route back and/or send a packet to the client 104 through the branch router 1402 through the source and destination address in the router tag 1525. The core router 1504 may replace the 1st conn tag 1523 in the extended header 1102 of the packet 1522. The core router 1504 may replace the 1st conn tag 1525 with a core router tag 1527 which routes the packet to the virtual application infrastructure 604 through the POP B 110 B. The core router tag 1527 appended by the core bridge 1504 may include a source address as the core router address C1 and a destination address as the core router 1508 address C2. The extended header packet including the core router tag may be represented by extended header packet 1524. The core router 1504 routes the extended header packet 1524 to the virtual application infrastructure 604 through POP B 110 B. The core bridge 1504 routes the extended header packet 1524 to the destination address C2 in the core router tag 1527. The core router 1408 sends the packet 1524 to the edge router 1506.

The edge router 1506 may receive the extended header packet 1524. The edge router 1506 may remove the extended header 1102 from the extended header packet 1524. The edge router 1506 may map a destination site address H' in router tag 1525 to a destination site address H. The edge router 1506 may have a router table which enables to map the destination address H' to the destination headquarter router address H. The edge router may not append an extended header 1102 to the csconn packet 1526 being routed to the headquarters router 1508. The edge router 1506 may not append an extended header to the csconn packet 1526 as the headquarters router 1508 may not be configurable to understand and/or operate based on extended header 1102.

The edge router 1506 may have a NAT/Firewall 1507. The NAT/Firewall 1507 may be a hardware device at the edge router 1506 or a software module on the edge router 1506. The NAT/Firewall 1507 may also be inside the POP B 110 B. The NAT/Firewall 1507 may modify the source address C of the csconn packet 1420. The NAT/Firewall 1507 at the edge router 1506 may replace the source address C of the csconn packet 1420 with an address C' 1520. The source address C' 1520 may include the edge router address E2 and a port number PC designated to uniquely identify the client 104 through a client address C. The source address C' 1520 provided by the NAT/Firewall 1507 may enable the server 106 to send a packet back to the client C through the POPs in the service overlay network illustrated in FIG. 15.

The headquarters router 1508 may receive the csconn packet 1526 with the modified source address C' 1520. The headquarters router may route the csconn packet 1526 to the virtual infrastructure application 604 based on the destination address S of the server 106.

When the headquarters responds to a request from a branch the packets are transmitted from the headquarters to the branch site. In an example embodiment, when the headquarters sends a packet to the branch, the server address S may represent the source address and the client address C may represent the destination address in the extended header and/or csconn header packets sent from the headquarters server to the branch.

The request from the branch to the headquarters for an application may be processed by any of the enterprise service instances 1904 A-N in the POP system 110 and/or the optional enterprise premise module 108. The POP system 110 and/or the optional enterprise premise module 108 may route the packet back to the branch once it has been processed at any of the optional enterprise premise module 108 and/or the POP system 110. If the request from the branch may be processed by any of the optional enterprise premise module 108 and/or the POP system 110 in the network path, the request packets may not be routed to the headquarters server from the POP system 110 and/or the optional enterprise premise module 108 at which the request has been processed.

The segments in the network may also be an L2 segment. If the segment may be an L2 segment the site interconnectors and the core and edge interconnectors in the network may be a bridge. The virtual enterprise premise equipment 108 C, the POP A 110 A and/or the POP B 110 B may provide service functions. The optional enterprise premise equipment 108, the POP A 110 A and/or the POP B 110 B may apply an of n-number optimization and security functions 2102 on the csconn packet payload. The operation of the POP may be described in detail in FIG. 19.

Figure 16:
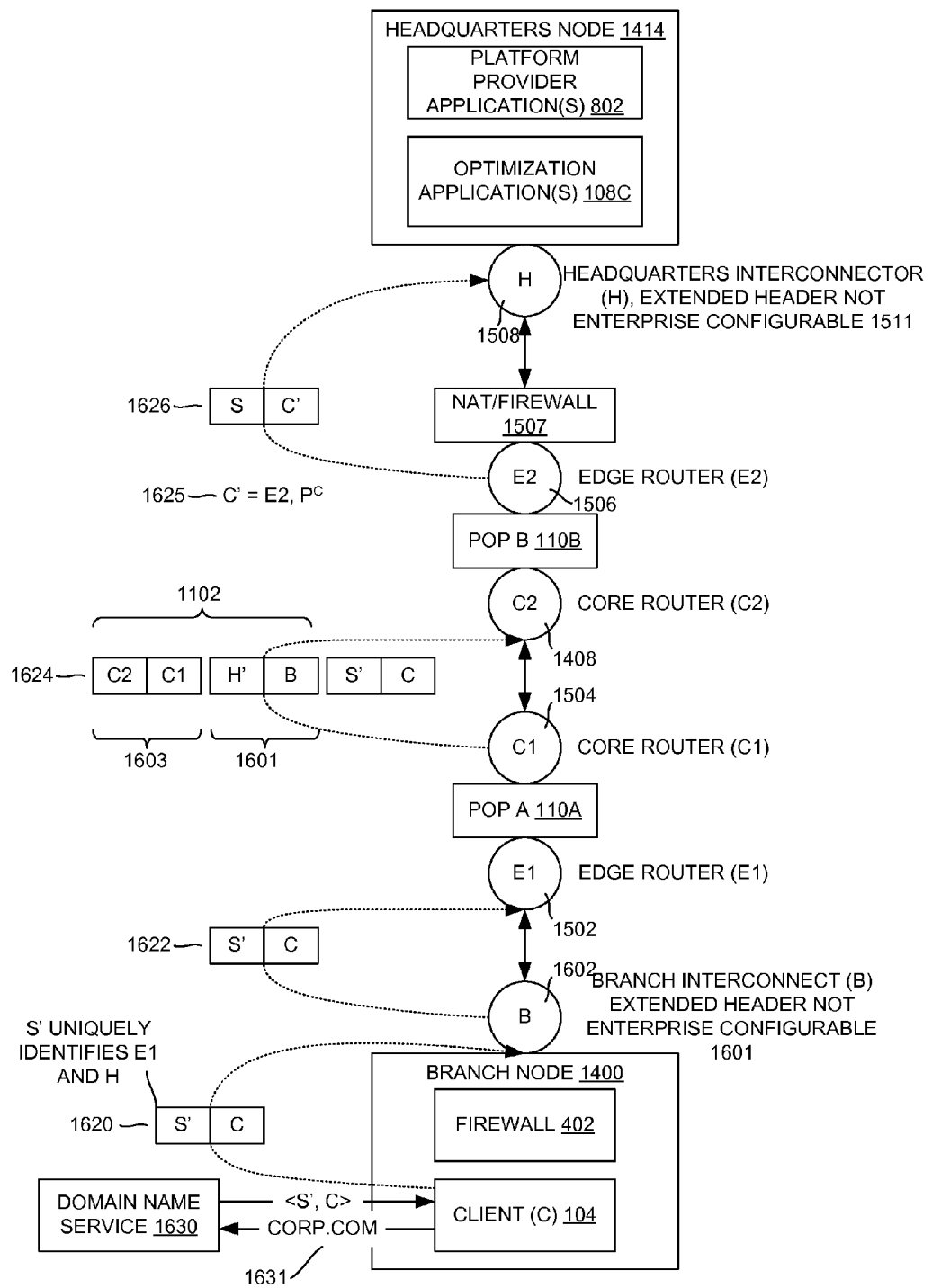
FIG. 16 is a network view illustrating a packet transmission over another example system over network having a customer site type with restricted routing functions, according to one embodiment.

FIG. 16 is a network view illustrating a packet transmission over another example system over network having an enterprise site type with restricted routing functions, according to one embodiment. In particular, FIG. 14 illustrates a branch site 1400, a headquarters site 1414, a client 104, a firewall 402, an optimization application 108 C, a platform provider application 802, a branch router 1602, a edge router 1502, a core router 1504, another core router 1408, an edge router 1506, a NAT/Firewall 1507, a headquarters router 1508, a POP A 110 A, a POP B 110 B, a csconn packet 1620, another csconn packet 1626, a extended header packet 1624, an extended header 1102, a router tag 1621 and a core router tag 1527.

In the example embodiment illustrated in FIG. 16, the branch router 1602 and the headquarter router 1508 may not be enterprise configurable to operate using extended header packet formats 1100 A. In an example embodiment illustrated in FIG. 16, the client C may route a packet to the platform provider application 802 through a DNS based routing. In DNS based routing the client 104 may route through a DNS packet format 1100 C packet to the client C. The client C sends a query to the database server (e.g., domain name server (DNS) 1630) for an address of the server 106. The DNS returns an address S' to the client. The address S' uniquely identifies the platform provider application 802 which may be a server. The client may send a csconn packet 1620 to the branch interconnector 1602. The csconn packet 1620 may include a client address C as the source address and a server address S' which uniquely identifies the platform provider application S as the destination. If there are more than one client at the branch site 1400, each client will be assigned unique S' based on the server S address. The unique S' address maps S' to the server address S. The unique S' destination address also identifies the next route as the E1 edge router address. The S' address enables the packet 1620 to be routed to the server 106 through the POPs in the system overlay network. The branch router 1602 may send the csconn packet 1620 to the edge router 1502.

In an example embodiment, the DNS server 1630 may be a database server communicatively coupled with the branch client and may be configured to receive from the branch client 104, a target destination for the packet and provide a unique Internet Protocol (IP) address to the branch client based on the target destination, the unique IP address may uniquely encode the first segment identifier, the link identifier, and the connection identifier.

The edge router 1502 may send the packet 1622 to the core router 1504 through the POP A 110 A. The core router 1504 may append the packet 1622 with an extended header 1102. The extended header appended by the core router 1504 illustrated in FIG. 16 may include a router tag 1601 and a core routing tag 1603. The router tag 1601 may include a destination router address H' which may be mapped to the headquarters router address H. The H' address may also be an internal enterprise operation IP address. The router tag 1601 may also include a source address B of the branch router. The core routing tag may have the IP address of the core routers between which the packet 1624 may be routed. The core router 1504 sends the packet 1624 to the core router 1408. The core router 1408 sends the packet 1524 to the edge router 1506 through the POP B 110 B.

The edge router 1506 may receive the extended header packet 1624. The edge router 1506 may remove the extended header 1102 from the extended header packet 1624. The edge router 1506 may map a destination site address H' in router tag 1525 to a destination site address H. The edge router 1506 may have a router table which enables to map the destination address H' to the destination headquarter router address H. The edge router may not append an extended header 1102 to the csconn packet 1626 being routed to the headquarters router 1508. The edge router 1506 may not append an extended header to the csconn packet 1526 as the headquarters router 1508 may not be configurable to understand and/or operate based on extended header 1102.

The edge router 1506 may have a NAT/Firewall 1507. The NAT/Firewall 1507 may be a hardware device at the edge router 1506 or a software module on the edge router 1506. The NAT/Firewall 1507 may also be inside the POP B 110 B. The NAT/Firewall 1507 may modify the source address C of the csconn packet 1620. The NAT/Firewall 1507 at the edge router 1506 may replace the source address C of the csconn packet 1420 with an address C'. The source address C' may include the edge router address E2 and a port number PC designated to uniquely identify the client 104 through a client address C. The source address C' provided by the NAT/Firewall 1507 may enable the server 106 to send a packet back to the client C through the POPs in the service overlay network illustrated in FIG. 16. The edge router may also modify the destination address S'. The S' address may be mapped to the platform provider application address S before the packet 1626 is routed to the headquarters router 1508.

The headquarters router 1508 may receive the csconn packet 1626 with the modified destination address C'. The headquarters router may route the csconn packet 1626 to the platform provider applications 802 based on the destination address S of the server 106.

When the headquarters responds to a request from a branch the packets are transmitted from the headquarters to the branch site. In an example embodiment, when the headquarters sends a packet to the branch, the server address S may represent the source address and the client address C may represent the destination address in the extended header and/or csconn header packets sent from the headquarters server to the branch.

The request from the branch to the headquarters for an application may be processed by any of the enterprise service instances 1904 A-N in the POP system 110 and/or the optional enterprise premise module 108. The POP system 110 and/or the optional enterprise premise module 108 may route the packet back to the branch once it has been processed at any of the optional enterprise premise module 108 and/or the POP system 110. If the request from the branch may be processed by any of the optional enterprise premise module 108 and/or the POP system 110 in the network path, the request packets may not be routed to the headquarters server from the POP system 110 and/or the optional enterprise premise module 108 at which the request has been processed.

The segments in the network may also be an L2 segment. If the segment may be an L2 segment the site interconnectors and the core and edge interconnectors in the network may be a bridge. The virtual enterprise premise equipment 108 C, the POP A 110 A and/or the POP B 110 B may provide service functions. The optional enterprise premise equipment 108, the POP A 110 A and/or the POP B 110 B may apply an of n-number optimization and security functions 2102 on the csconn packet payload. The operation of the POP may be described in detail in FIG. 19.

FIG. 17 is a table view illustrating example access protocols used to transmit the packet illustrated in FIG. 11 over different segments between different enterprise site types and/or enterprise site designations, according to one embodiment. In particular, FIG. 17 illustrates segments 1706, segment 1 310, segment 2 312, segment 3 314, communication protocol 1704, example link layer protocol 1708, example internet layer protocol 1710, various endpoint combinations 1702, 1712, 1722, 1732, 1742, 1752, 1762, 1772 and 1782.

In an example embodiment, all the segments 1706 in the system overlay network may be illustrated in FIG. 3. In an example embodiment, the segments may be a link layer protocol (L2) segment or an internet layer protocol (L3) segment. Segment 1 310, segment 2 312 and/or segment 3 314 may be a L2 or L3 segment. In an example embodiment, if the segment may be an L2 segment the site interconnector, edge interconnector and/or the core interconnector connecting the link segment may be a bridge or a L2 interconnector. In an example embodiment, if the segment may be an L3 segment the site interconnector, edge interconnector and/or the core interconnector connecting the link segment may be a router or a L3 interconnector. The interconnectors may also be a router function or a bridge function.

In an example embodiment, segment 1 310 may communicatively couple the requesting site 304 to the first POP from the requesting site (e.g., POP A 110 A) as illustrated in FIG. 3. Segment 1 may also be termed as the $1^{st}$ conn segment. In an example embodiment, the segment 2 312 may communicatively couple the POP systems in the system overlay network. For example segment 2 312 may couple POP A 110 A to POP B 110 B as illustrated in FIG. 3. The segment 2 312 may be termed as core routing segment. Segment 2 312 may couple the POP systems through the core interconnectors. In an example embodiment, the segment 3 may communicatively couple the POP to the providing site 306. The providing site 306 may implement a server topology. For example, segment 3 may couple POP B 110 B to the providing site 306 as illustrated in FIG. 3.

The communication protocol 1704 may be configured to transmit the packet over the segments. The communication protocol 1704 may include an example link layer protocol 1708 and/or an example internet layer protocol 1710. The link layer protocol 1708 may be used if the segment may be a layer 2 segment. The internet layer protocol 1710 may be used if the segment is a layer 3 segment. The various protocols may be used to transmit packets over the segments.

The different protocols used to transmit a packet over the system overlay network may vary based on the endpoints. The endpoints may include the requesting site 304 and the providing site 306. The requesting site 304 and the providing site 306 may implement a client 104 and/or server 106 topology. The endpoints may be designated as a headquarters or a branch site. The end points may also be an enterprise owned, cloud infrastructure provider and/or the cloud platform provider site types.

In an example embodiment, the protocol used to transmit packets over the segment 2 in all end point combinations, 1712, 1722, 1732, 1742, 1752, 1762, 1772 and 1782 may be any one of all the link layer protocols or any one of the IP layer described in FIG. 12. In an example embodiment, a link coupling a branch enterprise owned site and a headquarter enterprise owned site may have segments as described earlier. The link coupling the branch enterprise owned site and a headquarter enterprise owned site may be illustrated as 1702 in FIG. 17. The packets transmitted over segment 1 may have an extended header 1102 including a router tag and a $1^{st}$ conn tag. A packet may be transmitted over segment 1 between the branch enterprise owned site and a headquarter enterprise owned site through any one of all the link layer protocols or any one of all the IP layer protocols illustrated in FIG. 12. Over segment 3 between the branch enterprise owned site and a headquarter enterprise owned site the packets the packets may be transmitted through any one of all the link layer protocols or any one of all the IP layer protocols illustrated in FIG. 12. When the site interconnectors between the branch enterprise owned site and a headquarter enterprise owned site may not be configured to operate through extended header, a DNS and/or NAT/firewall based routing may be employed to transmit the packet as illustrated in FIG. 15 and FIG. 16.

In an example embodiment, if a segment communicatively couples a POP to an enterprise owned site, a packet may be transmitted over the segment through any one of all the link layer protocols or any one of all the IP layer protocols illustrated in FIG. 12.

In an example embodiment, if a segment communicatively couples a POP to a cloud infrastructure provider site, a packet may be transmitted over the segment through one of all the link layer protocols. The layer 3 protocols that may be used to transmit the packets over the segment 1 between the POP to the cloud infrastructure provider site may include all the IP layer protocols described in FIG. 12. If the interconnectors that route the packets between the POP and the cloud infrastructure provider are not configurable, then a DNS and/or NAT/firewall protocol may be used to transmit the packet as illustrated in FIG. 15 and FIG. 16.

In an example embodiment, if a segment communicatively couples a POP to a cloud platform provider site, a packet may be transmitted over the segment through a DNS protocol illustrated in FIG. 16.

Figure 18:
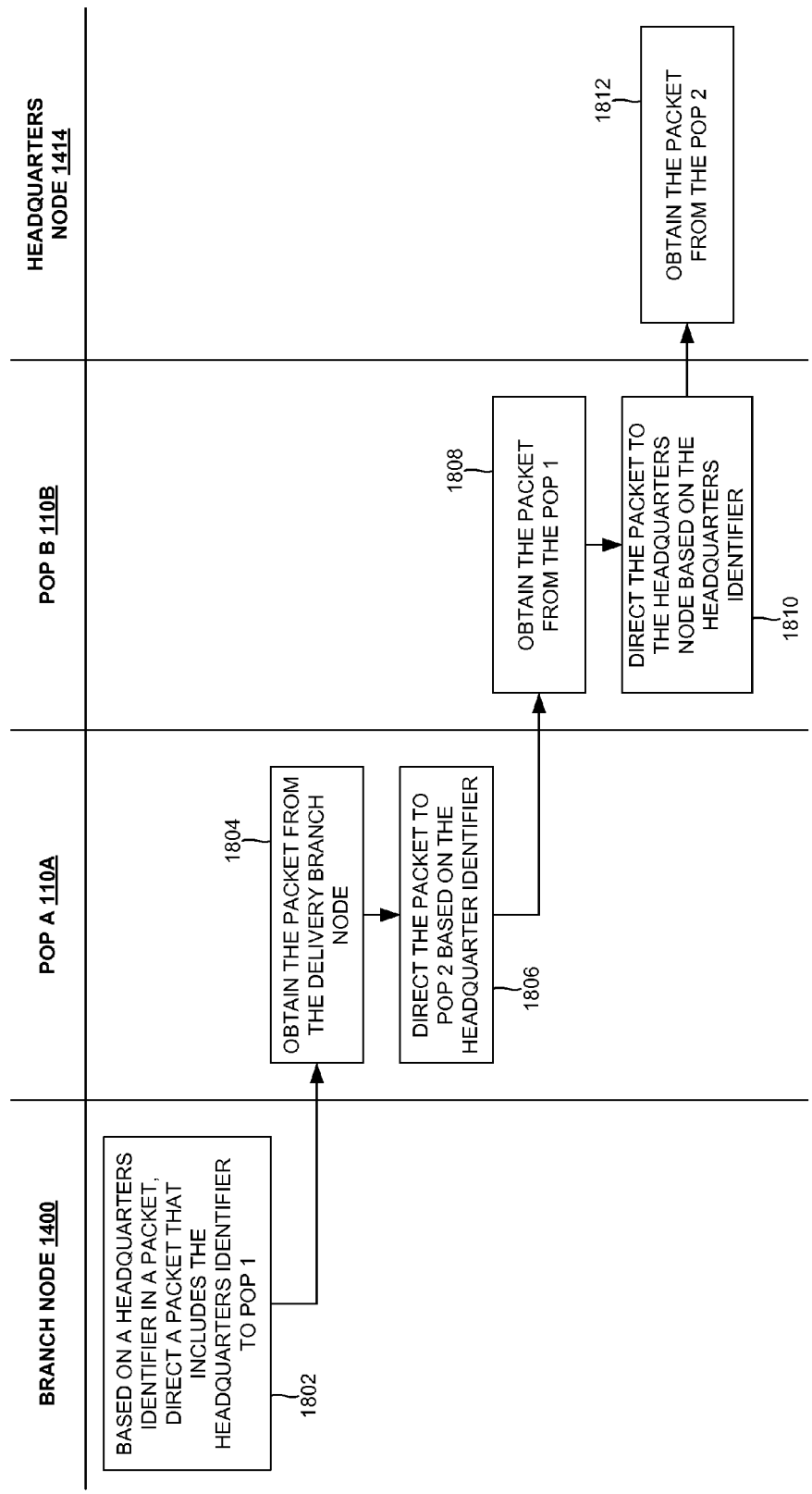
FIG. 18 is a flow diagram illustrating the packet transmission over the system overlay network illustrated in FIG. 1.

FIG. 18 is a flow diagram illustrating the packet transmission over the system overlay network illustrated in FIG. 1, in a example embodiment. In particular FIG. 18 illustrates a branch node 1400, a POP A 110 A, a POP B 110 B, a headquarters node 1414, a set of operations 1802, 1804, 1806, 1808, 1810 and/or 1812 that route a packet from the branch node 1400 to the headquarters node 1414 shown by.

In operation 1802 a packet at a branch node 1400 may be directed to a POP A 110 A based on a headquarters identifier in the packet, in an example embodiment. In operation 1804 the packet directed from branch node 1400 may be received by the POP A 110 A. In operation 1806, the packet that POP A 110 A may have received from branch node 1400 may be forwarded from the POP A 110 A to the POP B 110 B. In operation 1806, the packet may be forwarded from the POP A 110 A to the POP B 110 B based on the headquarters identifier in the packet. The headquarters identifier may be determined through the extended header 1102 and/or the header in the csconn packet 1104. In operation 1808, the POP B 110 B may receive the packet from the POP A 110 A. In operation 1810, the POP B 110 B may forward the packet from POP B 110 B to the headquarters node 1414 based on the headquarters identifier in the packet being forwarded. In operation 1812, the headquarters node may receive the packet from branch node 1400 forwarded to headquarters node 1414 from the POP B 110 B. In an example embodiment, the headquarters identifier enables the packet to be forwarded from the branch node 1400 to the headquarters node 1414 and/or over each segment between the branch node 1400 and headquarters node 1414. The segments may include a link between the branch node 1400, the POP A 110 A, the POP B 110 B and/or headquarters node 1414 in an embodiment illustrated in FIG. 18.

In an example embodiment, a packet at the branch node 1400 may include a headquarters identifier. In an example embodiment, the headquarters identifier may be included in the extended header 1102 of the packet 1422 as illustrated in FIG. 14. The headquarters identifier may also be included in the csconn packet 1420 illustrated in FIG. 14. The headquarters identifier may include a destination headquarters address as illustrated in 1420 and/or 1423 of FIG. 14. The headquarters identifier may also include a destination address of the 1$^{st}$ conn tag 1421, core routing tag 1425 and/or deflect back route tag 1427 illustrated in FIG. 14. The headquarters identifier may enable the routing of the packet from the requesting site 304 to the providing site 306 and/or also over each segment (e.g., segment 1 310, segment 2 312, segment 3 314) forming the path between requesting site 304 and providing site 306 as illustrated in FIG. 3.

Figure 19:
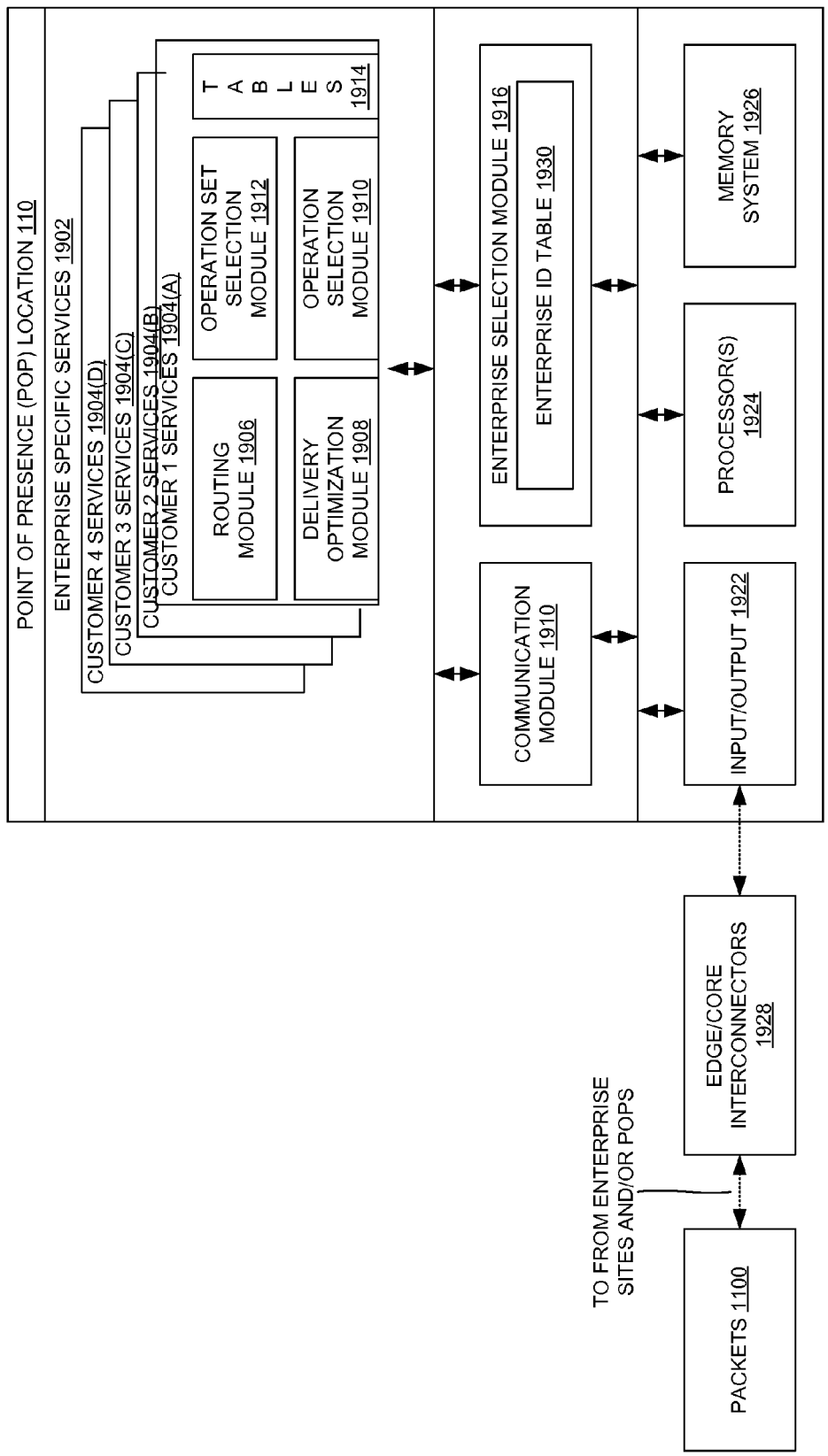
FIG. 19 is an exploded view of a point of presence system and the service flow through the point of presence.

FIG. 19 is an exploded view of a point of presence system and the service flow through the point of presence. In particular, the system in FIG. 19 illustrates a point of presence location 110, enterprise specific services 1902, enterprise services 1904 (A-N), an operation selection module 1910, an operation set selection module 1912, a delivery optimization module 1908, a routing module 1906, a communication module 1920, an enterprise selection module 1916, a tables module 1914, an enterprise id table 1930, an input/output interface 1922, a processor 1924, a memory system 1926, an edge/core interconnector 1928, a packet 1100.

In an example embodiment, the packet 1100 may be a request sent from the requesting client 104 to the server 106. The packet may also be response to a request from the providing site 104 to the requesting site 102. The packet 1100 may have an information which enables the routing of the packet from the client 104 to the server 106 over the path B 102 through the n-number of POPs 110 (A-N) and the optional enterprise premise equipments 108 A-B. In an example embodiment, the packet 1100 may have an extended header. In an example embodiment, the packet 1100 may be a layer 2 or layer 3 packet. For example, the packet 1100 may be a GRE packet, an IPSec packet, an IPinIP packet, a QinQ packet, a MPLS packet, etc. In one or more embodiments, the packet 1100 may have a connection identification number (CSID). In one or more embodiments, the connection identifier may be identifying a client-server connection. For example, a connection identification number 10999 may identify a TCP connection between the POP A 110 and the POP C 110(C). In an example embodiment, the packet 1100 may be sent to an edge/core interconnector 1928.

In an example embodiment, the edge/core interconnector 1928 may receive a packet 1100 and transfer the packet 1100 to the input/output interface 1922 of the POP system 110. In yet another embodiment, the edge/core interconnector 1928 may receive a packet 1100 from the input/output interface 1922 of the POP system 110 and transfer it to a core or branch router. The edge/core interconnector 1928 may be an edge router, a core router or a bridge. The edge/core interconnector 1928 may also be an application which performs the routing or bridging functions. In an example embodiment, the edge/core interconnector may also be inside the POP system 110. In one or more embodiments, the edge/core interconnector may be coupled to the input/output interface 1922 of the POP system 110, a branch router and/or a core router.

In an example embodiment, the input/output interface 1922 may be a hardware interface that receives the packet 900 from the edge/core interconnector 1928. In another example embodiment, the input/output interface 1922 may be a software interface on an operating system. The input/output interface 1922 may transfer the packet 1100 received from edge/core interconnector to a communication module 1920. In yet another embodiment, the input/output interface 1922 may receive a packet 1100 from the enterprise specific services module 1902 of the POP 110 and may transfer the packet 1100 to the edge/core interconnector 1928. In an example embodiment, the input/output interface 1922 may be coupled to the communication module 1920 and/or an edge/core interconnector 1928.

In an example embodiment, the communication module 1920 may be transferring the packet 1100 received from the input/output module 1922 to the other modules in the POP and vice versa. The communication module may segment the header 1102, 1110 and/or 1108 from the packet 1100. The communication module 1920 may send the headers to the different modules. Once the optimization operations are performed on the packets by the remaining modules and a new header 1102, 1110 and/or 1108 has been attached the packet may be sent to the communication module. The communication module may send the packet to the input/output interface 1922 to transmit the packet over the network to the server 106. The communication module 1920 may be a hardware or software module. In one or more embodiments, the communication module 1920 may be coupled to an enterprise selection module 1916 and/or input/output interface 1922.

The enterprise selection module 1916 may determine an enterprise identification number based on the header 1102, 1110 and/or 1108 of the packet 1100. The enterprise selection module may have an enterprise id table 1930. The enterprise selection module 1916 may search through the enterprise id table 1930 to find an enterprise id (CSID) that matches the address in the extended header 1102. In an example embodiment, the enterprise selection module 1916 may be a software module. The enterprise selection module 1916 may be coupled to a communication module 1920, a table module 1914 and/or an enterprise specific service module 1902. In an example embodiment, the enterprise selection module may be configured to identify in a memory system the enterprise associated with the packet, based on the link identifier.

In one or more embodiments, the enterprise specific services module 1902 may have several instances of an enterprise specific service 1904 (A-N). Each service may perform a set of operations identified in FIG. 21. For example, an instance of the enterprise specific service may be enterprise 1 services 1904 A. In an example embodiment, the enterprise 1 service instance may have an operation selection module 1910, an operation set selection module 1912, a delivery optimization module 1908 and/or a routing module 1906. Each instance of the enterprise specific service 1904(A-N) may perform an optimization operation, described in FIG. 21, on the packet 1100 based on an enterprise id, a connection identification and the POP identification. In one or more embodiments, the enterprise specific service instance 1904 (A-N) may be a virtual machine, a processor, a hardware device, a thread and/or a procedure. All the modules in the enterprise specific module 1902 may also be a virtual machine, a processor, a hardware device, a thread and/or a procedure.

The table module 1914 may provide an optimization operation information, an enterprise identification information, a connection identification and/or POP identification information to the other modules in the enterprise specific service module 1902. In an example embodiment, the table module 1914 may have several tables. The different tables in the table module 1914 may be described in detail in FIG. 20. In one or more embodiments, the table module 1914 may be coupled to the operation selection module 1910, the operation set selection module 1912, the delivery optimization module 1908 and/or the routing module 1906. In an example embodiment, the different tables in the table module 1914 may be an IP table.

In one or more embodiments, the operation set selection module 1912 may provide a set of optimization operations to be performed on the packet 1100. The operation set selection module 1912 may provide the set of optimization operations to the operation selection module 1910. In one or more embodiments, the set of optimization operations to be performed on the packet 1100 may be specific to each enterprise and/or each connection. In one or more embodiments, the enterprise may be identified by the enterprise identification number and the connection may be identified by the connection identification number. The operation set selection module 1912 may be coupled to the operation selection module 1910, the delivery optimization module 1908, the table module 1914 and/or routing module 1906. The set of optimization and/or security operations that may be performed on the packet 1100 may be described in FIG. 21.

The operation selection module 1910 may receive a set of operations 2102 from the operation set selection module 1912. The set of operations may include, but not limited to optimization and security operations. The operation set selection module 1912 determines the set of operations 2102 based on each connection and each enterprise. The connection and the enterprise may be identified through a connection identifier and an enterprise identifier respectively. The optimization selection module 1910 may select a specific operation based on the POP on which the operation is to be performed. The selection process will be described with an example in FIG. 22. The operation selection module 1910 may be coupled to the operation set selection module 1912 the delivery optimization module 1908, the table module 1914 and/or routing module 1906. In an example embodiment, the set of delivery optimization operations associated with the packet may include, but not limited to a data compression function, a data decompression function, a protocol proxy function, an encryption function, and a decryption function.

The delivery optimization module 1908 may apply the operation selected by the operation selection module 1910. The operation performed by the delivery optimization module 1908 may be selected by the operation selection module 1910. A different optimization and security operation may be applied based on each enterprise, each enterprise's connection and the POP on which the operation is executed. The delivery optimization module 1908 may be coupled to the operation selection module 1910, the operation set selection module 1912, the table module 1914 and/or routing module 1906

The routing module 1906 may be adding extended headers to the packet after the optimization operations have been applied on the packet. In an example embodiment, the extended header 1102 may also be added before the packet is being routed from the POP. The routing module 1906 may receive information from tables in the routing module 1906. The routing module 1906 may have a NAT and/or a firewall functionality. The NAT and/or firewall functionality may be used when the routers at the destination site are not provisioned to route based on extended headers. The router module 1906 may be a hardware device or a software application. The router module 1906 may be coupled to the operation selection module 1910, the delivery optimization module 1908, the table module 1914 and/or operation set selection module 1912.

The processor 1924 may receive instructions from the modules in the POP 110. The instructions from the modules in the POP 110 may be executed in the processor 1924. For example, the instructions of the routing module 1906 to calculate extended header for the next route of the packet may be executed in the processor 1924 and the results may be stored in the memory 1926. The modules may access the memory 1926 to obtain the calculated value. The processor may be a hardware device, a virtual machine or an application on an operating system. The processor 1924 may be coupled directly to the memory 1926, the input/output interface 1922, the communication module 1920 and/or the enterprise selection module 1916. The processor may be indirectly coupled to all the modules in the POP system 110.

The memory 1926 may store the instructions from the different modules in the POP system 110. The memory system may be a read only memory, random access memory, a cache memory or a virtual memory. The memory 1926 may also be used to store packet information. The memory 1926 may be coupled to all the modules in the POP system 110 and/or the processor 1924.

Figure 20:
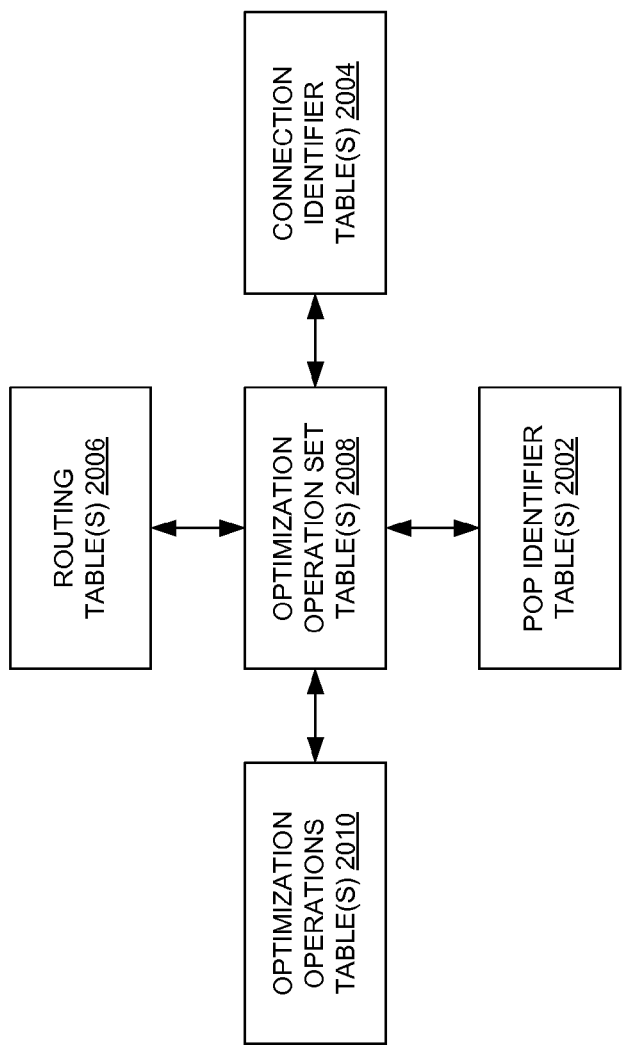
FIG. 20 is an exploded view of the tables module illustrated in FIG. 19.

FIG. 20 is an exploded view of the tables module illustrated in FIG. 19. In particular FIG. 20 illustrates an optimization operation table 2010, a routing table 2006, a connection identifier table 2004, a POP identifier table 2002 and an optimization operation set table 2008. All the above mentioned tables may be hardware or a software implementation.

The connection identifier table 2004 may provide a connection identification number (connection id) based on the csconn packet header. In an example embodiment, the csconn header may have a source address, a destination address, a source port, a destination port and the protocol information. The source address, the destination address, the source port, the destination port and the protocol information may be termed as 5 tuple. Each combination of the 5 tuple in the csconn packet may correspond to a unique connection id. In an example embodiment, the connection identifier table 2004 may have a list of all the possible 5 tuple combinations which are mapped to a unique connection id. In one or more embodiments, the connection identifier table 2004 may receive an input from the communication module 1920 illustrated in FIG. 19. The input may be a header 1102, 1108 and/or 1110 of a packet 1100. The connection identifier table 2004 may send the connection id to the operation set selection module 1912. The connection identifier table 2004 may be coupled to the optimization operation table 2010, the routing table 2006, the POP identifier table 2002 and/or the optimization operation set table 2008.

The POP identifier table 2002 may provide a POP identification number (POP id). In an example embodiment, the POP id may indicate which POP the packet 1100 is in. The POP id may determine what optimization and security operation may be applied on the packet 1100. The POP identifier table 2002 may provide the POP id to the operation set selection module 1912 and/or operation selection module 1910. The different optimization and security operations applied on the packet 1100 may be unique for each POP id. For example, if POP A 110 A illustrated in FIG. 1 performs a protocol optimization gzip compression, then POP B 110 B may not perform the same gzip compression on the packet 1100 again. Instead at POP B 110 B a gzip decompress operation may be performed. The operations applied on the packet 1100 vary with the POP id. The POP identifier table 2002 may be coupled to the optimization operation table 2010, the routing table 2006, the connection identifier table 2004 and/or the optimization operation set table 2008.

The optimization operation set table 2008 may provide a set of optimization and security operations to the operation set selection module 1912. The set of optimization and security operations may be described in FIG. 21. The set of optimization and security operations may enable acceleration as a service. In an example embodiment, the optimization operation set table 2008 may have a list of optimization and security operations which are mapped to a connection id and an enterprise id. The set of optimization and security operations may be different for each enterprise and each connection. The optimization operation set table 2008 may be coupled to the optimization operation table 2010, the routing table 2006, the connection identifier table 2004 and/or the POP identifier table 2002.

The optimization operations table 2010 may receive the set of optimization and security operations from the operation set selection module 1912. Based on a POP identifier, connection identifier and/or the enterprise identifier the operation selection module 1910 selects specific optimization operations from the set of optimization and security operations provided by the operation set selection module 1912. The operation selection table 2010 may have a list of the set of optimization and security operations to be performed on the packet 1100 for each enterprise and each connection. In an example embodiment, the set of optimization and security operations may then be mapped to a specific set of optimization and security operations based on the pop id received from the pop identifier table 2002.

The routing table 2006 may include a list of routes to send the packet 1100 to the next POP system 110 and/or the enterprise site. The enterprise site may be a client 104 and/or a server 106. The list of routes may be an address of the next POP system 110, the client 104 and/or the server 106. The address may be an IP address or a MAC address. The MAC address may be a physical address of the POP system 110, the client 104 and/or the server 106. Based on the received header information the table may help in determining the next address the packet should be sent to. The router table 2006 may also have NAT functionality. The routing table may have port numbers mapped to the client 104 and/or the server 106. The port number may uniquely identify the client 104 or the server 106. The NAT functionality may be used when a router may not be configured to route based on the extended headers.

FIG. 21 is a table view illustrating a list of services performed by the point of presence illustrated in FIG. 19. In particular FIG. 21 illustrates the optimization and security services 2102, the protocol dependent service 2104 and protocol independent services. FIG. 1 illustrates an optional enterprise premise equipment 108 A-B and n-number of POPS 110 A-N along the path B 102. The POPs 110 A-N may function as a proxy of the actual server. The functions of the actual sever may be split and spread across different POPs along the network. The POPs 110 A-N may perform the actual sever functions in part or as a whole. The server functions performed by the POPs 110 A-N may enable acceleration as a service. The functions performed by the POPs may reduce latency and/or increase bandwidth. The functions performed by the POPs may be an optimization and/or security function. The functions may also be termed as services.

The different optimization and security services 2102 that may be performed on the POPs 110 A-N will be described. The services may be divided into two classes. One class of optimization and security services may be protocol dependent 2104 and the other class may be protocol independent 2106.

The protocol independent services 2104 may include, but not limited to TCP optimization, Link Multiplexing/aggregation, stream level compression and/or link optimization. The TCP optimization operation may optimize the window size of the number of unacknowledged packets that may be sent to the receiver. The window size may be varied based on the latency and bandwidth of the link. In an example embodiment, the link optimization operation may be a gzip compression. The link optimization, stream level compression and/or the link multiplexing may enable compression of the data being transmitted over the link. The protocol dependent services 2106 may include, but not limited to protocol optimization. In an example embodiment, the protocol optimization operations may include, but not limited to CIFS, coalescing, MAPI, PRINT and/or HTTP operations.

Figure 22:
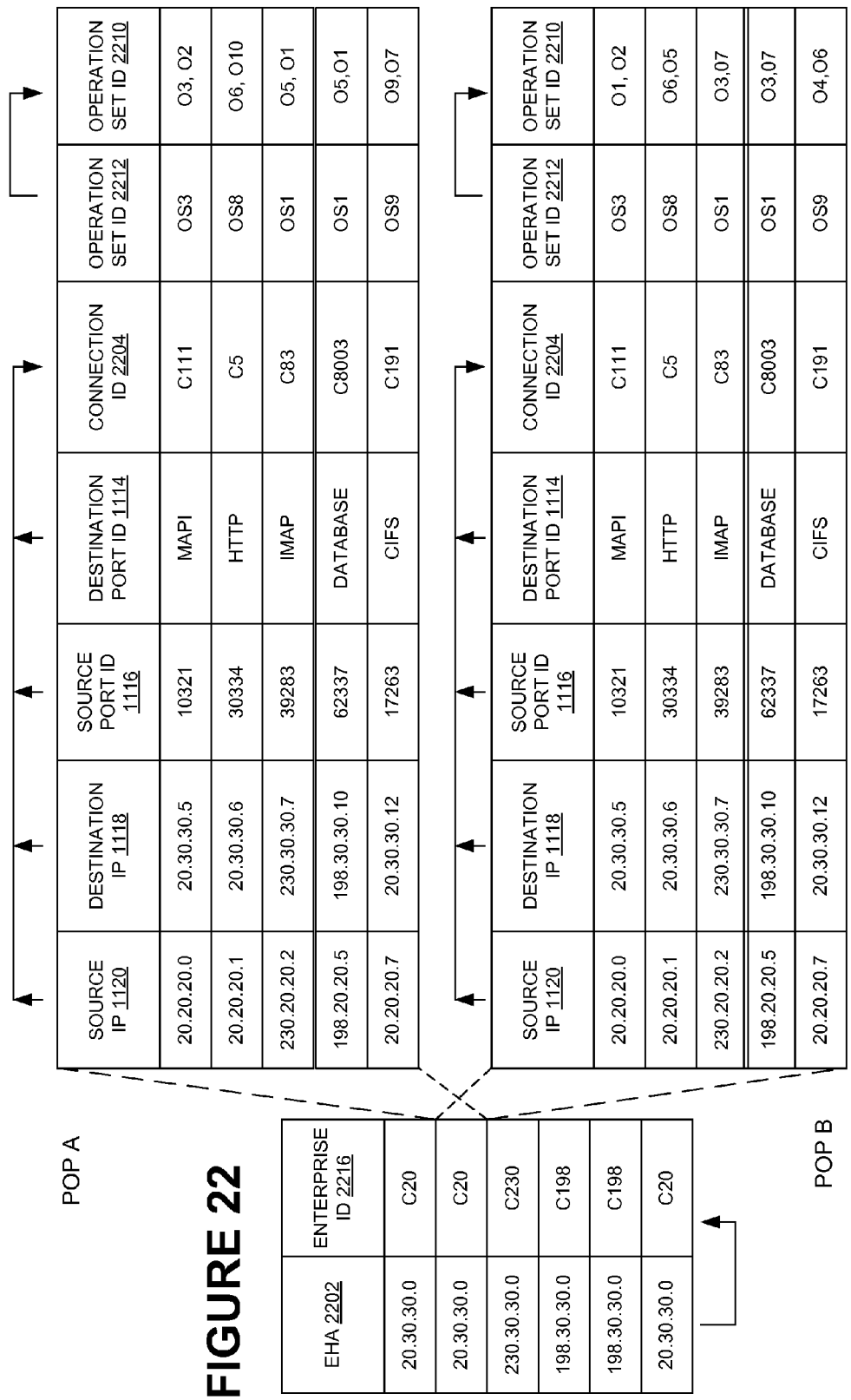
FIG. 22 is a table view illustrating example point of presence operations.

FIG. 22 is a table view illustrating example point of presence operations. In particular FIG. 22 illustrates an extended header address 2202, an enterprise id 2216, a source IP 1120, a destination IP 1118, a source port id 1116, a destination port id 1114, a connection id 2204, an operation set id 2212 and an operation id 2210.

The extended header address 2202 column may illustrate the address to the next POP and/or enterprise site. The address may be an internet protocol address (e.g. IPv4, IPv6). In an example embodiment, the address may also be a layer 2 address. The enterprise id 2216 column may illustrate an enterprise identification number (CSID). The enterprise identification number may also provide information of the enterprise site. For example, an enterprise id may identify a New York office of a Company X. CSID may determine the several instances of the enterprise specific service 1904 (A-N). The CSID may be obtained from the csconn packet 1104. The source IP 1120 column may illustrate the address of the actual source. The actual source may be a client 104. The destination IP 1118 column may illustrate an actual destination. In an example embodiment, the actual destination may be a server 106. In another example embodiment, the actual destination may also be a client 104. The source port id 1116 may illustrate the port address and/or number of the client 104 and/or server 106. The destination port id 1114 may illustrate a port address and/or number of the server 104 and/or client 104. The destination port id 1114 may be based on the application and/or protocol. For example, for an HTTP protocol the port number is 80. The destination port id may be a TCP port number. The connection id 2204 column may illustrate the connection number associated specifically to each client-server connection along the network that provides acceleration as a service (e.g., path B 102). The operation set id 2212 column may illustrate an identification number that enables selection of a set of optimization and security operations 2102 to be performed on a packet based on the enterprise and the connection established by the enterprise. The operation id 2210 column may illustrate a specific number of optimization and security operations that may be performed on a packet 1100 received from a client 104.

In the last row of the table illustrated in FIG. 22, the extended header address 2202 is mapped to a specific enterprise id 2216. The extended header address 2202 may be mapped to a specific enterprise id 2216 through the enterprise selection module 1916. The enterprise selection module 1916 searches for a mapping of the extended header address to a specific id in the enterprise id table 1930. The enterprise id table returns the enterprise id corresponding to the extended header address 2202. The extended header address 20.30.30.0 returns an enterprise id C20. The enterprise identifier CSID may determine the enterprise service instances 1904 A-N.

The connection id 2204 is determined based on the destination IP 1118, source IP 1120, source port id 1116 and/or the destination port id 1114. The connection id is unique to each combination of the destination IP 1118, source IP 1120, source port id 1116 and/or the destination port id 1114. In the last row of the table illustrated in FIG. 22, for a source IP address of 20.20.20.7, a destination IP address of 20.30.30.12, a source port id 17263 and/or a destination port id corresponding to CIFS the connection id is determined as C191. The connection id gives a unique id for each client-server connection. The connection id 2204 and the enterprise id 2216 may be used to determine the operation set id. For example, for an enterprise id C20 and connection id C191, the operation set id is determined to be OS9. The OS9 operation set may have a list of operations to be performed on the packet 1100. For example, OS9 has O5, O10 services to be performed on the packet 1100. The set of optimization and security operation 2102 may be selected by the operation set selection module 1912. The operation set selection module 1912 may choose the set of operations to be applied based on the operation set id 2212.

The operation set id is then compared to a POP id (not shown) to determine which specific operation should be applied from the operation set OS9. The operation selection is done through the operation selection module 1910. The operation id 2210 may enable the operation selection module 1910 to select an operation from the operation set. The operation id 2210 may select more than one operation from the operation set. For example, the on POP A the operation selection module may select operation O5 and O1 operations from the OS1 set to be applied on the packet 1100. At POP B the operation selection module may select O3 and O7 operations from the OS1 set to be applied on the packet 1100. At POP A the operation selection module may select O1 and O5 operations from the OS1 set for all enterprise identifier and/or connection identifier. However on another POP the operations selected for the same OS1 set may vary. For a selected POP id, the operation selection module selects the same operations for all enterprise identifier and connection identifier as illustrated in FIG. 22.

Figure 23:
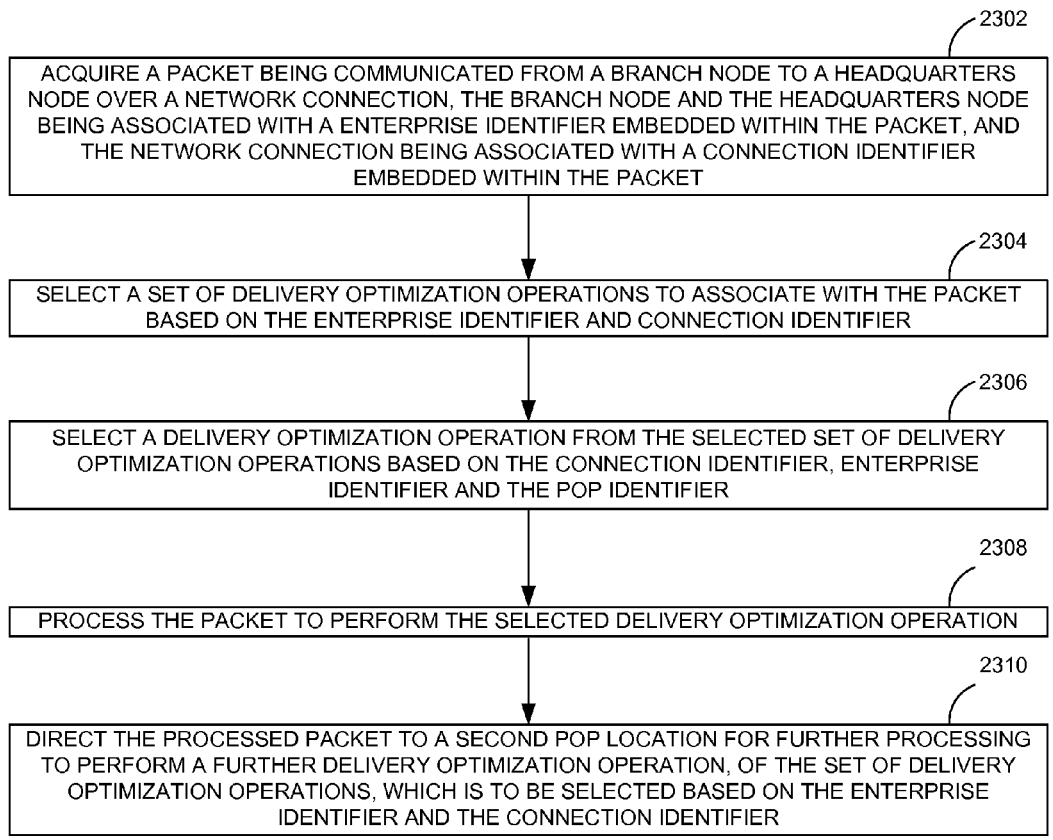
FIG. 23 is a flow diagram illustrating a method of selecting and performing delivery optimization operations.

FIG. 23 is a flow diagram illustrating a method of selecting and performing delivery optimization operations, according to an example embodiment. In operation 2302 a packet may be communicated between a branch node 1400 and a headquarters node 1414 over an overlay network and the POP may acquire the packet. The packet may include a connection identifier and an enterprise identifier. The connection identifier may be determined from the csconn packet 1104 and the enterprise identifier may be determined from the extended header 1102 and/or the header in the csconn packet 1104. The branch node 1400 and the headquarters node 1414 may have a client 104 and/or server 106 topology. In an example embodiment, the overlay network may be path A 102 illustrated in FIG. 1. Path A 102 may have n-number of POP 110 A-N in between the client 104 and server 106. The POPs may acquire a packet communicated between the client and the server. A connection may be established between the client 104 and the server 106. The client-server connection may be associated with a connection identifier 2204. The branch node and the headquarters node may be associated with the enterprise identifier 2216.

In operation 2304, upon receiving the packet the POP may select a set of delivery optimization operations to be performed on the packet. The set of delivery optimization operations may be selected based on the enterprise identifier 2216 and the connection identifier 2204. The set of delivery optimization operations may include, but not limited to optimization and security operations 2102. In operation 2306, a delivery optimization operation may be selected from the set of delivery optimization operations selected in operation 2304. The delivery optimization operation may be selected based on the enterprise identifier 2216, the connection identifier 2204 and a POP identifier. The POP identifier may determine which POP the packet has currently reached. For example, the packet may be at POP A 110 A, POP B 110 B or POP C 110 C if the packet is being transmitted between a requesting site 304 and a providing site 306 illustrated in FIG. 3. The delivery optimization operation selected from the list of delivery optimization operations may be different if the packet is in POP A 110 A compared to if the packet may be in POP B 110 B.

In operation 2308, the packet is processed to perform the selected delivery optimization operation on the packet. In operation 2310, the processed packet may be directed to a different POP location (e.g., second POP location). In the different POP location the packet may be further processed to perform a further set of delivery optimization operations that may be selected from a further set of delivery optimization operations packet based on the connection identifier 2204, enterprise identifier 2216 and the POP identifier. The processed packet may be a packet on which an n-number of delivery optimization operation has been performed. In operation 2310, the packet may also be directed to a headquarters node 1414. For example, if a packet is being transmitted from a requesting site 304 to a providing site 306 over an overlay network A 308 as illustrated in FIG. 3, then POP A 110 A, POP B 110 B and/or POP C 110 C acquires the packet that is transmitted from requesting site 304 to the providing site 306. POP A 110 A, POP B 110 B and/or POP C 110 C processes the packet to perform a delivery optimization operation which is selected based on the client-server connection identifier, the enterprise identifier and the POP location identifier included in the packet as illustrated in FIG. 19. If the packet is at POP B, then the packet is further directed to the providing site 306.

Figure 24:
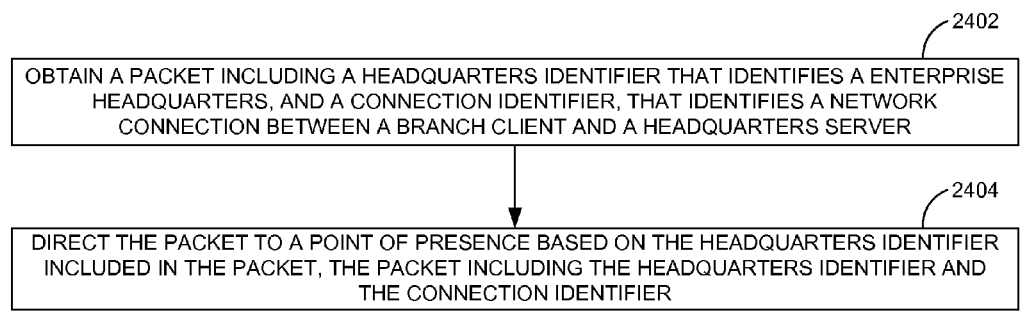
FIG. 24 is a flow diagram illustrating a method of a point of presence system

FIG. 24 is a flow diagram illustrating a method of a point of presence system. In operation 2403 the point of presence (POP) system 110 may obtain a packet that includes a headquarters identifier in the packet. The headquarters identifier identifies an enterprise site that may be designated as a headquarters. The headquarters identifier may be used to route the packet to the headquarters node 1414 through the POPs 110 A-N in the system overlay network path A 102. The packet may also include a connection identifier which may identify a connection between the branch client and the headquarters server, an enterprise identifier which may identify an enterprise and/or a POP identifier that identifies a POP on which the packet arrives.

In operation 2404 the point of presence system 110 may direct the packet from the point of presence system to a different point of presence system or an enterprise site based on the headquarters identifier. The packet directed from the point of presence system 110 to the next destination may include the headquarters identifier, the connection identifier, the enterprise identifier and the POP identifier. The POP identifier may be included in the packet or the POP identifier may be present in the POP system 110.

Figure 25:
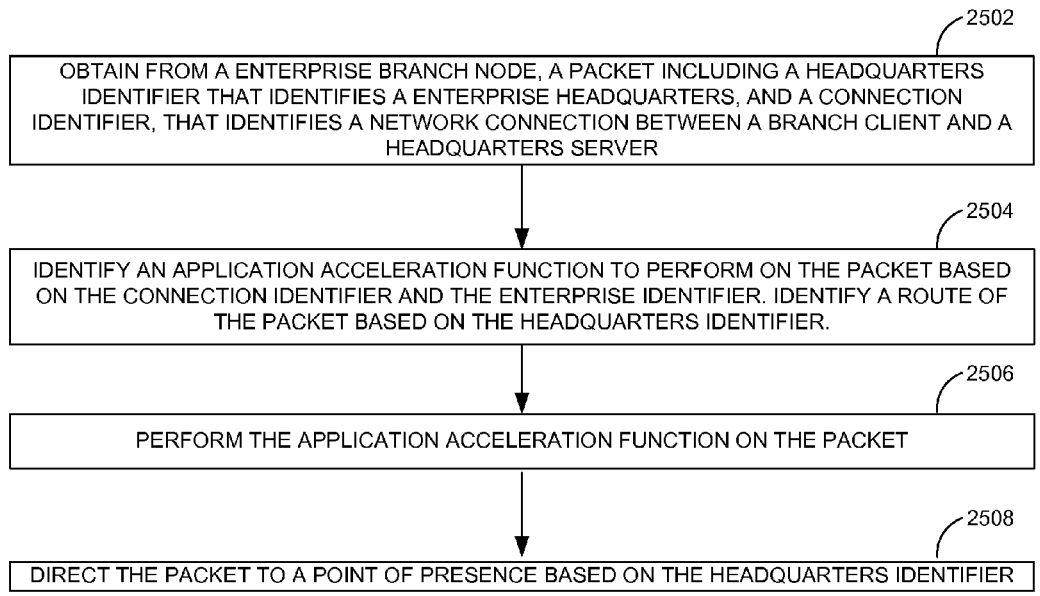
FIG. 25 is a flow diagram illustrating a method of a customer branch site.

FIG. 25 is a flow diagram illustrating a method of a point of presence system receiving a packet from an enterprise site. In operation 2502, the point of presence system may receive a packet from the enterprise site. The enterprise site may be designated as a branch site. The branch site may have a client topology. The enterprise site with branch designation and client topology may be termed as a branch client. The point of presence system that receives the packet from the branch client may be a first point of presence system. The packet obtained from the branch client may include a headquarters identifier that identifies the headquarters node 1414. The packet obtained from the branch client may be sent to an enterprise site designated as a headquarters. The headquarters may have a server topology. The packet may also include a connection identifier which identifies the network connection between the branch client and the headquarters server. If the requests from the branch client may be processed in one of the n-number of POPs 110 A-N in the service overlay network path A 102 illustrated in FIG. 1, then the packet may not be sent to the server site.

In operation 2504, the point of presence system may identify an application acceleration function to be performed on the packet received from the branch client. The application acceleration function to be performed on the packet may be identified based on the connection identifier included in the packet. In operation 2504, the point of presence system also identifies a route over which the packet may be directed. The route may be identified based on the headquarters identifier.

In operation 2506, the acceleration application functions identified in operation 2504 may be applied on the packet. The acceleration application function may be a set of delivery optimization operations from which a delivery optimization operation may be selected based on the connection identifier, enterprise identifier and/or the POP identifier. The set of delivery optimization operations may include, but not limited to security and optimization operations.

In operation 2508, the packet on which the acceleration optimization functions are applied may be directed to a destination node (e.g., another POP, a headquarters server, the branch client based on the headquarters identifier).

Figure 26:
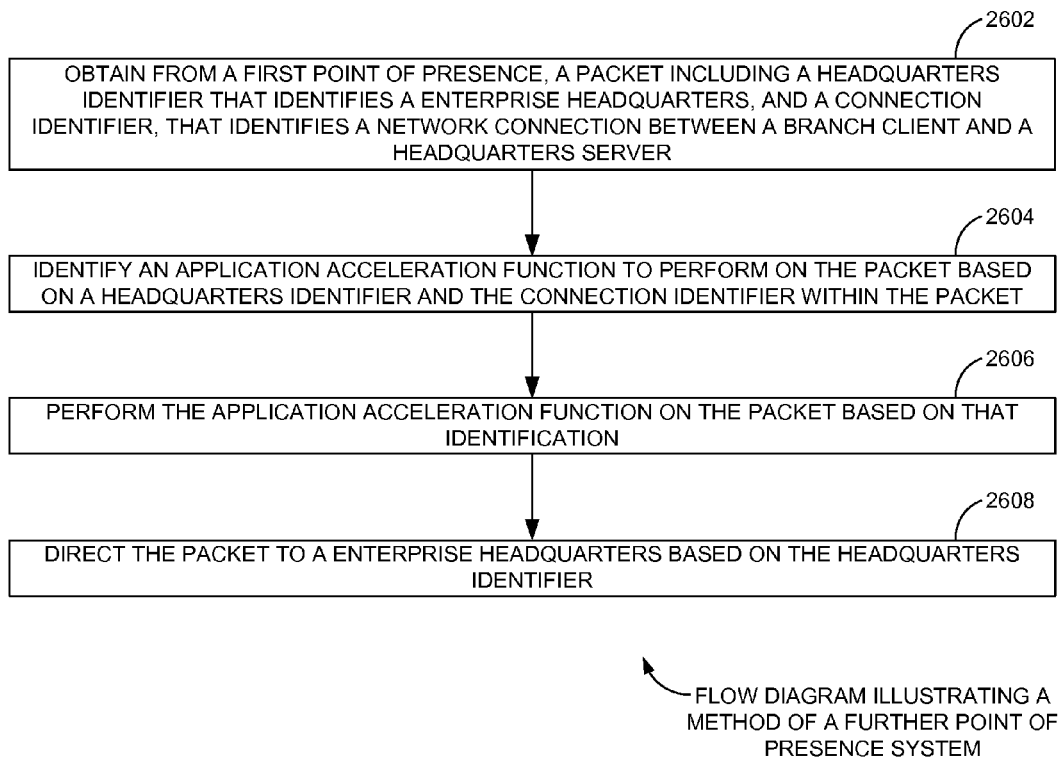
FIG. 26 is a flow diagram illustrating a method of a further point of presence system. Other features of the present embodiments will be apparent from accompanying Drawings and from the Detailed Description that follows.

FIG. 26 is a flow diagram illustrating a method of a further point of presence system receiving a packet from another point of presence system. In operation 2602, the point of presence system may receive a packet from another point of presence system (e.g., a first point of presence system). The packet may include a headquarters identifier that identifies the enterprise headquarters. The packet may also include a connection identifier which identifies the network connection between the branch client and the headquarters server. In an example embodiment, if the requests from the branch client may be processed in one of the n-number of POPs 110 A-N in the service overlay network path A 102 illustrated in FIG. 1, then the packet may not be sent to the server site.

In operation 2604, the point of presence system may identify an application acceleration function to be performed on the packet received from the branch client. The application acceleration function to be performed on the packet may be identified based on the connection identifier included in the packet. In operation 2604, the point of presence system also identifies a route over which the packet may be directed. The route may be identified based on the headquarters identifier.

In operation 2606, the acceleration application functions identified in operation 2604 may be applied on the packet. The acceleration application function may be a set of delivery optimization operations from which a delivery optimization operation may be selected based on the connection identifier, enterprise identifier and/or the POP identifier. The set of delivery optimization operations may include, but not limited to security and optimization operations.

In operation 2608, the packet on which the acceleration optimization functions are applied may be directed to a destination node (e.g., another POP, a headquarters server, the branch client based on the headquarters identifier).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system comprising:
   a branch site including a branch client;
   a headquarters site including a headquarters server, the branch site and the headquarters site being communicatively coupled over a link via transmission media, the link being identified through a link identifier, the branch client and the headquarters server being communicatively coupled over a network connection via the transmission media, and the network connection being identified through a connection identifier;
   a first point of presence (POP) communicatively coupled with the branch site over a first segment of the link; and
   a second POP communicatively coupled with the first POP over a second segment of the link, and communicatively coupled with the headquarters site over a third segment of the link,
   the branch site being configured to transmit a packet of the network connection, and associated with the branch client, over the first segment to the first POP, based on the link identifier, the packet encoding the link identifier and the connection identifier, the first POP being configured to:
  select a delivery optimization operation to perform on the packet based on a first POP identifier, the link identifier, and the connection identifier,
  perform the delivery optimization operation on the packet based on that identification, and
  transmit the packet to the second POP over the second segment of the link based on the link identifier, and the second POP being configured to:
  select a further delivery optimization operation to perform on the packet based on a second POP identifier, the link identifier, and the connection identifier,
  perform the further delivery optimization operation on the packet based on that identification, and
  transmit the packet to the headquarters site over the third segment of the link based on at least one of the link identifier and the connection identifier,
  wherein the packet is securely transmitted between the branch site and the headquarters site over each of the first segment, the second segment and the third segment through at least one network tunnel created using a tunneling protocol configured to encapsulate a payload protocol by a network protocol across at least one intervening firewall, and
  wherein the first POP and the second POP are appropriately located such that application acceleration and network optimization in the transmission of the packet are spread across the system, without being concentrated at end points thereof.

2. The system of claim 1, wherein the branch client and the headquarters server establish the network connection with one another prior to the branch site directing the packet to the first POP over the first segment of the link.

3. The system of claim 1,
  wherein a set of branch clients of the branch site and a set of headquarters servers of the headquarters site establish a plurality of separate network connections with one another,
  wherein the system is configured to direct a plurality of packets, each associated with a different one of the plurality of network connections, simultaneously over at least one of the first segment, the second segment, and the third segment of the link, and
  wherein the network connection is one of the plurality of separate network connections.

4. The system of claim 2, wherein the branch client and the headquarters server establish the network connection through a transmission control protocol three-way handshake and the connection identifier is encoded in an Internet Protocol header that includes at least one of a source IP address, a destination IP address, a source port identifier, and a destination port identifier.

5. The system of claim 1, wherein the first POP and the second POP each includes:
  an enterprise selection module configured to identify in a memory system an enterprise associated with the packet, based on the link identifier; and
  an operation set selection module configured to identify in the memory system a set of delivery optimization operations associated with the packet, based on the identified enterprise and the connection identifier.

6. The system of claim 5, wherein the set of delivery optimization operations associated with the packet includes a data compression function, a data decompression function, a protocol proxy function, an encryption function, and a decryption function.

7. The system of claim 5, wherein the first POP further includes:
  an operation selection module configured to select the delivery optimization operation of the identified set of delivery optimization operations to perform on the packet, based on an association of the first POP identifier with the connection identifier in the memory system; and
  a delivery optimization module configured to utilize a processor to perform the selected delivery optimization operation on the packet.

8. The system of claim 5, wherein the second POP further includes:
  an operation selection module configured to select the delivery optimization operation of the identified set of delivery optimization operations to perform on the packet, based on an association of the second POP identifier with the connection identifier in the memory system; and
  a delivery optimization module configured to utilize a processor to perform the selected further delivery optimization operation on the packet.

9. The system of claim 5, wherein the branch site is associated with a branch enterprise premise module configured to perform at least one of the set of delivery optimization operations on the packet prior to the branch site transmitting the packet over the first segment to the first POP.

10. The system of claim 5, wherein the headquarters site is associated with a headquarters enterprise premise module configured to perform at least one of the set of delivery optimization operations on the packet subsequent to receiving the packet from the second POP over the second segment.

11. The system of claim 1, further comprising:
  a set of interconnectors including:
    a branch site interconnector associated with the branch site;
    a first POP interconnector associated with the first POP;
    a second POP interconnector associated with the second POP; and
    a headquarters site interconnector associated with the headquarters site,
  wherein each of the set of interconnectors is configured to perform at least one of a router function and a bridge function, and
  wherein the first segment is identified through a first segment identifier that identifies at least one of the branch site interconnector and the first POP interconnector, the second segment is identified through a second segment identifier that identifies at least one of the first POP interconnector and the second POP interconnector, and the third segment is identified through a third segment identifier that identifies at least one of the second POP interconnector and the headquarters interconnector.

12. The system of claim 11, wherein the branch site and the headquarters site are associated with an enterprise and the branch site interconnector is not programmable by the enterprise to manipulate an extended header of the packet.

13. The system of claim 11, further comprising:
  a database server communicatively coupled with the branch client and configured to:
    receive from the branch client, a target destination for the packet, and
    provide a unique Internet Protocol (IP) address to the branch client based on the target destination, the unique IP address uniquely encoding the first segment identifier, the link identifier, and the connection identifier, the branch client being configured to transmit, via the branch site interconnector, the packet to the first POP over the first segment using the first segment identifier.

14. The system of claim 11, wherein the branch site and the headquarters site are associated with an enterprise and the branch site interconnector is programmable by the enterprise to manipulate an extended header of the packet.

15. The system of claim 14, wherein the branch site interconnector is configured to:
determine through a memory system that the first segment identifier is associated with the link identifier,
place the link identifier in the extended header of the packet,
place the first segment identifier in another extended header of the packet, and
based on the first segment identifier, transmit the packet over the first segment to the first POP.

16. The system of claim 11, wherein the first POP interconnector is configured to:
determine through a memory system that the second segment identifier is associated with the link identifier,
place the link identifier in an extended header of the packet,
place the second segment identifier in another extended header of the packet, and
based on the second segment identifier, transmit the packet over the second segment to the second POP.

17. The system of claim 11, wherein the branch site and the headquarters site are associated with an enterprise and the headquarters site is associated with the headquarters site interconnector that is not programmable by the enterprise to manipulate an extended header of the packet.

18. The system of claim 11, wherein the packet is a request packet, the connection identifier includes a headquarters server identifier and a branch client identifier, and the second POP interconnector is configured to:
substitute the branch client identifier with
the third segment identifier, and
a modified branch client identifier, wherein the connection identifier reflects the headquarters server identifier as a destination, and reflects the third segment identifier and the modified branch client identifier as a source, and
cause the second POP interconnector to transmit the request packet to the headquarters site over the third segment,
the headquarters site being configured to:
provide the request packet to the headquarters server using the headquarters server identifier as the destination,
designate the third segment identifier and the modified branch client identifier as the destination, and the headquarters server identifier as the source, and
subsequent to providing the request packet to the headquarters server, transmit a return packet that is associated with the request packet over the third segment to the second POP based on the third segment identifier.

19. The system of claim 18, wherein responsive to receiving the return packet from the headquarters site, the second POP is configured to:
access a memory system to associate the modified branch client identifier with the branch client identifier,
access the memory system to associate the branch client identifier and the headquarters server identifier with the connection identifier,
access the memory system to associate the connection identifier with the link identifier;
access the memory system to associate the link identifier with the second segment identifier, and
transmit the return packet to the first POP based on the second segment identifier.

20. The system of claim 11, wherein the branch site and the headquarters site are associated with an enterprise and the headquarters site is associated with the headquarters site interconnector that is programmable by the enterprise to manipulate an extended header of the packet.

21. The system of claim 20, wherein the second POP interconnector is configured to:
determine through a memory system that the third segment identifier is associated with the link identifier,
place the link identifier in the extended header of the packet,
place the third segment identifier in another extended header of the packet, and
based on the third segment identifier, transmit the packet over the third segment to the headquarters site.

22. The system of claim 21, wherein at least one of the extended header and the other extended header reflect at least one of IPSec, MPLS, VLAN, IP, and GRE access protocols.

23. The system of claim 11,
wherein the first POP interconnector is one of a plurality of interconnectors that is communicatively coupled with the branch site interconnector and accessible by the branch site interconnector, and
wherein the branch site interconnector is configured to select the first POP interconnector from the plurality of interconnectors based on the first segment identifier.

24. The system of claim 11,
wherein the second POP interconnector is one of a plurality of POP interconnectors communicatively coupled with the first POP interconnector over a plurality of segments, and
wherein the first POP interconnector selects the second POP interconnector from the plurality of POP interconnectors based on the second segment identifier.

25. The system of claim 11,
wherein the headquarters site interconnector is one of a plurality of headquarters site interconnectors that is communicatively coupled with the second POP interconnector over a plurality of segments,
wherein the second POP interconnector is configured to select the headquarters site interconnector from the plurality of headquarters site interconnectors, based on the third segment identifier.

26. The system of claim 11, wherein the packet is a request packet, and the headquarters site interconnector is configured to:
receive a return packet associated with the request packet from the headquarters server,
determine through a memory system of the headquarters site that the link identifier encoded in the return packet is associated with the third segment identifier, and
transmit the return packet from the headquarters site to the second POP based on the third segment identifier,
the second POP interconnector being configured to:
determine through a memory system of the second POP that the link identifier encoded in the return packet is associated with the second segment identifier, and transmit the return packet from the second POP to the first POP, based on the second segment identifier, and the first POP interconnector being configured to, determine through a memory system of the first POP that the link identifier encoded in the return packet is associated with the first segment identifier, and transmit the return packet from the first POP to the branch site interconnector, based on the first segment identifier.

27. A system comprising:

a branch site including a branch client;

a headquarters site including a headquarters server, the branch site and the headquarters site being communicatively coupled over a link via transmission media, the link being identified through a link identifier, the branch client and the headquarters server being communicatively coupled over a network connection via the transmission media, and the network connection being identified through a connection identifier;

a first point of presence (POP) communicatively coupled with the branch site over a first segment of the link; and a second POP communicatively coupled with the first POP over a second segment of the link, and communicatively coupled with the headquarters site over a third segment of the link, the branch site being configured to forward a packet of the network connection, and associated with the branch client, over the first segment to the first POP, based on the link identifier, the packet encoding the link identifier and the connection identifier, the first POP being configured to:

perform a delivery optimization operation on the packet, determine whether to forward the packet to the second POP, and based on determining that that the packet is to be forwarded to the second POP, forward the packet to the second POP over the second segment of the link based on the link identifier, and the second POP being configured to:

perform a further delivery optimization operation on the packet, determine whether to forward the packet to the headquarters site, and based on determining that that the packet is to be forwarded to the headquarters site, forward the packet to the headquarters site over the third segment of the link based on at least one of the link identifier and the connection identifier, wherein the packet is securely transmitted between the branch site and the headquarters site over each of the first segment, the second segment and the third segment through at least one network tunnel created using a tunneling protocol configured to encapsulate a payload protocol by a network protocol across at least one intervening firewall, and wherein the first POP and the second POP are appropriately located such that application acceleration and network optimization in the transmission of the packet are spread across the system, without being concentrated at end points thereof.

28. The system of claim 27, further comprising:

a set of interconnectors including:

a branch site interconnector associated with the branch site;

a first POP interconnector associated with the first POP;

a second POP interconnector associated with the second POP; and a headquarters site interconnector associated with the headquarters site, wherein each of the set of interconnectors are configured to perform at least one of a router function and a bridge function, and wherein the first segment is identified through a first segment identifier that identifies at least one of the branch site interconnector and the first POP interconnector, the second segment is identified through a second segment identifier that identifies at least one of the first POP interconnector and the second POP interconnector, and the third segment is identified through a third segment identifier that identifies at least one of the second POP interconnector and the headquarters interconnector.

29. The system of claim 28, wherein the link identifier is configured to be encoded in an inner extended header of the packet, and at least one of the first segment identifier, the second segment identifier, and the third segment identifier are configured to be encoded in an outer extended header of the packet.

30. The system of claim 29, wherein the branch site interconnector is configured to encode the first segment identifier in a source field and a destination field of the outer extended header of the packet that the branch site is configured to forward to the first POP, the first segment identifier including a branch site interconnector identifier and a first POP interconnector identifier, and wherein, based on the first POP determining that the packet is to be returned to the branch site, the first POP interconnector is configured to:

place the first POP interconnector identifier in the in the source field of the outer extended header, place the branch site interconnector identifier in the destination field of the outer extended header, and return the packet to the branch site over the first segment based on the branch site interconnector identifier in the destination field of the outer extended header.

31. The system of claim 29, wherein the first POP interconnector is configured to encode the second segment identifier in a source field and a destination field of the outer extended header of the packet that the first POP is configured to forward to the second POP, the second segment identifier including a second POP interconnector identifier and a headquarters site interconnector identifier, wherein, based on the second POP determining that the packet is to be returned to the first POP, the second POP interconnector is configured to:

place the second POP interconnector identifier in the in the source field of the outer extended header, place a first POP interconnector identifier in the destination field of the outer extended header, and return the packet to the first POP interconnector over the second segment based on the first POP interconnector identifier in the destination field of the outer extended header.

32. The system of claim 27, wherein the delivery optimization operation and the further delivery optimization operation are of a set of delivery optimization operations including a data compression function, a data decompression function, a protocol proxy function, an encryption function, and a decryption function.

33. The system of claim 32,
wherein the branch site is associated with a branch enterprise premise module configured to perform at least one of the set of delivery optimization operations on the packet, and
wherein the branch enterprise premise module is further configured to:
determine whether to return the packet to the branch client prior to the branch site forwarding the packet over the first segment to the first POP, and
return the packet to the branch client based on determining that the packet is to be returned to the branch client.

34. The system of claim 32, wherein the headquarters site is associated with a headquarters enterprise premise module configured to perform at least one of the set of delivery optimization operations on the packet subsequent to receiving the packet from the second POP over the second segment.

35. A method comprising:
securely transmitting a packet between a branch site including a branch client and a headquarters site including a headquarters server over each of a first segment, a second segment and a third segment of a link through at least one network tunnel created using a tunneling protocol configured to encapsulate a payload protocol by a network protocol across at least one intervening firewall, the branch site and the headquarters site being communicatively coupled over the link via transmission media, the link being identified through a link identifier, the branch client and the headquarters server being communicatively coupled over a network connection via the transmission media, and the network connection being identified through a connection identifier;
implementing a first POP communicatively coupled to the branch site over the first segment of the link;
implementing a second POP communicatively coupled to the first POP over the second segment of the link, and communicatively coupled to the headquarters site over the third segment of the link;
configuring the branch site to transmit the packet of the network connection, and associated with the branch client, over the first segment to the first POP, based on the link identifier, the packet encoding the link identifier and the connection identifier;
utilizing the first POP to:
select a delivery optimization operation to perform on the packet based on a first POP identifier, the link identifier, and the connection identifier,
perform the delivery optimization operation on the packet based on that identification, and
transmit the packet to the second POP over the second segment of the link based on the link identifier;
utilizing the second POP to:
select a further delivery optimization operation to perform on the packet based on a second POP identifier, the link identifier, and the connection identifier,
perform the further delivery optimization operation on the packet based on that identification, and
transmit the packet to the headquarters site over the third segment of the link based on at least one of the link identifier and the connection identifier; and
appropriately positioning the first POP and the second POP such that application acceleration and network optimization in the transmission of the packet are spread across the link, without being concentrated at end points thereof.

36. The method of claim 35, comprising establishing the network connection between the branch client and the headquarters server prior to the branch site directing the packet to the first POP over the first segment of the link.

37. The method of claim 35, wherein a delivery optimization operation provider includes a provider enterprise premise equipment in a provider site.

38. The method of claim 35, further comprising:
determining that the further delivery optimization operation is not to be performed;
determining that the packet is to be returned to a source of the packet; and
returning the packet towards the source of the packet over the segment based on the determining that the further delivery optimization operation is not to be performed and the determining that the packet is to be returned to the source of the packet.

39. The method of claim 38,
wherein the determining that the further delivery optimization operation is not to be performed includes accessing a determination value stored in a memory system, and
wherein the determination value is associated with at least one of a bandwidth threshold value and a throughput threshold value related to the further segment.

40. The method of claim 35, wherein selecting the delivery optimization operations includes:
determining that the link identifier is associated with an enterprise identified through an enterprise identifier in a memory system;
determining that the enterprise identifier and the connection identifier are associated with the delivery optimization operations in the memory system; and
determining that the delivery optimization operation is associated with the connection identifier and the POP identifier in the memory system.

41. The method of claim 40, wherein the association between the link identifier, the connection identifier, and the delivery optimization operations is pre-defined based on a user preference.

42. The method of claim 40, wherein the association between the connection identifier and the delivery optimization operation of the delivery optimization operations is pre-defined based on a user configuration of the POP.

43. The method of claim 40, wherein the delivery optimization operation is selected from a group of delivery optimization operations consisting of data compression, data decompression, protocol proxy, authentication, encryption, and decryption.

44. The method of claim 35, comprising establishing the network connection using an Internet Protocol through a requesting client of the requesting site and a providing server of the providing site.

45. The method of claim 35,
wherein the connection identifier is encoded in a inner header of the packet and includes at least one of a source Internet Protocol address, a destination Internet Protocol address, a source port identifier, and a destination port identifier, and
wherein the link identifier is encoded in an extended header of the packet and reflects at least one of generic routing encapsulation, multiprotocol label switching, and virtual private local area network services.

46. A machine-readable medium including instructions that when executed by a machine, causes the machine to perform the method of claim 35.

* * * * *

UNITED STATES PATENT AND TRADEMARK OFFICE
CERTIFICATE OF CORRECTION

PATENT NO. : 8,396,954 B2
APPLICATION NO. : 12/822366
DATED : March 12, 2013
INVENTOR(S) : Ashwath Nagaraj et al.

Figure 13A:
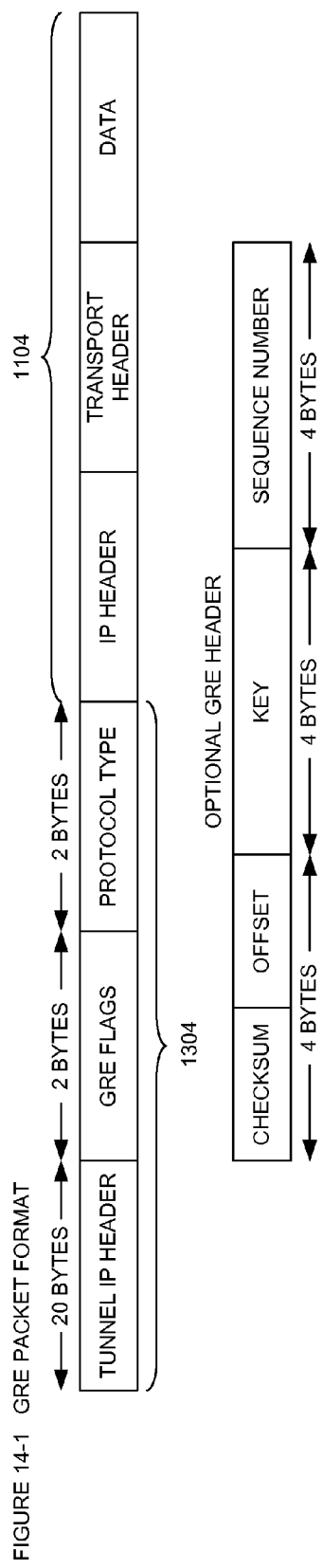
FIG. 13 is a structural view illustrating the double header format to securely transmit the example packet illustrated in FIG. 11 over the system overlay network, according to one embodiment.
Figure 13B:
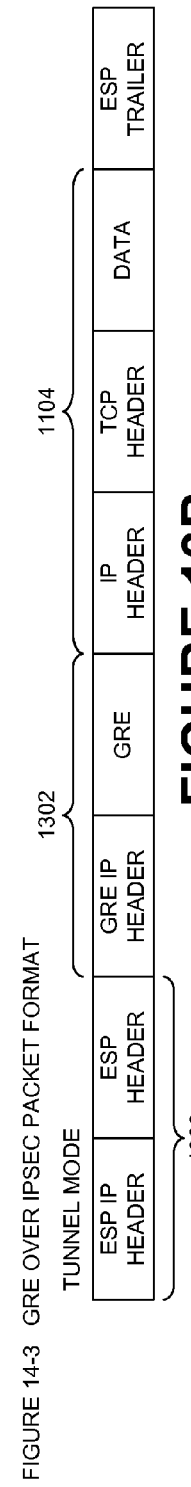
Figure 13C:
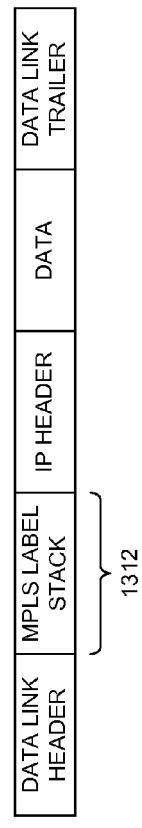
Figure 13D:
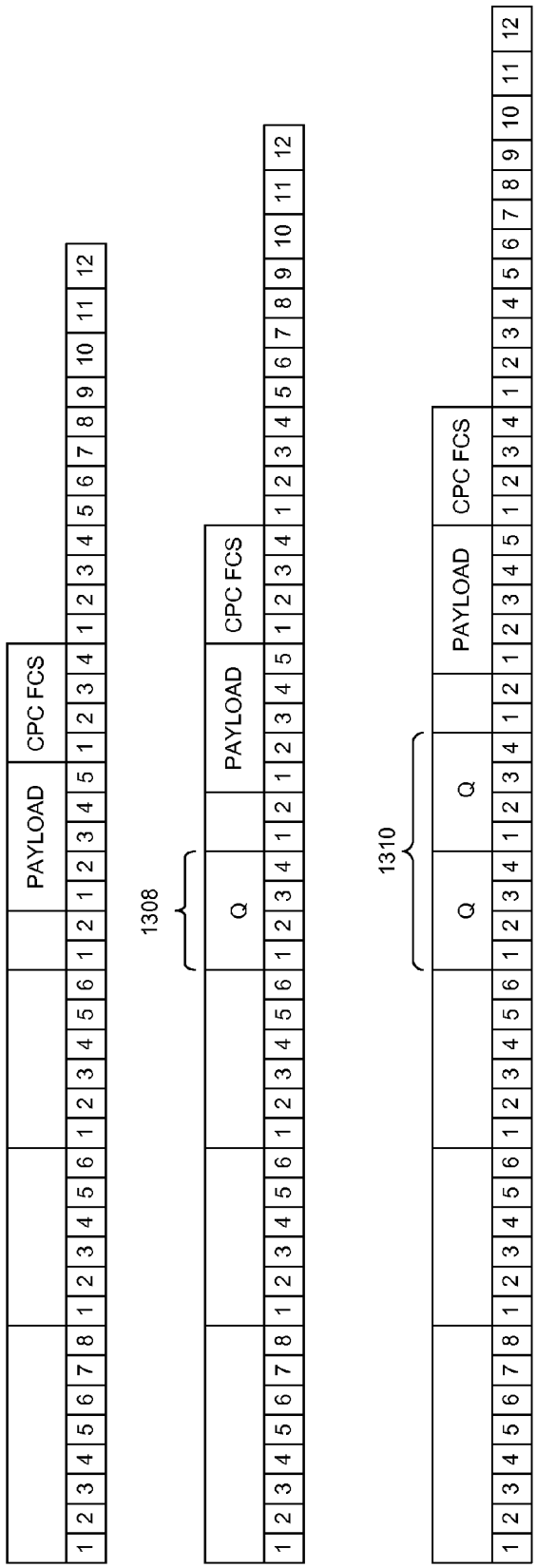
Figure 13E:
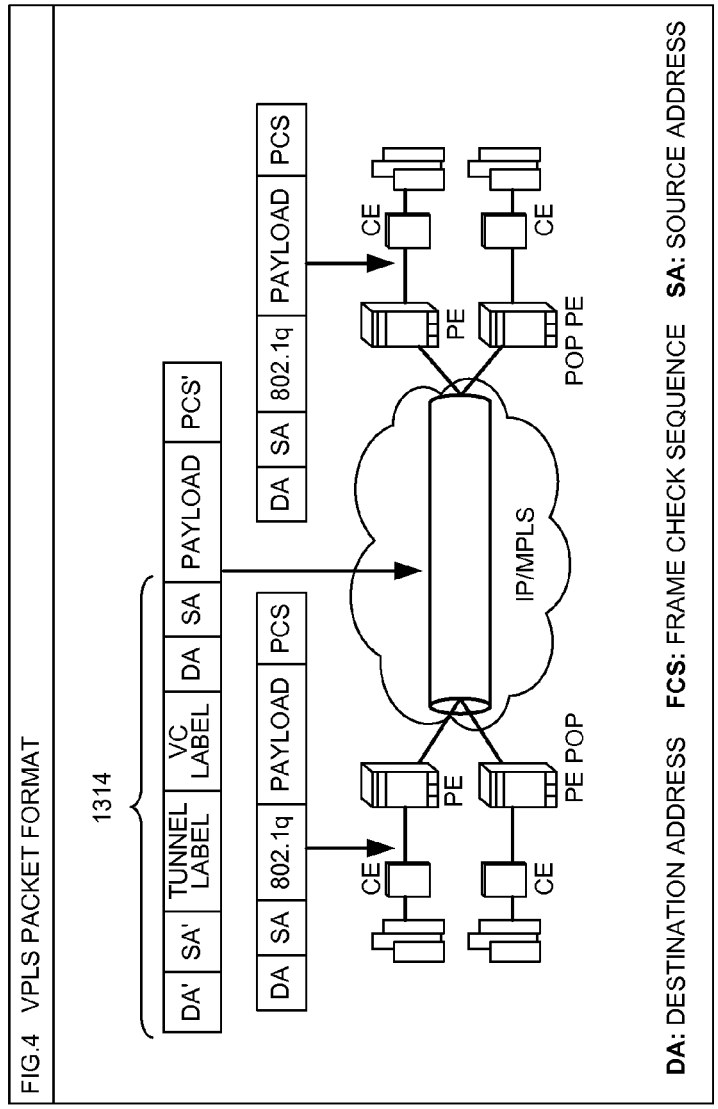

It is certified that error appears in the above-identified patent and that said Letters Patent is hereby corrected as shown below:

In the Drawings:

In Fig. 1, reference numeral 110N, delete "POP B" and replace with -- POP N --; reference numeral 108B delete "108B" and replace with -- 108N --.
In Fig. 4, reference numeral 108, delete "108" and replace with -- 108A --; reference numeral 304A, delete "304A" and replace with -- 304 --.
In Fig. 5, reference numeral 108, delete "108" and replace with -- 108B --; reference numeral 306A, delete "REQUESTING SITE 306A" and replace with -- PROVIDING SITE 306A --.
In Fig. 6, reference numeral 306B, delete "306B" and replace with -- 306 --.
In Fig. 7, reference numeral 306B, delete "306B" and replace with -- 306 --.
In Fig. 8, reference numeral 306C, delete "306C" and replace with -- 306 --.
In Fig. 11, delete "CONNECTION IDENTIFIERS (5-TUPLE)" and replace with -- CONNECTION IDENTIFIERS (5-TUPLE) 1101 --.
In Fig. 13A, delete "FIGURE 14-1".
In Fig. 13B, delete "FIGURE 14-3".
In Fig. 17, delete "FIGURE 17" and replace with -- FIGURE 17A --.
In Fig. 17A, delete "FIGURE 17A" and replace with -- FIGURE 17B --.
In Fig. 17B, delete "FIGURE 17B" and replace with -- FIGURE 17C --.
In Fig. 19, reference numeral 1904(D), delete "1904(D)" and replace with -- 1904(N) --; reference numeral 1910, delete "COMMUNICATION MODULE 1910" and replace with -- COMMUNICATION MODULE 1920 --.

In the Specification:

In column 8, line 26, delete "13" and replace with -- 13A-E --; line 42, delete "17" and replace with -- 17A-C --.
In column 9, line 18, delete "POP A 110 A, a POP B 110 B" and replace with -- POP A-N 110A-N --.
In column 10, line 3, delete "100"; line 48, delete "Fig. 10" and replace with -- Fig. 1 --.
In column 11, lines 8 and 11, delete each occurrence of "100".

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,396,954 B2

In column 12, line 41, delete "1100" and replace with -- 1100 A-C --; line 42, delete each occurrence of "1104"; line 43, delete "a data" and replace with -- data 1104 --; line 44, delete "a POP System 110" and replace with -- the POP A-N 110 A-N --.

In column 13, line 4, delete "1100" and replace with -- 1100 A-C --.

In column 14, line 21, delete "Fig. 13" and replace with -- Fig. 13A-E --; line 34, delete "Fig. 1" and replace with -- Fig. 2 --.

In column 15, line 4, delete "300"; lines 46 and 48, replace each occurrence of "114" with -- 110C --.

In column 16, line 20, delete "POPs 110 A-C" and replace with -- POP A-C 110 A-C --; line 27, delete "POP A 110 and POP C 110 C" and replace with -- POP A 110 A and POP C 110 C --; line 30, delete "POP C 114" and replace with -- POP C 110 C --.

In column 16, line 48, delete "304A" and replace with -- 304 --; line 52, delete "304A" and replace with -- 304 --.

In column 17, line 42, delete "requesting site 306 A" and replace with -- providing site 306A --; line 50, delete "304" and replace with -- 306A --.

In column 18, line 27, delete "308B" and replace with -- 306A --; line 32, delete "306B" and replace with -- 306 --; line 41, delete "306B" and replace with -- 306 --; line 64, delete "308 B" and replace with -- 306 --.

In column 19, line 20, delete "306B" and replace with -- 306 --; line 39, delete "306C" and replace with -- 306 --; line 40, delete "306C" and replace with -- 306 --; line 43, delete "306C" and replace with -- 306 --; line 52, delete "306C" and replace with -- 306 --.

In column 21, line 60, delete "1100" and replace with -- 1100B --.

In column 22, lines 30, 31, 34, and 40, replace each occurrence of "FIG. 13" with -- FIG. 13 A-E --.

In column 23, line 26, delete "1300 B" and replace with -- in Figure 13 B --; line 39, delete "1300 C" and replace with -- in Figure 13 D --; line 56, delete "1300 D" and replace with -- in Figure 13 C --.

In column 24, line 1, delete "1300 E" and replace with -- in Figure 13 E --; line 16, delete "1300 A-E" and replace with -- as illustrated in Figures 13 A-E --.

In column 25, line 21, delete "1412" and replace with -- 1402 --; lines 47, 61, 66, and 67, replace each occurrence of "bridge" with -- router --.

In column 26, line 3, delete "bridge" and replace with -- router --; line 46, delete "enterprise" and replace with -- customer --.

In column 27, line 55, delete "1423" and replace with -- 1525 --.

In column 28, line 1, delete "FIG. 14" and replace with -- FIG. 15 --; line 21, delete "Path 101" and replace with -- Path A 101 --; line 21, delete "Path 102" and replace with -- Path B 102 --.

In column 29, line 18, delete "enterprise" and replace with -- customer --; line 56, delete "formats" and replace with -- format --.

In column 30, line 32, delete "1524 to the edge router" and replace with -- 1624 to the edge router --.

In column 31, line 13, delete "enterprise" and replace with -- customer --; lines 35 and 39, replace each occurrence of "17" with -- 17A-C --.

In column 32, line 33, delete "17" and replace with -- 17A --.

In column 33, lines 53-54, delete "enterprise services 1904" and replace with -- customer services 1904 --.

In column 34, lines 11-12, delete "POP A 110 and the POP C 110 (C)" and replace with -- POP A 110 A and the POP C 110 C --.

CERTIFICATE OF CORRECTION (continued)
U.S. Pat. No. 8,396,954 B2

In column 35, lines 7 and 14, replace "service 1904 (A-N)" with -- services 1902 --; lines 18-19, delete "the enterprise specific service instance 1904 (A-N)" and replace with -- each instance of the enterprise specific services 1902 --.
In column 37, lines 22 and 24, replace each occurrence of "POP B 110 B" with -- POP N 110 N --.
In column 38, line 58, delete "service 1904 (A-N)" and replace with -- services 1902 --.
In column 40, lines 13 and 14, replace each occurrence of "102" with -- 101 --.
In column 40, line 67, delete "2403" and replace with -- 2402 --.
In column 41, line 39, delete "102" and replace with -- 101 --.
In column 42, line 5, delete "102" and replace with -- 101 --.